United States Patent [19]
Inoue et al.

[11] Patent Number: 5,859,944
[45] Date of Patent: Jan. 12, 1999

[54] OPTICAL CONNECTOR

[75] Inventors: Akira Inoue; Toru Iwashima; Masumi Ito, all of Yokohama; Yoshiaki Miyajima, Hitachinaka; Shin-ichi Furukawa, Mito, all of Japan

[73] Assignees: Sumitomo Electric Industries, Ltd., Osaka; Nippon Telegraph and Telephone Corporation, Tokyo, both of Japan

[21] Appl. No.: 754,500

[22] Filed: Nov. 20, 1996

[30] Foreign Application Priority Data

| Nov. 20, 1995 | [JP] | Japan | 7-301455 |
| Dec. 13, 1995 | [JP] | Japan | 7-324737 |
| Dec. 13, 1995 | [JP] | Japan | 7-324740 |
| Dec. 13, 1995 | [JP] | Japan | 7-324742 |
| Dec. 13, 1995 | [JP] | Japan | 7-324746 |
| Dec. 14, 1995 | [JP] | Japan | 7-325720 |
| Dec. 14, 1995 | [JP] | Japan | 7-325729 |
| Dec. 15, 1995 | [JP] | Japan | 7-327232 |
| Jan. 29, 1996 | [JP] | Japan | 8-013249 |

[51] Int. Cl.⁶ ............... G02B 6/38; G02B 6/34; G02B 6/36
[52] U.S. Cl. ............... 385/73; 385/60; 385/72; 385/77; 385/78; 385/88; 385/92; 385/37
[58] Field of Search ............... 385/37, 73, 77, 385/78, 80, 85, 88, 60, 10, 14, 59, 71, 72

[56] References Cited

U.S. PATENT DOCUMENTS

| 4,636,031 | 1/1987 | Schmadel, Jr. et al. | 385/37 |
| 4,725,110 | 2/1988 | Glenn et al. | 385/37 |
| 4,730,885 | 3/1988 | Doi | 385/92 |
| 5,042,898 | 8/1991 | Morey et al. | 385/37 |
| 5,367,589 | 11/1994 | MacDonald et al. | 385/37 |
| 5,717,804 | 2/1998 | Pan et al. | 385/94 |

FOREIGN PATENT DOCUMENTS

| 0 506 546 | 9/1992 | European Pat. Off. . |
| 35 42 615 | 6/1987 | Germany . |

*Primary Examiner*—Hemang Sanghavi
*Attorney, Agent, or Firm*—Pillsbury Madison & Sutro LLP

[57] ABSTRACT

The optical connector according to the present invention comprises, at least, an optical filter with a waveguide structure having a grating with a predetermined reflection wavelength and a plug attached to a tip of the optical filter. The grating is disposed at a tip portion of the optical filter and accommodated in the plug attached to the tip portion of the optical filter. Further, the optical connector has various light-blocking structures for preventing unnecessary light from traveling a filter region of the optical filter including the grating.

67 Claims, 63 Drawing Sheets

OPTICAL CONNECTOR

BACKGROUND OF THE INVENTION

1. Field of the Invention

The present invention relates to a configuration of an optical connector for connecting an optical filter having a waveguide structure to optical elements such as an optical fiber, a semiconductor device, or the like.

2. Related Background Art

In an inspection system for an optical line using an inspection apparatus such as an apparatus with Optical Time Domain Reflectometry method (OTDR apparatus), an optical filter for reflecting inspection light with a predetermined wavelength is generally disposed in the optical line. This optical filter has a light-blocking function for cutting off the inspection light so as to prevent it from being transmitted to a subscriber's house and a light-reflecting function for reflecting the inspection light propagated through the optical line so as to send it back to the inspection apparatus, thereby inspecting whether there are fault points in the optical line or not and detecting light transmission characteristics of the optical line.

As the optical filter applied to the inspection system for optical lines, particularly preferable is an optical filter with a waveguide structure in which a region having an optical filter function (referred to as "filter region" hereinafter) is disposed at a core of an optical waveguide (including optical fiber, thin-film waveguide, and the like). For example, when a filter region is formed at a predetermined portion of a communication optical fiber used as an optical line, an optical fiber type optical filter is obtained. Such an optical filter itself can be used as an optical line. Accordingly, when a plug is attached to an end of an optical fiber type optical filter to constitute an optical connector, its handling is facilitated. Therefore, when an optical fiber type optical filter is used to constitute an inspection system for optical lines, unlike the case where a dielectric multilayer film filter is used, it is unnecessary for filter parts to be inserted into the optical line, whereby loss in signal light can be minimized. Also, an optical filter formed when a filter region is disposed in a thin-film waveguide is convenient for various reasons, e.g., it not only reflects the inspection light but also can output a branch of the signal light transmitted through the filter region.

As the filter region of such an optical filter having a waveguide structure, grating has conventionally been adopted. Here, "grating" refers to a region in an optical waveguide where effective refractive index periodically changes between its minimum value and maximum value along the optical axis (longitudinal direction corresponding to a traveling direction of a signal light in the waveguide). As disclosed in Japanese Patent Application Laid-Open No. 62-500052, a grating is formed when silica glass doped with germanium is irradiated with an interference pattern of ultraviolet rays. This is based on the fact that the refractive index of the glass increases according to a light intensity distribution of the interference pattern. The grating formed at the core of the optical waveguide reflects, of the light advancing through the optical waveguide, a light component having a narrow wavelength width (referred to as "reflection wavelength of the grating" hereinafter) centered at a predetermined wavelength (Bragg wavelength). This reflection wavelength of the grating has been known to be determined according to the period of the grating (grating pitch).

SUMMARY OF THE INVENTION

The inventors have studied the conventional optical connector including the optical filter from the viewpoints of performance of the optical filter, manufacture of the optical filter, and the like. As a result, the inventors have concluded that, when an optical filter having a waveguide structure is utilized in an inspection system for an optical line, it is preferable for the grating provided in at least the core of the optical filter to be accommodated in an optical connector for optically connecting the inspection system and the subscriber's terminal to each other.

In general, as shown in FIG. 1, for connecting transmission lines together, an optical connector is constituted, at least, by plugs 1 attached to tips of optical fiber cables (optical cords) 11a and 11b to be connected together and an alignment sleeve 21 for optically connecting these plugs 1 together. On the other hand, as shown in FIG. 3, for connecting a transmission line and a semiconductor device (e.g., light-receiving element) together, an optical connector constitutes a part of an optical module 20 which comprises, at least, a ferrule 24 (included in the plug 1) attached to a tip of an optical fiber cable 22, a sleeve 20a accommodating the ferrule 24, and a holder 20b in which an optical element 20d is mounted on a main surface of a stem 20c.

Also, the above-mentioned plug is also known as "cord-attached optical connector" since there are cases where the plug itself is sold as being attached to a tip of an optical fiber cable, for example. Accordingly, in this specification, a member constituted by an optical fiber cord and a plug or ferrule attached to a tip of the optical fiber cord is also simply referred to as "optical connector". Here, in this specification, "optical fiber cable (optical cord)" encompasses not only a cord in which the outer periphery of a single optical fiber is plastic-coated but also a ribbon type cord in which a plurality of optical fibers are unitedly plastic-coated (see FIG. 2).

As explained in the foregoing, the optical connector according to the present invention comprises, as at least a part of a transmission line, an optical filter which has a waveguide structure comprised of a core having a predetermined refractive index and a cladding having a refractive index lower than that of the core and covering the outer periphery of the core and in which a grating for reflecting light of a predetermined wavelength is disposed at a predetermined part of the optical filter including the core; a plug which has a space for accommodating a part of the optical filter and, while in a state where it accommodates in the space a tip portion of the optical filter including one end face the optical filter, is attached to the tip portion. Further, in the optical connector according to the present invention, in order to improve the performance of the optical filter or facilitate the manufacture of the optical connector, the grating provided in the tip portion of the optical filter is accommodated in the space of the plug.

As described above, however, in the optical connector accommodating the region of the optical filter where the grating is provided (filter region), there exists light which, while having a predetermined wavelength (corresponding to the reflection wavelength of the grating) to be reflected by the grating, is radiated from the grating to the cladding region and passes through the filter region including the grating. Accordingly, as viewed from the light-emitting end of the optical filter, it cannot sufficiently exhibit the filter function for blocking the light to be reflected by the grating.

Therefore, the optical connector according to the present invention has a light-blocking structure for preventing, of the light to be reflected by the grating, an undesirable light component radiated from the grating to the cladding and is propagated through the cladding toward the abovementioned one end face of the optical filter from the filter region of the optical filter, in which the grating is disposed, from advancing.

In particular, the optical connector according to the present invention includes the following two embodiments in terms of position of the grating accommodated therein.

Namely, in the first embodiment, the plug is constituted by a ferrule which has a through-hole for accommodating a part of the optical filter (e.g., optical fiber having a grating disposed at a predetermined position thereof) and, in a state where at least a part of a tip portion of the optical filter is accommodated in the through-hole, is attached to this tip portion; and a flange to which an end of the ferrule is attached and which has a hollow portion for accommodating at least a remaining part of the tip portion of the optical filter which is not accommodated in the through-hole of the ferrule. In this first embodiment, the filter region of the optical filter having the grating is positioned at, of the tip portion of the optical filter, the remaining part which is not accommodated in the through-hole of the ferrule but accommodated in the hollow portion of the flange (see FIG. 6). In the second embodiment, by contrast, the filter region of the optical filter having the grating is positioned at, of the tip portion of the optical filter, the part accommodated in the through-hole of the ferrule (see FIG. 18, or the like).

In the optical connector according to the present invention, when a filter region having a grating is placed so as to extend over the accommodating space of a ferrule and that of a flange, a sufficient filter function cannot be obtained. Accordingly, the whole filter region of the optical filter is accommodated either in the through-hole of the ferrule or in the accommodating space of the flange outside of the ferrule.

As shown in FIG. 6, in the first embodiment, as a first light-blocking structure, a desired adhesive 243 fills a space defined, in the plug 1, by the outer peripheral surface of the filter region 122 positioned at a tip portion 121 (where the coating has been removed) of the optical filter 12 and the inner wall of a hollow portion 242 of the flange 24. This adhesive 243 has a refractive index which is substantially the same as or higher than that of a cladding 124 of the optical filter 12.

Also, as shown in FIG. 12, in the first embodiment, in the space defined, in the plug 1, by the outer peripheral surface of the filter region 122 of the optical filter 12 and the inner wall of the hollow portion 242 of the flange 24, a tubular member 250 surrounding the filter region 122 in a state where the optical filter 12 penetrates therethrough is accommodated as a second light-blocking structure. This tubular member 250 has a refractive index which is substantially the same as or higher than that of the cladding 124 of the optical filter 12. Preferably, in this second light-blocking structure, at least a space defined by the outer peripheral surface of the filter region 122 of the optical filter 12 and the inner wall of the tubular member 250 is filled with a desired adhesive 251. This adhesive 251 has a refractive index which is substantially the same as or higher than that of the cladding 124 of the optical filter 12.

Further, as shown in FIG. 14, in the first embodiment, in the hollow portion of the plug 1, a coating 115 surrounding a grating 126 covers at least the outer peripheral surface of the filter region 122 positioned at the tip of the optical filter 12 as a third light-blocking structure. In this third light-blocking structure, the coating 115 has a refractive index which is substantially the same as or higher than that of the cladding 124 of the optical filter 12.

Next, in the second embodiment of the present invention, the light-blocking structure (fourth light-blocking structure) mentioned above can be realized when a ferrule 13A is constituted by a light-transmitting material which transmits therethrough light having a wavelength coinciding with the reflection wavelength of the grating 126. This light-transmitting material has a refractive index which is substantially the same as or higher than that of the cladding 124 of the optical filter 12. FIG. 18 shows a cross-sectional configuration of the optical connector having the fourth light-blocking structure.

Also, in the second embodiment, the ferrule 13B may comprise a light-absorbing structure for absorbing light having a wavelength coinciding with the reflection wavelength of the grating 126 at a region where, of the light to be reflected by the grating 126, a light component radiated from the grating 126 to the cladding 124 reaches (fifth light-blocking structure). This fifth light-blocking structure has a configuration similar to that of FIG. 18, for example, and can be realized when the ferrule 13B is constituted by a light-absorbing material which absorbs light having a wavelength coinciding with the reflection wavelength of the grating 126. Also, as shown in FIG. 22, the fifth light-blocking structure can be realized when a light-absorbing layer 135 made of a material which absorbs light having a wavelength coinciding with the reflection wavelength of the grating 126 is formed on the inner surface of a through-hole 130 of the ferrule 13C.

Further, as a sixth light-blocking structure in the second embodiment, as shown in FIG. 24, the outer diameter of a predetermined portion of a part, in the tip portion 121 of the optical filter 12c, accommodated in the through-hole of the ferrule 13 where the light to be reflected by the grating 126 reaches may be made smaller than the outer diameter of the rest of the optical filter 12c. In this case, a space defined by the outer peripheral surface of a predetermined portion of the optical filter 12c and the inner wall of the through-hole 130 of the ferrule 13 is filled with a light-absorbing material 136 which absorbs the light having a wavelength coinciding with the reflection wavelength of the grating 126. This light-absorbing material 136 has a refractive index which is substantially the same as or higher than that of the cladding 124 of the optical filter 12c.

As shown in FIGS. 29 to 34, as a seventh light-blocking structure in the second embodiment, the plug 1 may have a structure which restricts the light-emitting opening at one end face 125 of the optical filter 12 to a size smaller than the size of the cross section of the optical filter 12 perpendicular to the optical axis thereof.

Specifically, the seventh light-blocking structure can be realized when the opening of the through-hole 130 of the ferrule 13 positioned on the above-mentioned one end face side with respect to the filter region 122 having the grating 126 in the tip portion 121 of the optical filter 12 accommodated in the through-hole 130 of the ferrule 13 is covered with a first light-blocking member 140 having an opening with a size smaller than that of the one end face 125 of the optical filter 12 (see FIG. 29).

Also, as the seventh light-blocking structure, the size of a first opening of the through-hole 130 of the ferrule 13D positioned on the above-mentioned one end face side with respect to the filter region 122 having the grating 126 may be made smaller than the size of a second opening of the through-hole 130 of the ferrule 13D positioned on the side opposite to the first opening with respect to the filter region 122 by means of a protrusion 141 disposed at the second opening (see FIG. 31).

Further, the seventh light-blocking structure may also be realized when a second light-blocking member 142 having an opening with a size smaller than the cross-sectional size of the optical filter 12 is attached to the one end face 125 of the optical filter 12 accommodated in the through-hole 130 of the ferrule 13 (see FIG. 33). This second light-blocking member 142 is accommodated in the through-hole 130 of the ferrule 13.

Here, each of the above-mentioned configurations of the seventh light-blocking structure restricts the diameter of the above-mentioned end face 125 so as to make it greater than 1.14 times that of the mode field diameter in the optical filter 12 but smaller than the outer diameter of the cladding 124 of the optical filter 12.

As shown in FIGS. 35 to 47, as an eighth light-blocking structure in the second embodiment, the ferrule 13E or 13F may have a structure for exposing a region, in the outer peripheral surface of the tip portion 121 of the optical filter 12 accommodated in the through-hole 130 of the ferrule 13E or 13F, where, of the light to be reflected by the grating 126, a light component radiated from the grating 126 to the cladding 124 reaches.

Specifically, this eighth light-blocking structure can be realized when a cutout portion 190 extending from the outer peripheral surface of the ferrule 13E to the through-hole 130 accommodating the optical filter 12 or a through-hole (window) 191 which connects the outer side face of the ferrule 13F to the inner wall of the through-hole 130 accommodating the tip portion 121 of the optical filter 12 is provided. Preferably, in this structure, of the tip portion 121 of the optical filter 12 accommodated in the through-hole 130 of the ferrule 13E or 13F, the exposed region is covered with a refractive-index matching material 700 having a refractive index which is substantially the same as or higher than that of the cladding 124 of the optical filter 12.

Also, as shown in FIG. 48, as a ninth light-blocking structure in the second embodiment, the filter region 122 of the optical filter 12 having the grating 126 positioned in the through-hole 130 of the ferrule 13 may be spaced from the end face 125 of the tip portion 121 of the optical filter 12 by 3 mm or more.

Next, as shown in FIGS. 54 to 57, as a tenth light-blocking structure in the second embodiment, an enlarged portion 134a having a cross section greater than that near an end face 131 of the ferrule 13G may be disposed on the inner wall of the through-hole 130 of the ferrule 13G. In this configuration, the enlarged portion 134a is positioned at a region where, of the light to be reflected by the grating 126, a light component radiated from the grating 126 to the cladding 124 reaches. When the tip portion 121 of the optical filter 12 is accommodated in the through-hole 130 of the ferrule 13G, a gap 135a is formed by the enlarged portion 134a and the outer peripheral surface of the optical filter 12.

Also, as shown in FIGS. 58 to 70, as an eleventh light-blocking structure in the second embodiment, a groove may be disposed in a region where, of the light to be reflected by the grating 126, a light component radiated from the grating 126 to the cladding 124 reaches, thereby forming a space between the outer peripheral surface of the optical filter 12 and the through-hole 130 of the ferrule 13H, 13I or 13J.

In this eleventh light-blocking structure, as in the case of a groove 135b in FIG. 58, the groove disposed in the inner wall of the through-hole 130 of the ferrule 13H may extend along the center axis of the through-hole 130 from a first end portion of the ferrule 13H toward a second end portion (including the end face 131) opposite to the first end portion.

Also, as in the case of a groove 135c in FIG. 62, the groove disposed in the inner wall of the through-hole 130 of the ferrule 13I may be formed along the circumferential direction of a cross section of the through-hole 130 which is perpendicular to the center axis thereof. Further, as in the case of a groove 135d in FIG. 67, the groove disposed in the inner wall of the through-hole 130 of the ferrule 13J may extend spirally with respect to the center axis of the through-hole 130 from the first end portion of the ferrule 13J toward the second end portion (including the end face 131) opposite to the first end portion.

More preferably, in this eleventh light-blocking structure, a space defined by the outer peripheral surface of the tip portion 121 of the optical filter 12 and the groove 135b to 135d disposed in the inner wall of the through-hole 130 is filled with a refractive-index matching material 800 having a refractive index which is substantially the same as or higher than that of the cladding 124 of the optical filter 12. Here, in the eleventh light-blocking structure, the grooves 135b to 135d are provided in at least a region of the inner wall of the through-hole 130 of the ferrule 13H, 13I or 13J which is positioned on the end face side of the tip portion 121 of the optical filter 12 with respect to the filter region 122 of the optical filter 12 having the grating 126, excluding the end portion (including the end face 131) of the ferrule 13H, 13I or 13J.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art form this detailed description.

DESCRIPTION OF THE PREFERRED EMBODIMENTS

In the following, the optical connector according to the present invention will be explained with reference to FIGS. 1 to 70.

Figure 1:
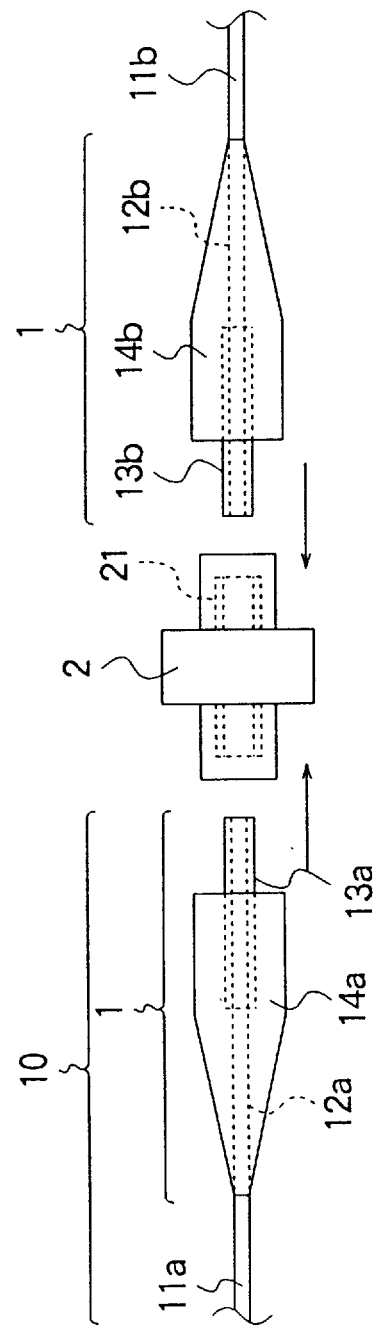
FIG. 1 is a view showing a first basic configuration of the optical. connector according to the present invention for optically connecting optical fiber cables each including a single optical fiber.
Figure 2:
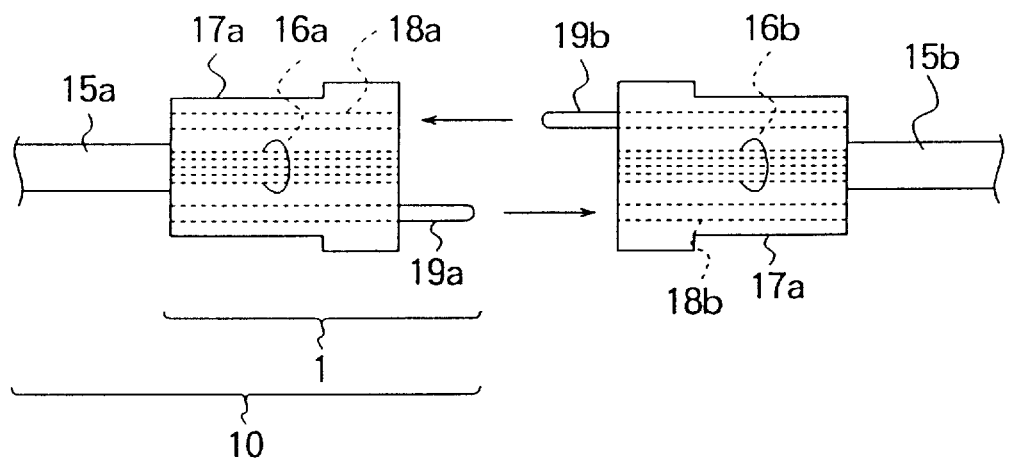
FIG. 2 is a view showing a second basic configuration of the optical connector according to the present invention for optically connecting ribbon type fiber cables each including a plurality of optical fibers.
Figure 3:
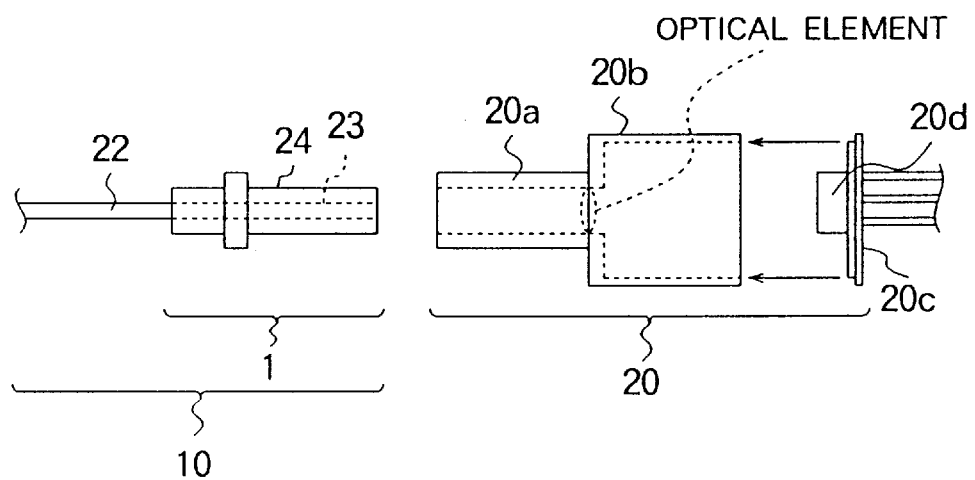
FIG. 3 is a view showing a second basic configuration of the optical connector according to the present invention (for optically connecting a transmission line to an optical element)

The optical connector according to the present invention has, at least, a basic configuration shown in any of FIGS. 1 to 3. For example, FIG. 1 shows an optical connector for optically connecting together optical fiber cables (optical cords) 11a and 11b in which respective single optical fibers 12a and 12b are coated with plastic. In the optical connector of FIG. 1, a plug 1 is attached to a tip portion (where the optical fiber 12a is exposed) of one optical fiber cable 11a. The plug 1 comprises a ferrule 13a attached to the tip portion of the fiber cable 11a, a flange holding an end of the ferrule 13a (see FIGS. 4 and 5), and a cover 14a for protecting the ferrule 13a and the flange. Also, another plug 1 is attached to a tip portion (where the optical fiber 12b is exposed) of the other optical fiber cable 11b. This another plug 1 also comprises a ferrule 13b, a flange (see FIGS. 4 and 5), and a cover 14b. These optical fiber cables 11a and 11b are optically connected to each other by way of an adapter 2 accommodating an alignment sleeve 21. At this time, a part of each of the ferrules 13a and 13b is accommodated in the alignment sleeve 21 in the adapter 2.

In this specification, "optical fiber cable (optical cord)" encompasses not only a cord in which a single optical fiber is plastic-coated but also ribbon type optical cords 15a and 15b in which a plurality of optical fibers 16a and 16b are unitedly plastic-coated, respectively (see FIG. 2). FIG. 2 shows an optical connector for optically connecting together the optical fiber cables (optical cords) 15a and 15b which respectively include a plurality of optical fibers 16a and 16b. A plug 1 is attached to a tip portion (where the optical fiber 16a is exposed) of one optical fiber cable 15a. This plug 1 has a ferrule 17a in which a guide pin hole 18a is formed along the optical fiber 16a while a guide pin 19a is attached to an end face. Also, a ferrule 17b (included in a plug) is attached to a tip portion (where the optical fiber 16b is exposed) of the other optical fiber cable 15b. In this ferrule 17b, a guide hole 18b is formed along the optical fiber 16b while a guide pin 19b is attached to an end face thereof. When one guide pin hole 18a and the other guide pin 19b engage with each other while the other guide pin hole 18b and one guide pin 19a engage with each other, the ferrules 17a and 17b optically connect the optical fiber cables 15a and 15b together.

The above-mentioned plug 1 is also referred to as code-attached optical connector 10 since there are cases where the plug itself is sold as being attached to a tip of the optical fiber cable 11a or 11b (or 15a or 15b), for example. Accordingly, the optical connector according to the present invention encompasses this cord-attached optical connector 10.

Such an optical connector 10 (including the cord-attached optical connector) enables not only the optical connection between light-transmitting lines as shown in FIGS. 1 and 2 but also optical connection between a transmission line and an optical element. FIG. 3 shows a configurational example in which the optical connector (code-attached optical connector) is connected to an optical module 20. Namely, a ferrule 24 (included in the plug 1) attached to a tip portion (where an optical fiber 23 is exposed) of an optical fiber cable 11 is accommodated in a sleeve 20a of the optical module 20. This optical module 20 is constituted by the sleeve 20a, a stem 20c in which an optical element 20d such as a light-receiving element (photo-sensitive device) is mounted on the main surface thereof, and a holder 20b for holding the optical element at a predetermined position.

Figure 4:
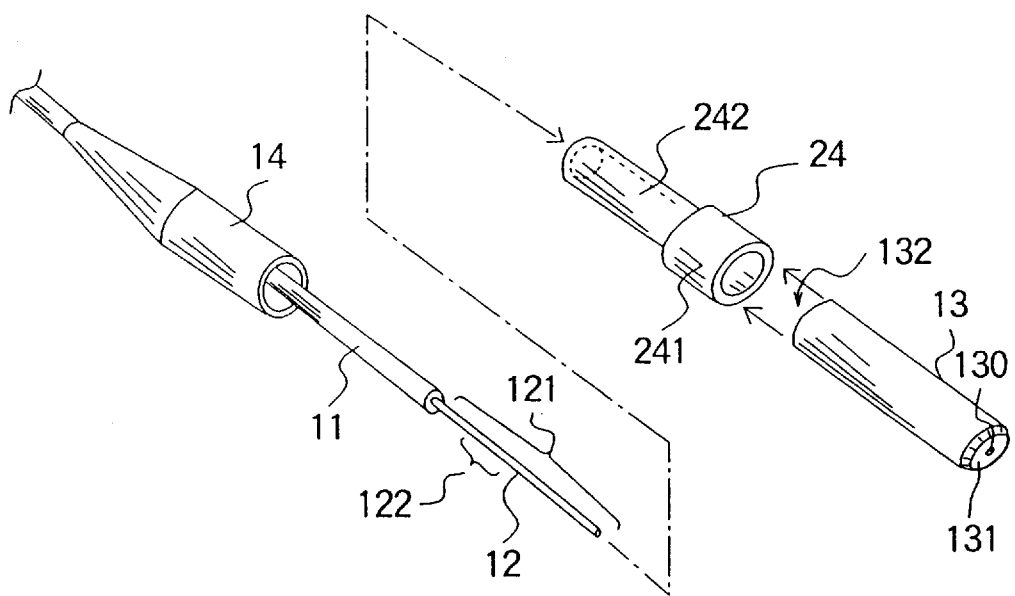
FIG. 4 is a view showing a basic assembling step of the optical connector according to the present invention.

Next, a basic assembling step for the optical connector according to the present invention will be explained with reference to FIG. 4.

First, prepared is the optical fiber cable 11 (including an optical filter) having a waveguide structure formed by a core having a predetermined refractive index and a cladding having a refractive index lower than that of the core and covering the core, in which a grating with a refractive index periodically changing along the longitudinal direction (along the traveling direction of the light propagating therethrough) is formed at a predetermined position in the core. This optical fiber cable is formed as a coating is applied to the outer peripheral surface of an optical fiber 12 (referred to as "optical filter" hereinafter) in which the grating is provided. In particular, in a typical configuration of the optical filter 12 in the optical connector according to the present invention, the coating has been removed from its tip portion 121, and a region having the grating is referred to as a filter region 122.

This optical filter 12 successively penetrates thorough a cover 14 and a flange 24 having a hollow portion 242 and a holding portion 241 for holding a ferrule 13, such that the tip portion 121 from which the coating has been removed is inserted into a through-hole 130 of the ferrule 13. Then, in a state where the ferrule 13 is attached to the tip portion 121 of the optical filter 12, a first end face 131 of the ferrule 13 is polished so as to coincide with an end face 125 of the optical filter 12 (see FIG. 6).

Here, the through-hole 130 has an inner diameter which is substantially the same as the diameter of the optical filter 12. In this specification, "substantially the same" refers to a state where the diameter of the optical filter 12 and the inner diameter of the through-hole 130 coincide with each other to such an extent that the optical filter 12 can be appropriately held.

Figure 5:
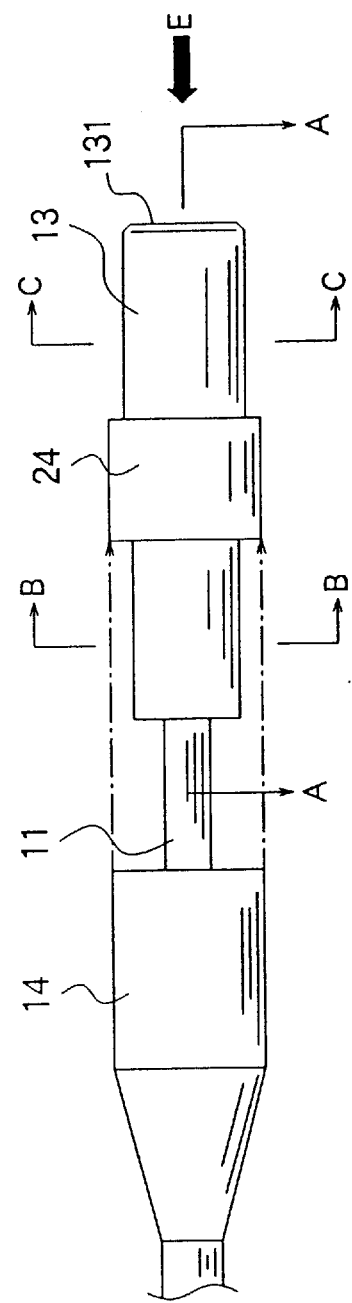
FIG. 5 is a front view showing a basic configuration of the optical connector according to the present invention as a whole.

Then, in a state where a second end face 132 of the ferrule 13 attached to the optical filter 12 is accommodated in the holding portion 241 of the flange 24, the ferrule 13 is fixed to the flange 24. Accordingly, an optical filter such as that shown in FIG. 5 is obtained. Here, the overall basic configuration of the optical connector shown in FIG. 5 is common to optical connectors which will be explained hereinafter. Accordingly, FIG. 5 will be referred to in the following explanation of the optical connectors each time when necessary.

In the following, embodiments of the optical connector according to the present invention will be explained. Here, the optical connector according to the present invention encompasses, according to the position of the grating accommodated therein, the following two embodiments.

Namely, the plug attached to the tip portion 121 of the optical filter 12 is constituted by the ferrule 13 which has the through-hole 130 for accommodating a part of the optical filter 12 (e.g., optical fiber having a grating disposed at a predetermined position in the core) and, while in a state where at least a part of the tip portion 121 of the optical filter 12 is accommodated in the through-hole 130, is attached to this tip portion 121; and the flange 24 having the holding portion 241 to which an end (including the end face 132) of the ferrule 13 is attached and which has the hollow portion 242 for accommodating at least a part of the tip portion 121 of the optical filter 12 which is not accommodated in the through-hole 130 of the ferrule 13. In this first embodiment, the filter region 122 of the optical filter 12 having the grating 126 is positioned at, of the tip portion 121 of the optical filter 12, a part which is not accommodated in the through-hole 130 of the ferrule 13 but accommodated in the hollow portion 242 of the flange 24. In the second embodiment, by contrast, the filter region 122 of the optical filter 12 having the grating 126 is positioned at, of the tip portion 121 of the optical filter 12, a part accommodated in the through-hole 130 of the ferrule 13.

In the optical connector according to the present invention, when the filter region 122 having the grating 126 is placed so as to extend over the accommodating space of the ferrule 13 and that of the flange 24, a sufficient filter function cannot be obtained. In other words, a stress added to a part of the filter region 122 which is accommodated in the ferrule 13 mainly depends on the coefficient of linear expansion of the ferrule 13, and a stress added to a remaining part of the filter region 122 which is a accommodated in the accommodating space of the flange 24 depends on the coefficient of linear expansion of a covering member such as a coating, a filler (adhesive), the flange 24 or the like. If the filter region 122 is covered by members having coefficient of linear expansions different from each other, the stress distribution in a longitudinal direction in the filter region 122 can not be in uniform state. Accordingly, in order to uniform the stress distribution in the longitudinal direction in the filter region 122, the whole filter region 122 of the optical filter 12 is accommodated either in the through-hole 130 of the ferrule 13 or in the accommodating space of the flange 24 outside of the ferrule 13.

In particular, the optical connector according to the present invention has a light-blocking structure for preventing, of the light to be reflected by the grating, a light component which has been radiated from the grating to the cladding so as to be propagated through the cladding toward the above-mentioned one end face of the optical filter from the filter region of the optical filter, in which. the grating is disposed, from advancing. In the following, the respective light-blocking structures will be explained successively from the first to second embodiments with reference to FIGS. 6 to 70.

In this specification, "waveguide" refers to a circuit or line for transmitting signal light having a predetermined wavelength as being confined in a predetermined region by utilizing a difference in refractive index between a core and a cladding, which encompasses optical fiber, thin-film waveguide, and the like. Further, "tip portion" of the optical filter at least includes a part of the optical filter which is accommodated in the plug (constituted by a ferrule only or a ferrule and a flange).

First Embodiment

In the following, a first light-blocking structure of the optical connector in the first embodiment of the present invention will be explained.

Figure 6:
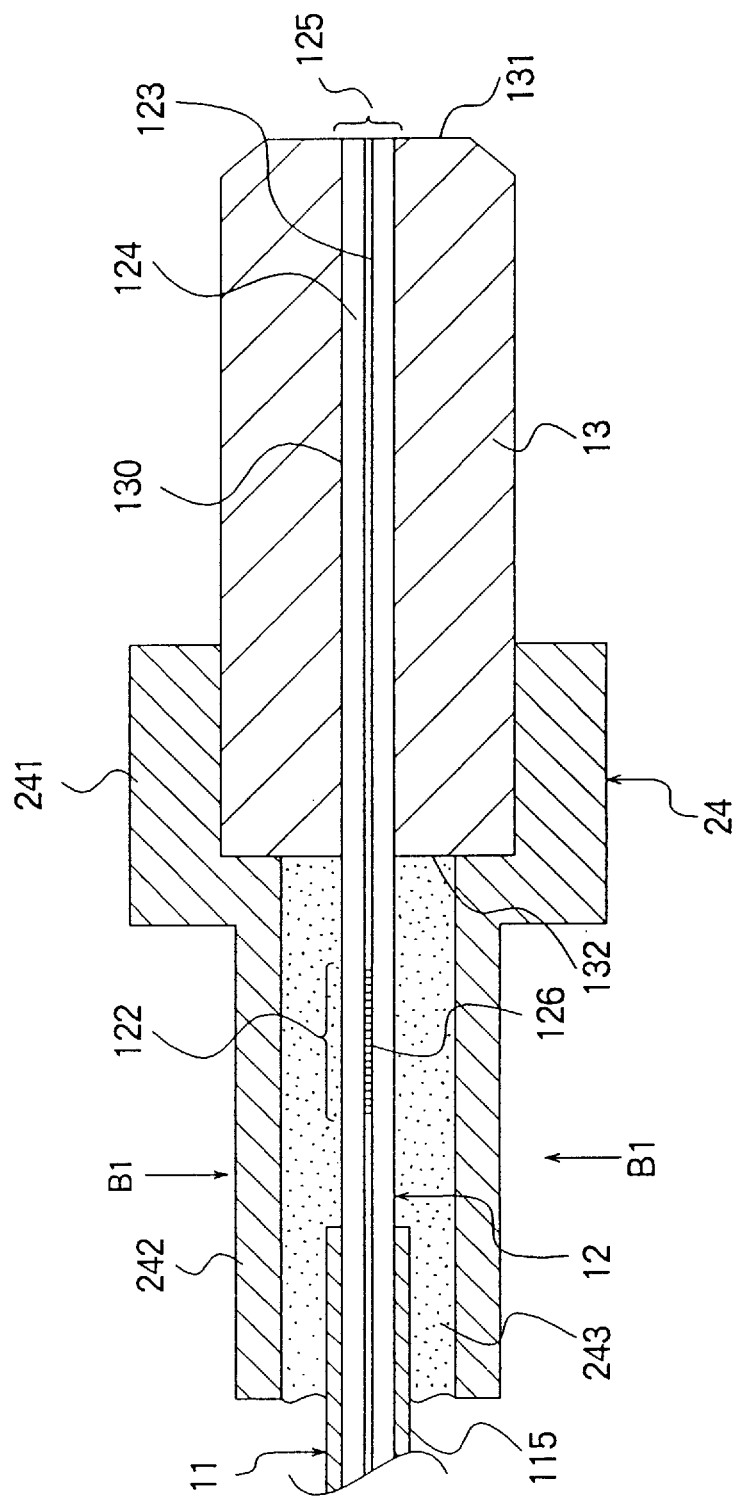
FIG. 6 is a view showing a cross-sectional configuration of the first embodiment (first light-blocking structure) of the optical connector according to the present invention, corresponding to the cross section taken along line A—A of the optical connector shown in FIG. 5.
Figure 7:
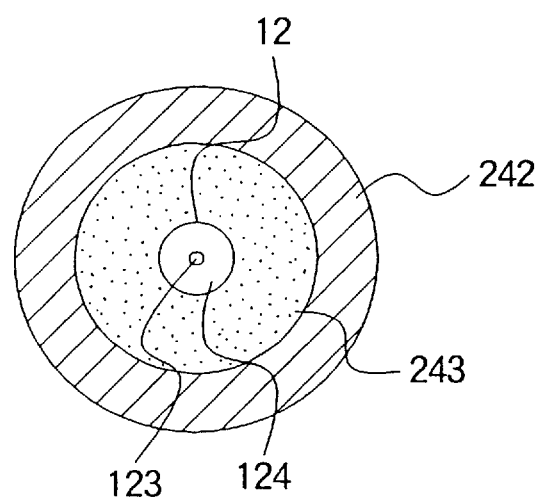
FIG. 7 is a view showing an overall cross-sectional configuration of the optical connector shown in FIG. 6 at a part indicated by arrow B1, corresponding to the cross section taken along line B—B of the optical connector shown in FIG. 5.

FIG. 6 is a lateral cross-sectional view (corresponding to a cross-sectional view taken along line A—A of FIG. 5) showing a configuration of the optical connector according to the present invention having the first light-blocking structure, whereas FIG. 7 is a cross-sectional view (corresponding to a cross-sectional view taken along line B—B of FIG. 5) of the optical connector at a portion indicated by arrow B1 of FIG. 6. This optical connector is constituted by the optical filter 12 which is obtained when the grating 126 is formed in a single-mode optical fiber having a core and a cladding 124; the ferrule 13 for accommodating a tip portion of the optical filter 12 in the through-hole 130 thereof; and the flange 24 having the holding portion 241 to which an end of the ferrule 13 is attached.

The optical filter 12 is supposed to be used in an inspection system for an optical communication network employing an OTDR apparatus. In an optical line constituting the optical communication network, signal light for optical communications is transmitted from a station to a subscriber's terminal, while inspection light from the OTDR apparatus is transmitted in order to inspect the state of the optical line. As the inspection light, light having a wavelength different from that of the signal light is used. When this inspection light enters the subscriber's terminal, it unfavorably becomes a noise in the signal light. Accordingly, it is necessary for an optical filter for cutting off the inspection light to be disposed in the optical line. The optical filter 12, which responds to such necessity, blocks the inspection light as viewed from the subscriber's terminal side by providing the grating 126, which reflects light with a predetermined wavelength, in the core 123 of the optical fiber constituting a part of the optical line.

Though both the core 123 and cladding 124 of the optical filter 12 are mainly composed of silica glass ($SiO_2$); while the cladding 124 is made of substantially pure silica glass, silica glass constituting the core 123 is doped with $GeO_2$ which is a material for increasing the refractive index. As a result, the core 123 has a refractive index higher than that of the cladding 124, thereby forming a relative refractive index difference of about 0.35% between the core 123 and the cladding 124.

The grating 126 is a region in the core 123 where its effective refractive index periodically changes between the minimum refractive index and the maximum refractive index along the optical axis (longitudinal direction) of the optical filter 12. In other words, the grating 126 is a region having a refractive index distribution in which the effective refractive index repeatedly changes between the minimum refractive index and the maximum refractive index along the optical axis. This grating 126 reflects, over a relatively narrow wavelength range centered at a reflection wavelength (Bragg wavelength) which is determined by the period of change in refractive index, i.e., grating period (also known as grating pitch), light having the reflection wavelength of the grating 126. This reflection wavelength of the grating 126 coincides with the wavelength of the above-mentioned inspection light.

The grating 126 can be formed utilizing a phenomenon that, when silica glass doped with germanium is irradiated with ultraviolet rays, the refractive index at the irradiated portion thereof increases by an amount corresponding to the intensity of the ultraviolet rays. Namely, when an interference fringe of ultraviolet rays is irradiated from the surface of the cladding 124 toward the core 123 doped with germanium, a refractive index distribution corresponding to the light intensity distribution of the interference fringe is formed in the core at a region irradiated with the interference fringe. The region having thus formed refractive index distribution is the grating 126. In this case, the minimum refractive index at the portion where the grating 126 is formed substantially coincides with the original effective refractive index (effective refractive index before the ultraviolet irradiation) of the core 123.

Numeral 115 in FIG. 6 refers to a UV-cutoff resin coating which covers the surface of the cladding 124, functioning to protect the core 123 and the cladding 124. The resin coating 115 is eliminated at a tip portion of the optical filter 20 so that the core 123 can be irradiated with ultraviolet rays in order to form the grating 126 therein as mentioned above.

The ferrule 13 is a tubular member made of zirconia surrounding the tip portion 121 of the optical filter 12 from which the resin coating 115 has been removed. The throughhole 130 of the ferrule 13 has an inner diameter of 0.126 mm, while its inner surface is formed as a mirror surface.

The flange 24 is a tubular holding member in which a rear end portion of the ferrule 13 is attached to the holding portion 241 thereof. The hollow portion 242 of the flange 24 has an inner diameter of 1 mm and accommodates, of the optical filter 12, a part (filter region 122) including the grating 126. In the hollow portion 242 of the flange 24, the space between the optical filter 12 and the flange 24 is filled with an adhesive 243, by which the optical filter 12 is fixed to the inside of the flange 24. Here, as the adhesive 243, a resin adhesive having a refractive index substantially the same as that of the cladding 124 is used.

The optical connector according to the present invention is characterized in that the grating 126 is positioned in the hollow portion 242 of the flange 24. As a result, of the light with the reflection wavelength of the grating 126, a light component radiated from the grating 126 to the cladding 124 is reduced, thereby increasing the light-blocking ratio.

First, in the following, explanation will be provided for a fact that light is radiated toward the cladding 124 from the grating 126 formed in a glass region including at least the core 123, thereby lowering the light-blocking ratio of the optical filter 12. The inventors have confirmed the abovementioned fact by conducting an experiment using an apparatus shown in FIG. 8. This experimental apparatus is used for investigating a fact that light having the reflection wavelength of a grating 116 formed in a core of an optical fiber 100 is radiated from the grating 116 toward a cladding. Here, the optical fiber 100 in which the grating 116 has been formed is equivalent to an optical fiber type optical filter. As in the case of the optical filter 12 in this embodiment, the optical fiber 100 is a silica glass-based single-mode fiber whose core is doped with germanium. The grating 116 has a length of 10 mm, a predetermined grating pitch, and a reflection wavelength of about 1,554 nm. The cladding of the optical fiber 100 is coated with a resin material except for both end portions thereof. One end thereof from which the resin coating has been removed is connected to a super luminescent diode (SLD) 200 by way of a fiber adapter 210. The SLD 200 is a semiconductor light-emitting device which outputs light in a predetermined wavelength range including the reflection wavelength of the grating 116. The other end from which the resin coating has been removed is connected to a spectrum analyzer 300 by way of a fiber adapter 310. The grating 116 is spaced from the end face of the spectrum analyzer 300 by a distance d with a portion of the optical fiber 100 from which the resin coating has been removed.

Figure 9:
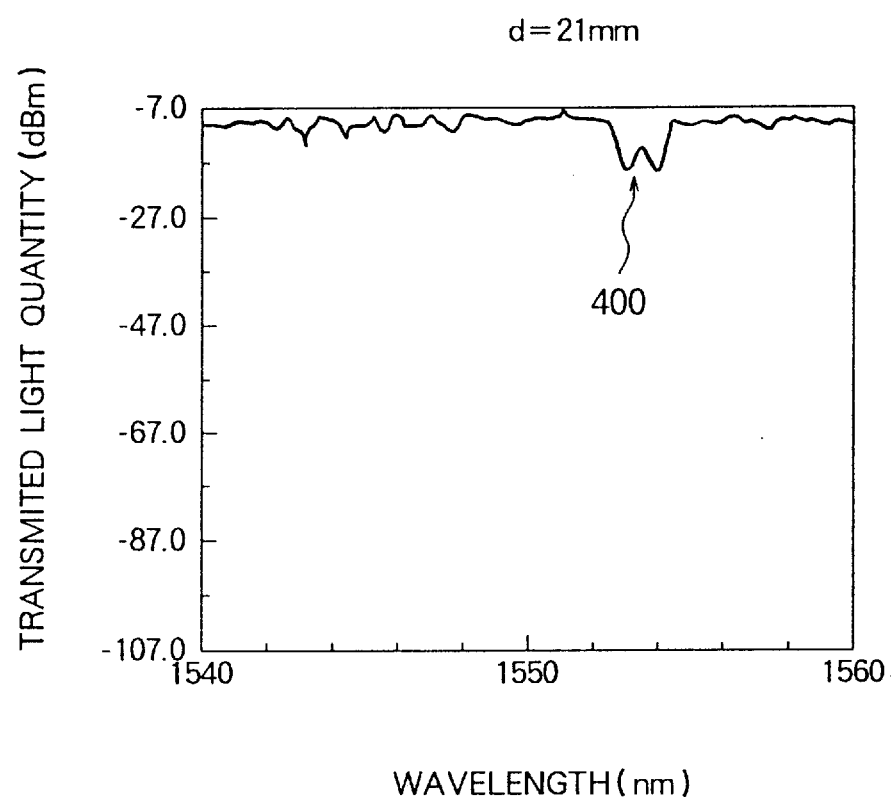
FIGS. 9 and 10 are graphs showing results of the experiment conducted by use of the apparatus shown in FIG. 8, representing the relationship between transmitted light quantity (dBm) and wavelength (nm) when d is 21 mm and 500 mm, respectively.
Figure 10:
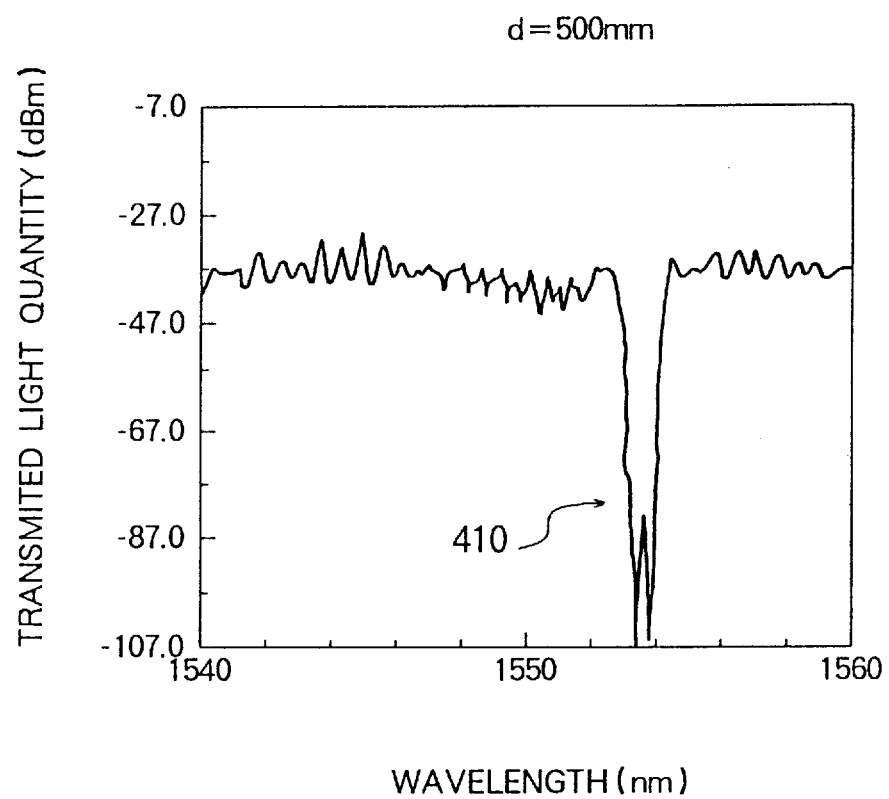

The inventors caused the SLD 200 to emit light so as to make inspection light incident on the optical fiber 100 and detected, by the spectrum analyzer 300, spectra of light transmitted through the portion having the grating 116 for the cases where d was 21 mm (see FIG. 9) and 500 mm (see FIG. 10), respectively. FIGS. 9 and 10 show their corresponding results of detection. While decrease peaks 400 and 410 in the transmitted light quantity due to reflection of light at the grating 116 appear respectively in FIGS. 9 and 10, the decrease peak 400 in the case where d=21 mm is remarkably smaller than the decrease peak 410 in the case where d=500 mm. Namely, the amount of attenuation in transmission of the light having a wavelength to be blocked by the grating 116 in the case where d=21 mm is smaller than that in the case where d=500 mm. Since the grating 116 disposed in the optical fiber 100 has the same configuration regardless of whether d=21 mm or d=500 mm, the difference in amount of attenuation in transmission is not caused by the reflectance of the grating 116 but the difference in distance from the grating 116 to the spectrum analyzer 300.

In view of this fact, the above-mentioned difference in amount of attenuation in transmission is considered as follows. Since the grating 116 includes a portion whose refractive index has locally increased, inconsistency in mode field is generated between the portion where the grating is formed and the other portion. When light having the reflection wavelength of the grating reaches the grating, a part thereof advances through the grating while being reflected thereby. Here, due to the above-mentioned inconsistency in mode field, light radiated from each portion of the grating to the cladding is generated.

Figure 11:
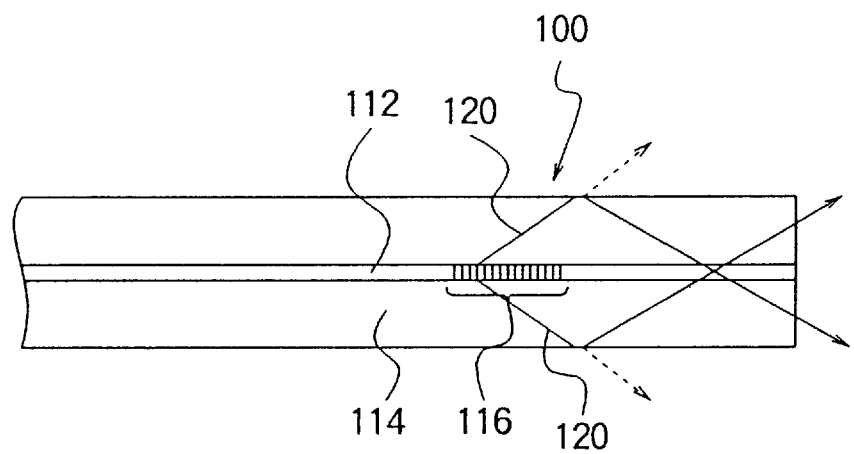
FIG. 11 is a view for explaining how, of light to be reflected by a grating, a light component propagated through a cladding region behaves.

FIG. 11 is a view for explaining how the light radiated from the grating 116 to a cladding behaves. In this drawing, numeral 112 refers to a core of the optical fiber 100, whereas numeral 114 refers to the cladding. Also, numeral 120 refers to light radiated from the grating 116 to the cladding 114. As shown in FIG. 11, such light advances through a region comprising the cladding 114 and the core 112 so as to reach a portion in front of the grating 116. Since the lightconfining effect of the glass region comprising the cladding 114 and the core 112 is weaker than that in the core 112 alone, the light radiated from the grating 116 attenuates its power by a relatively large amount as it advances. Accordingly, as in the case of the above-mentioned results of the experiment, the light having the above-mentioned reflection wavelength detected by the spectrum analyzer 300 becomes less and the decrease peak in the transmitted light quantity becomes greater as the distance from the grating 116 to the spectrum analyzer 300 is greater.

In general, a ferrule of an optical connector is constituted by a material such as zirconia having a high light reflectivity, while its inner surface is formed as a mirror surface. Accordingly, when a tip portion of the optical fiber 100, which is an optical filter, including the grating 116 is accommodated in the ferrule, the light radiated from the grating and then emitted out of the cladding 114 is reflected by the inner surface of the ferrule so as to return to the inside of the cladding 114 and advance to a portion in front of the grating 116, whereby the light-blocking effect by the optical filter having a waveguide structure has not always been attained sufficiently.

In view of such a fact, the optical connector according to the present invention is provided. Namely, in the optical connector of FIG. 6, of the optical fiber type optical filter 12, a part (filter region 122) including the grating 126 is accommodated in the hollow portion 242 of the flange 24. Since the adhesive 243 does not have a reflectivity as high as that of the ferrule 13, of the light having a wavelength corresponding to the reflection wavelength of the grating 126 (light to be reflected by the grating 126), a light component radiated from the grating 126 to the cladding 124 advances while leaking into the adhesive 243 placed around the cladding 124. Thereafter, while the light radiated from the grating 126 reaches the part of the optical filter 12 accommodated in the through-hole 130 of the ferrule 13, a component of the light radiated from the grating 126 which has leaked into the adhesive 243 is blocked by the end face 132 of the ferrule 13 and cannot advance further therefrom. Consequently, of the light having the reflection wavelength of the grating 126, an undesirable light component which is radiated to the cladding 124 and then passes through the grating 126 has a reduced power, whereby the optical connector of FIG. 6 (first light-blocking structure) can block, of the light to be reflected by the grating 126, a light component which has not been reflected thereby (referred to as "radiated light" hereinafter).

Further, in the optical connector of FIG. 6, since the adhesive having a refractive index substantially the same as that of the cladding 124 fills the space between the optical filter 12 and the flange 24, the light radiated from the grating 126 is hardly reflected by the outer surface of the cladding 124. Accordingly, the radiated light from the grating 126 extends to the adhesive 243 quite easily, whereby the radiated light can be blocked with a very high ratio.

In the following, a second light-blocking structure of the optical connector in accordance with the first embodiment will be explained.

Figure 12:
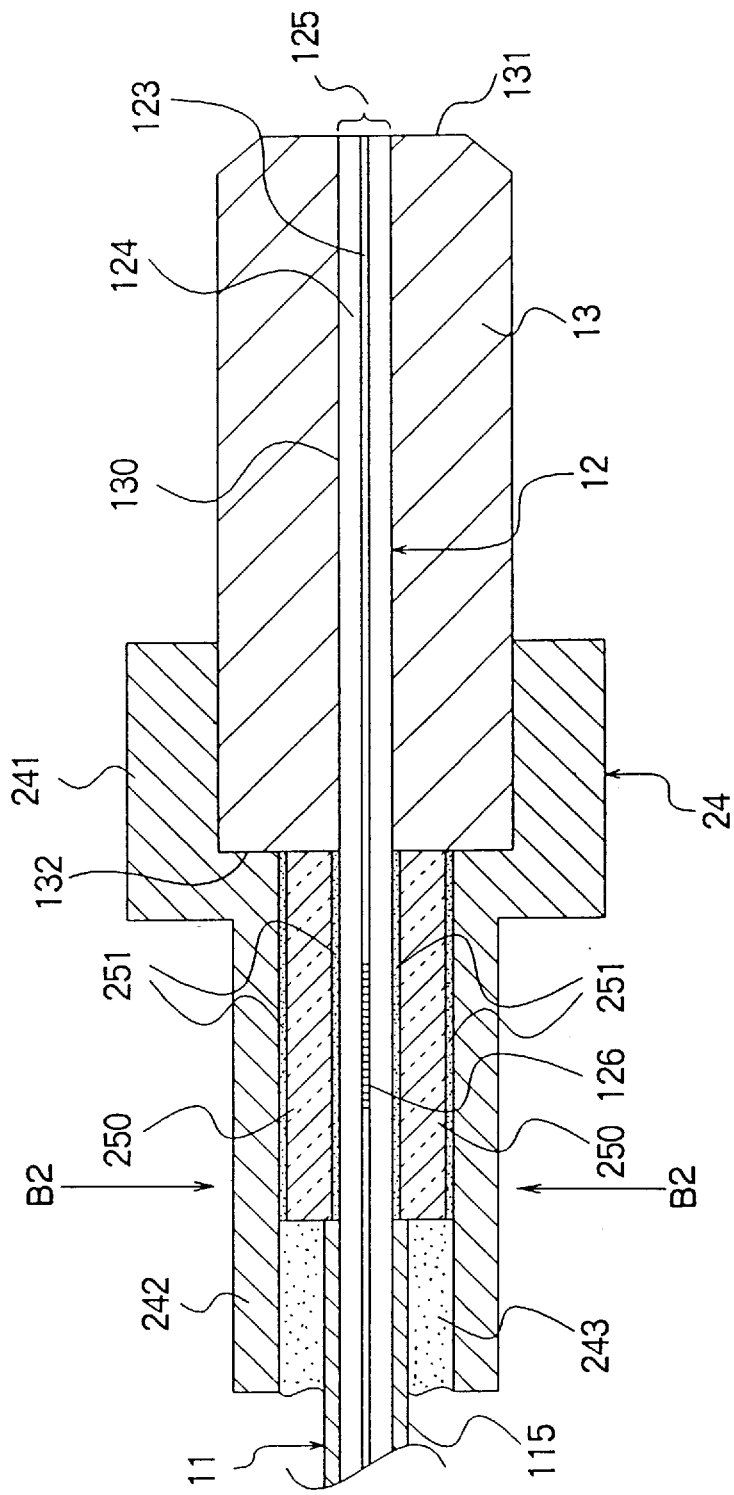
FIG. 12 is a view showing a cross-sectional configuration of the first embodiment (second light-blocking structure) of the optical connector according to the present invention, corresponding to the cross section taken along line A—A of the optical connector shown in FIG. 5.
Figure 13:
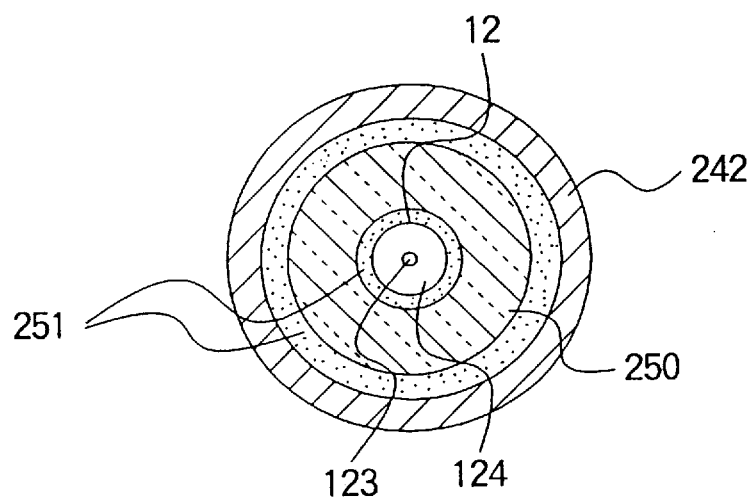
FIG. 13 is a view showing an overall cross-sectional configuration of the optical connector shown in FIG. 12 at a part indicated by arrow B2, corresponding to the cross section taken along line B—B of the optical connector shown in FIG. 5.

FIG. 12 is a lateral cross-sectional view (corresponding to a cross-sectional view taken along line A—A of FIG. 5) showing a configuration of the optical connector according to the present invention having the second light-blocking structure. FIG. 13 is a cross-sectional view (corresponding to a cross-sectional view taken along line B—B of FIG. 5) of the optical connector at a portion indicated by arrow B2 of FIG. 12. In this optical connector, between the tip portion 121 of the optical filter 12 from which the coating 115 has been removed and the hollow portion 242 of the flange 24, a tubular member 250 surrounding the outer peripheral surface of the cladding 124 of the optical filter 12 is disposed. The tubular member 250 has an inner diameter of 0.14 mm, while the tip portion 121 of the optical filter 12 penetrates through the tubular member 250. Also, the grating 126 is positioned within the tubular member 250. Disposed between the optical filter 12 and the tubular member 250 is an adhesive 251, by which the tubular member 250 is fixed to the outer peripheral surface of the optical filter 12. The adhesive 251 also intervenes between the tubular member 250 and the hollow portion 242 of the flange 24, whereby the tubular member 250 is fixed onto the inner surface of the hollow portion 242 of the flange 24. The adhesive 251 has a refractive index substantially the same as that of the cladding 124 of the optical filter 12, whereas the tubular member 250 has a refractive index substantially the same as that of the adhesive 251 and that of the cladding 124.

In the optical connector of FIG. 12, of the light having the reflection wavelength of the grating 126, a leaking light component radiated from the grating 126 to the cladding 124 advances while leaking into the adhesive 251 and the tubular member 250. In particular, in the optical connector of FIG. 12, since the adhesive 251 and the tubular member 250 have a refractive index substantially the same as that of the cladding 124, the light radiated from the grating 126 (leaking light component) extends to the adhesive 251 and the tubular member 250 quite easily. Thereafter, while the light radiated from the grating 126 reaches the part of the optical filter 12 accommodated in the through-hole 130 of the ferrule 13, of the light radiated from the grating 126, at least a leaking light component which has been distributed into the adhesive 251 and the tubular member 250 is blocked by the ferrule 13 and cannot advance further therefrom. Consequently, of the light having the reflection wavelength of the grating 126, a light component radiated to the cladding 124 has a reduced power, whereby the optical connector of FIG. 12 can block the light radiated from the grating 126 with a very high ratio.

Further, in this second light-blocking structure, since the tubular member 250 is disposed within the hollow portion 242 instead of filling the whole hollow portion 242 in the flange 24 with the adhesive 243, the amount of the adhesive becomes smaller than that in the first light-blocking structure. Accordingly, such a phenomenon that the adhesive 243 contracts upon curing so as to impart a stress to the grating 126 and thereby fluctuate characteristics of the grating 126 is prevented from occurring. Consequently, the optical connector of FIG. 12 can securely exhibit a desired filter function.

In the following, a third light-blocking structure of the optical connector in accordance with the first embodiment of the present invention will be explained.

Figure 14:
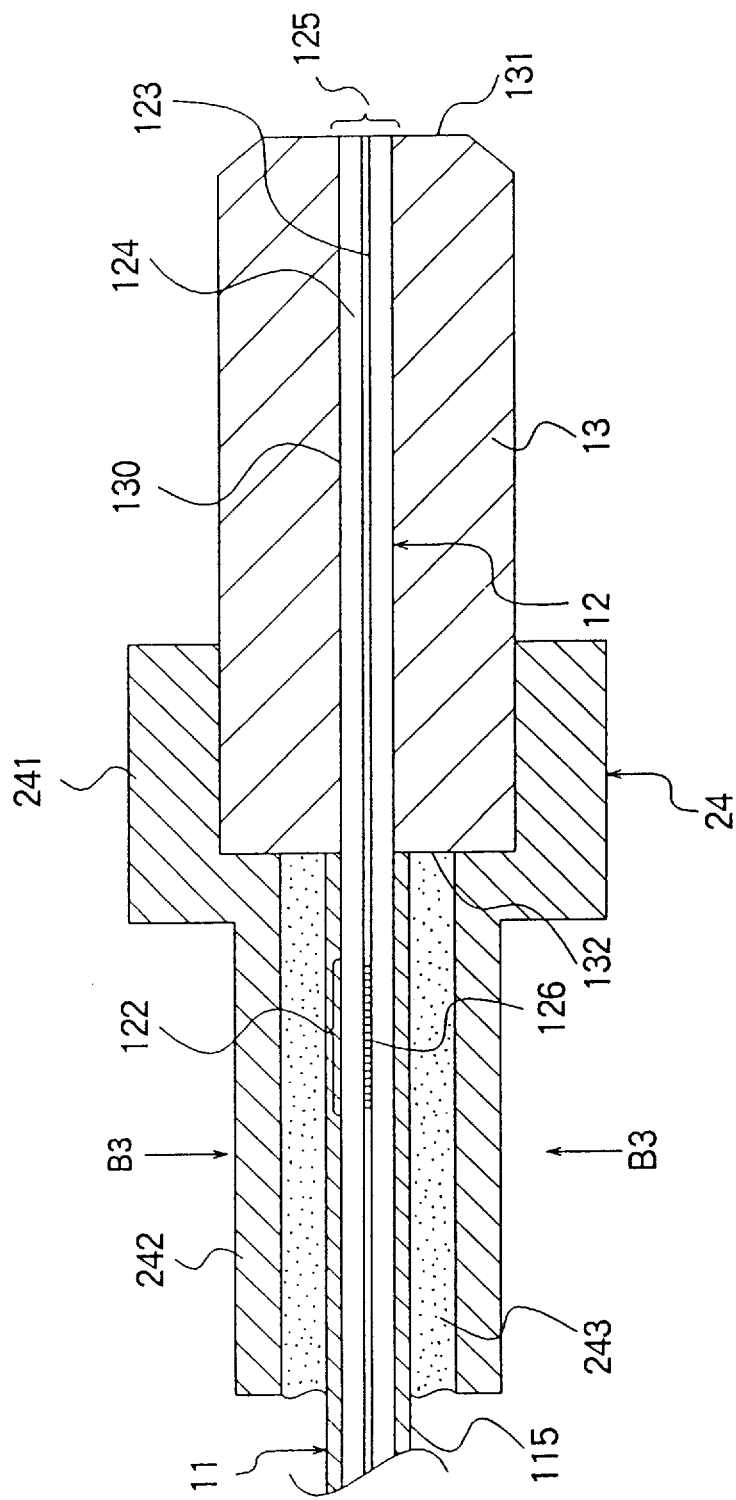
FIG. 14 is a view showing a cross-sectional configuration of the first embodiment (third light-blocking structure) of the optical connector according to the present invention, corresponding to the cross section taken along line A—A of the optical connector shown in FIG. 5.
Figure 15:
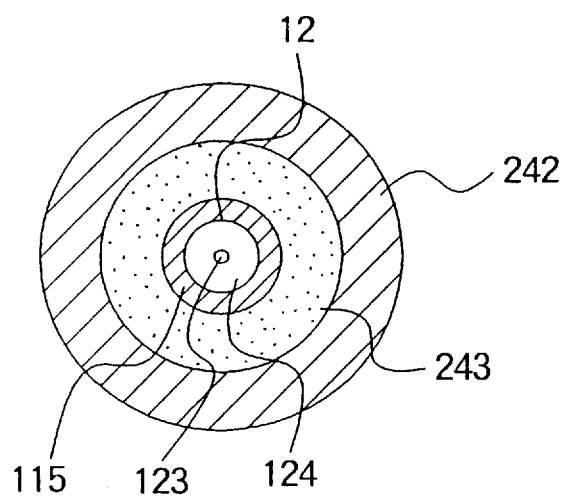
FIG. 15 is a view showing an overall cross-sectional configuration of the optical connector shown in FIG. 14 at a part indicated by arrow B3, corresponding to the cross section taken along line B—B of the optical connector shown in FIG. 5.

FIG. 14 is a lateral cross-sectional view (corresponding to a cross-sectional view taken along line A—A of FIG. 5) showing a configuration of the optical connector according to the present invention having the third light-blocking structure. FIG. 15 is a cross-sectional view (corresponding to a cross-sectional view taken along line B—B of FIG. 5) of the optical connector at a portion indicated by arrow B3 of FIG. 14. The optical connector of FIG. 14 differs from that of FIG. 6 in the configuration of the optical filter cable 11 accommodated therein. Namely, in the optical filter cable 11 in FIG. 12, the UV-cutoff resin coating 115 is disposed around the filter region 122 including the grating 126. This optical filter cable 11 is obtained by a method comprising the steps of removing the coating 115 from a predetermined part of an optical fiber; irradiating this part with a ultraviolet interference fringe to form the grating 126; and then forming the coating 115 at this part again. Here, this coating 115 has a refractive index substantially the same as that of the cladding 124 of the optical filter 12.

The space between the optical filter 12 and the hollow portion 242 of the flange 24 in FIG. 14 is filled with the adhesive 243, by which the optical filter 12 is fixed to the inside of the hollow portion 242. Here, the adhesive 243 has a refractive index substantially the same as that of the cladding 124 and that of the coating 115.

In the optical connector of FIG. 14, of the light having the reflection wavelength of the grating 126, the light component radiated from the grating 126 to the cladding 124 advances while leaking into the coating 115 and the adhesive 243. In particular, in the third light-blocking structure, since the coating 115 and the adhesive 243 have a refractive index substantially the same as that of the cladding 124, the light radiated from the grating 126 extends to the coating 115 and the adhesive 243 quite easily. Thereafter, while the light radiated from the grating 126 reaches the part of the optical filter 12 accommodated in the through-hole 130 of the ferrule 13, a leaking light component of the light radiated from the grating 126 which has been propagated through the coating 115 and the adhesive 243 is blocked by the ferrule 13 and cannot advance further therefrom. Consequently, of the light having the reflection wavelength of the grating 126, a light component which is radiated to the cladding 124 has a reduced power, whereby the optical connector of FIG. 14 can block the radiated light with a very high ratio.

Further, in this third light-blocking structure, unlike the first light-blocking structure, since the coating 115 is formed around the filter region 122, influence of the stress imparted to the grating 126 when the adhesive 243 contracts upon curing is reduced, whereby fluctuation in characteristics of the grating 126 becomes less. Accordingly, the optical connector of FIG. 14 having the third light-blocking structure can securely exhibit a desired filter function.

As explained in detail in the foregoing, in the optical connector in the first embodiment of the present invention (first to third light-blocking structures), the light radiated from the grating of the optical filter advances while leaking into the gap between the optical filter and the flange and then is blocked by the end face of the ferrule. Consequently, unnecessary radiated light from the grating is reduced, whereby the optical connector in the first embodiment of the present invention has a high light-blocking ratio.

Second Embodiment

In the following, a fourth light-blocking structure of the optical connector in the second embodiment of the present invention will be explained.

Figure 16:
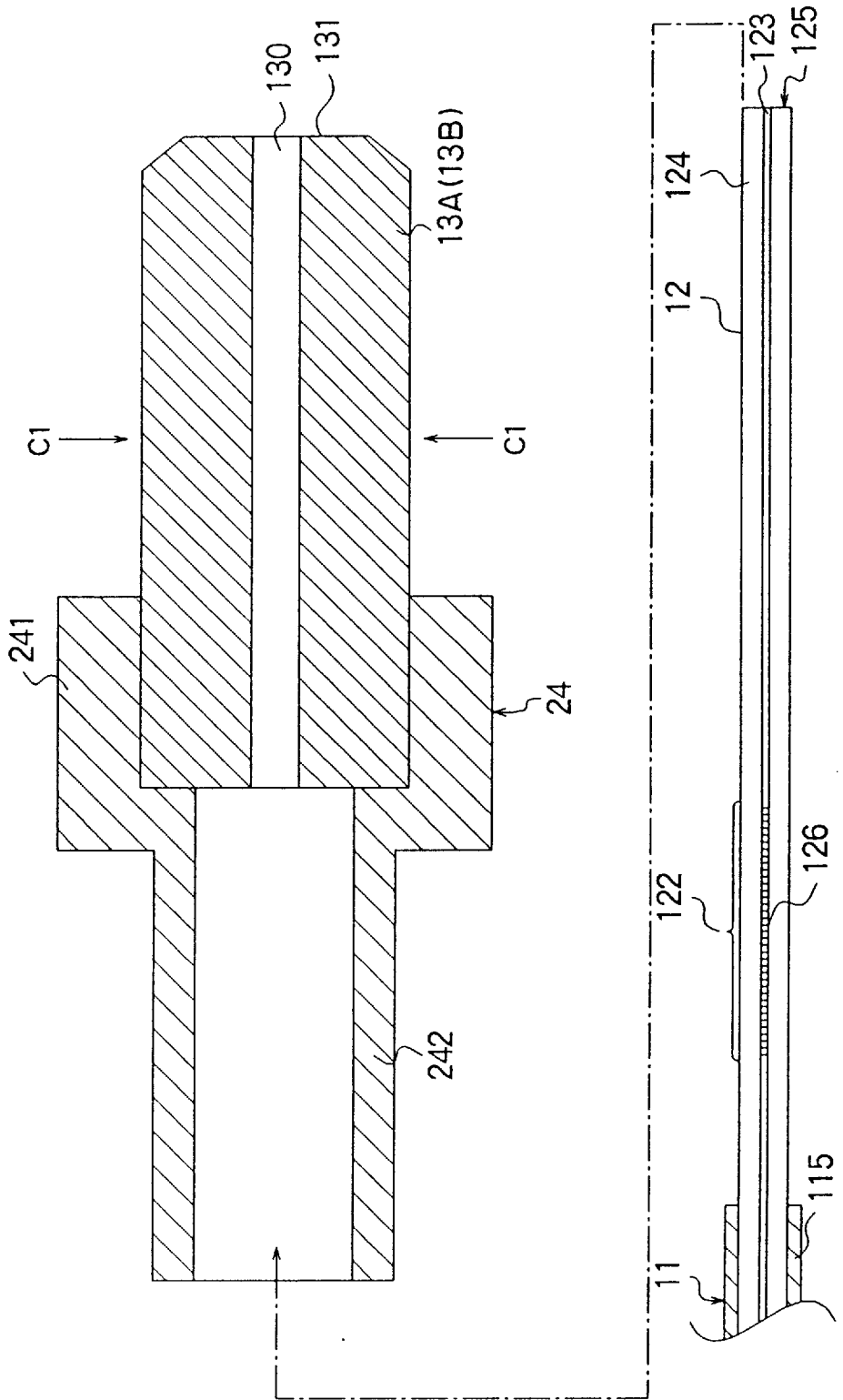
FIG. 16 is a view showing a part of an assembling step for the second embodiment of the optical connector according to the present invention (fourth light-blocking structure and first applied example of fifth light-blocking structure), corresponding to the cross section taken along line A—A of the optical connector shown in FIG. 5.
Figure 17:
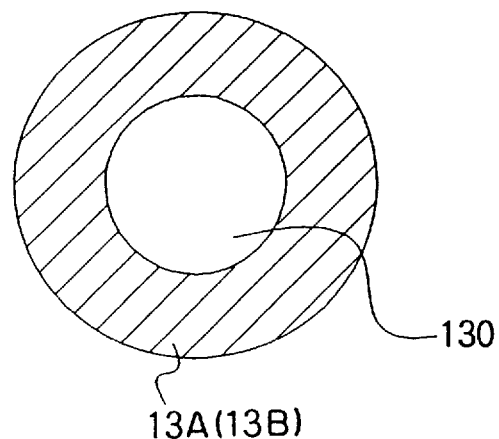
FIG. 17 is a view showing an overall cross-sectional configuration of the optical connector shown in FIG. 16 at a part indicated by arrow C1, corresponding to the cross section taken along line C—C of the optical connector shown in FIG. 5.

FIG. 16 is a lateral cross-sectional view (corresponding to a cross-sectional view taken along line A—A of FIG. 5) of each member, showing a part of an assembling step for the optical connector according to the present invention having the fourth light-blocking structure; whereas FIG. 17 is a cross-sectional view (corresponding to a cross-sectional view taken along line C—C of FIG. 5) of the optical connector at a portion indicated by arrow C1 of FIG. 16. This optical connector is used for connecting the optical fiber type optical filter 12 to another optical element (e.g., optical fiber or semiconductor device) and adapted to accommodate the optical filter 12 therein. Specifically, the optical connector is constituted by the ferrule 13A having the though-hole 130 for accommodating the tip portion 121 of the optical filter 12 therein and the flange 24 having the holding portion 241 to which the rear end portion of the ferrule 13A is attached.

Next, with reference to FIGS. 16 and 17, the fourth light-blocking structure of the optical connector according to the present invention will be explained. The ferrule 13A is a member for surrounding and holding the tip portion 121 of the optical filter 12 from which the resin coating 115 has been removed. In the center of the ferrule 13, the through-hole 130 extends along the center axis of the ferrule 13A. The tip portion 121 of the optical filter 12 is inserted into the though-hole 130. The flange 24 is a tubular holding member in which the rear end portion of the ferrule 13A is attached to the holding portion 241 thereof. In the hollow portion 242 of the flange 24, the part of the optical filter 12 covered with the resin coating 115 is accommodated.

As the fourth light-blocking structure in the optical connector of FIG. 16, the ferrule 13A is constituted by a light-transmitting material which transmits therethrough the light having the reflection wavelength of the grating 126. Accordingly, when the optical filter 12 is accommodated in the optical connector of FIG. 16, of the light having the reflection wavelength of the grating 126, an unnecessary radiated light component radiated from the grating 126 to the cladding 124 is transmitted though the ferrule 13A so as to be radiated to the outside. As a result, the light-blocking ratio of the optical filter 12 is increased. Here, as the above-mentioned light-transmitting material, various kinds of materials can be used, though those transmitting the light having the reflection wavelength of the grating 126 with a higher ratio is more preferable. As a specific example of this light-transmitting material, optical glass such as silica glass is suitable.

In the conventional optical connector, the ferrule is constituted by a material with a high light reflectivity such as zirconia, while the inner surface thereof is formed as a mirror surface. Accordingly, as can be seen from the experiment explained with reference to FIGS. 8 to 11, when the tip portion of the optical fiber 100 including the grating 116 is accommodated in the ferrule, the light radiated from the grating 116 so as to be emitted out of the cladding 114 is reflected by the inner surface of the ferrule so as to return to the inside of the cladding 114 and then advances to a part in front of the grating 116, whereby the light-blocking effect by the optical filter has not always been attained sufficiently.

In view of such a fact, the fourth light-blocking structure of the optical connector according to the present invention is provided. Namely, when the optical filter 12 is accommodated in the optical connector having the fourth light-blocking structure, of the light having the reflection wavelength of the grating 126, a light component which is radiated from the grating 126 to the cladding 124 and then reaches the outer surface of the cladding 124 so as to be emitted out of the cladding 124 is transmitted though the ferrule 13A so as to be radiated therefrom to the outside. Accordingly, it is hard to generate such a phenomenon that the leaking light component radiated from the grating 126 to the cladding 124 is emitted out of the cladding 124 and then is reflected by the inner surface of the ferrule 13A so as to return to the inside of the optical filter 12 and advance to a portion in front of the grating 126. Consequently, of the light having the reflection wavelength of the grating 126, the leaking light component radiated to the cladding 124 so as to pass through the filter region 122 has a reduced power, whereby the optical connector having the fourth light-blocking structure increases the light-blocking ratio of the optical filter 12.

Here, in the case where the light-transmitting material constituting the ferrule 13A has a refractive index which substantially coincides with that of the surface layer portion of the cladding 124 of the optical filter 12, when the optical filter 12 is accommodated in the optical connector, the light radiated from the grating 126 is hardly reflected by the interface between the optical filter 12 and the ferrule 13A. Consequently, the light radiated from the grating 126 is transmitted through the ferrule 13A quite efficiently, whereby the light-blocking ratio of the optical filter 12 can be increased very much.

Also, in the case where the light-transmitting material constituting the ferrule 13A has a refractive index higher than that of the surface layer portion of the cladding 124 of the optical filter 12, when the optical connector 12 is accommodated in the optical connector, the light radiated from the grating 126 is hard to be totally reflected by the interface between the optical filter 12 and the ferrule 13A. Consequently, the light radiated from the grating 126 is transmitted through the ferrule 13A efficiently, whereby the light-blocking ratio of the optical filter 12 can be increased greatly.

Figure 18:
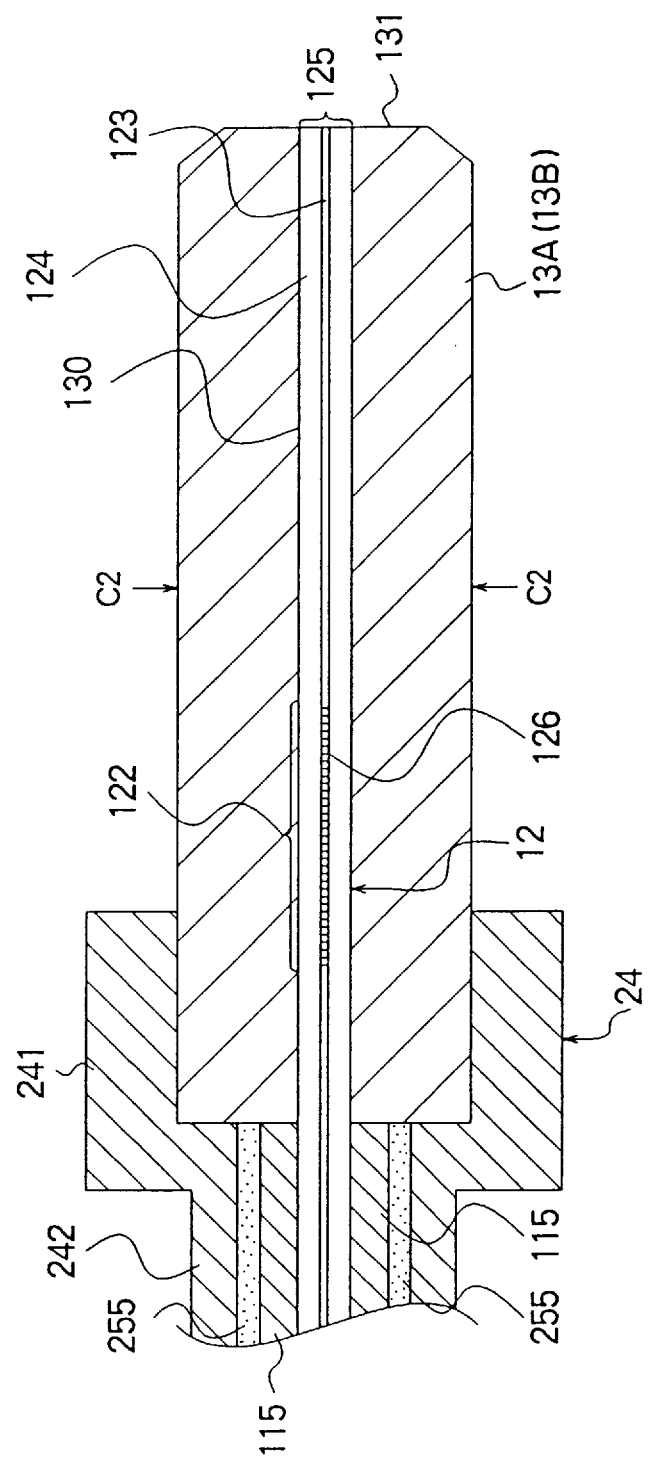
FIG. 18 is a view showing a cross-sectional configuration of the second embodiment of the optical connector according to the present invention (fourth light-blocking structure and first applied example of fifth light-blocking structure), corresponding to the cross section taken along line A—A of the optical connector shown in FIG. 5.
Figure 19:
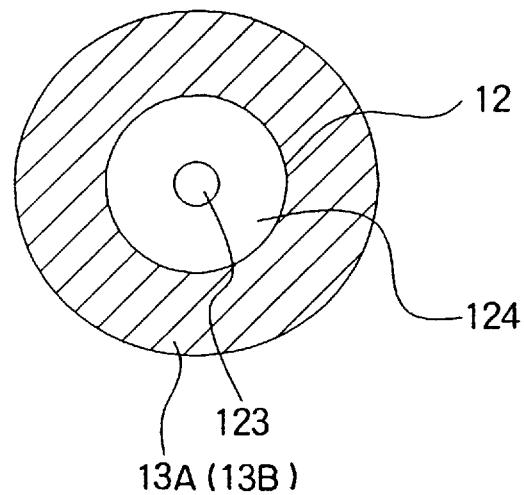
FIG. 19 is a view showing an overall cross-sectional configuration of the optical connector shown in FIG. 18 at a part indicated by arrow C2, corresponding to the cross section taken along line C—C of the optical connector shown in FIG. 5.

FIG. 18 is a lateral cross-sectional view (corresponding to a cross-sectional view taken along line A—A of FIG. 5) showing the optical connector obtained by way of the assembling step of FIG. 16. FIG. 19 is a cross-sectional view (corresponding to a cross-sectional view taken along line C—C of FIG. 5) of the optical connector at a portion indicated by arrow C2 of FIG. 18. The tip portion 121 of the optical filter 12 from which the resin coating 115 has been removed is inserted into the through-hole 130 of the ferrule 13A, while the grating 126 is also accommodated in the through-hole 130 of the ferrule 13A. In the hollow portion 242 of the flange 24, the portion of the optical filter 12 covered with the resin coating 115 is accommodated. The space between the coating 115 of the optical filter 12 and the hollow portion 242 of the flange 24 is filled with an adhesive 255, by which the optical filter 12 is fixed to the inside of the hollow portion 242 of the flange 24.

In the optical connector of FIG. 18, of the light radiated from the grating 126 to the cladding 124 so as to reach the outer surface of the cladding 124, the leaking light component radiated to the outside of the cladding 124 is transmitted through the ferrule 13A so as to be radiated to the outside. Consequently, of the light having the reflection wavelength of the grating 126, the unnecessary radiated light component radiated to the cladding 124 so as to pass through the filter region 122 has a reduced power. Accordingly, the optical connector having the fourth light-blocking structure has a high light-blocking ratio and can also be favorably used as a constituent for an inspection system for optical lines.

As explained in detail in the foregoing, in the optical connector having the fourth light-blocking structure, when an optical fiber type optical filter is accommodated therein, the light radiated from the grating of the optical filter is transmitted though the ferrule so as to be radiated to the outside. Accordingly, the light component passing though the filter region so as to advance to a portion in front of the grating is reduced, whereby the light-blocking ratio of the optical filter can be increased.

In the following, a fifth light-blocking structure of the optical connector in the second embodiment of the present invention will be explained.

As the fifth light-blocking structure in the optical connector according to the present invention, the ferrule 13B is constituted by a light-absorbing material which absorbs light having the reflection wavelength of the grating 126 (first applied example). Here, since the manufacture and configuration of the optical connector in the first applied example of the fifth light-blocking structure are the same as those (FIGS. 16–19) explained in the foregoing except for the ferrule 13, they will not be explained in the following. In the optical connector in which the first applied example of the fifth light-blocking structure is adopted, of the light having the reflection wavelength of the grating 126, the unnecessary radiated light component radiated from the grating 126 to the cladding 124 is absorbed by the ferrule 13B, whereby the light-blocking ratio of the optical filter 12 is increased. Here, as the above-mentioned light-absorbing material, while various kinds of materials can be used according to the reflection wavelength of the grating 126, those absorbing the light having the reflection wavelength of the grating 126 with a higher ratio are more preferable. For example, the ferrule 13B may be made of glass doped with praseodymium, which is a rare earth element, when the reflection wavelength is at 1.3-$\mu$m band; whereas it may be made of glass or polyimide resin doped with erbium, which is a rare earth element, when the reflection wavelength is at 1.55-$\mu$m band.

In the conventional optical connector, the ferrule is constituted by a material with a high light reflectivity such as zirconia, while the inner surface thereof is formed as a mirror surface. Accordingly, as can be seen from the experiment explained with reference to FIGS. 8 to 11, when the tip portion of the optical fiber 100, which is an optical filter, including the grating 116 is accommodated in the ferrule, the light radiated from the grating 116 so as to be emitted out of the cladding 114 is reflected by the inner surface of the ferrule so as to return to the inside of the cladding 114 and then advances to a part in front of the grating 116, whereby the light-blocking effect by the optical filter has not always been attained sufficiently.

In view of such a fact, the optical connector according to the present invention having the fifth light-blocking structure (first applied example) is provided. Namely, when the optical filter 12 is accommodated in the optical connector having the fifth light-blocking structure (first applied example), of the-light having the reflection wavelength of the grating 126, a light component which is radiated from the grating 126 to the cladding 124 and then reaches the outer surface of the cladding 124 so as to be emitted out of the cladding 124 is absorbed by the ferrule 13B. Accordingly, suppressed is such a phenomenon that the light radiated from the grating 126 to the cladding 124 is emitted out of the cladding 124 and then is reflected by the inner surface of the through-hole 130 of the ferrule 13B so as to return to the inside of the optical filter 12 and advance to a portion in front of the grating 126. Consequently, of the light having the reflection wavelength of the grating 126, the unnecessary radiated light component which is radiated to the cladding 124 so as to pass through the filter region 122 has a reduced power, whereby the optical connector having the fifth light-blocking structure (first applied example) increases the light-blocking ratio of the optical filter 12.

Here, in the case where the light-absorbing material constituting the ferrule 13B has a refractive index which substantially coincides with that of the surface layer portion of the cladding 124 of the optical filter 12 in the fifth light-blocking structure (first applied example), the light radiated from the grating 126 is hardly reflected by the interface between the optical filter 12 and the ferrule 13B. Consequently, the light radiated from the grating 126 is absorbed by the ferrule 13B quite efficiently, whereby the light-blocking ratio of the optical filter 12 can be increased very much.

Also, in the case where the light-absorbing material constituting the ferrule 13B has a refractive index higher than that of the surface layer portion of the cladding 124 of the optical filter 12 in the fifth light-blocking structure (first applied example), the light radiated from the grating 126 is hard to be totally reflected by the interface between the optical filter 12 and the ferrule 13B. Consequently, the light radiated from the grating 126 is absorbed by the ferrule 13B efficiently, whereby the light-blocking ratio of the optical filter 12 can be increased greatly.

The configuration of the optical connector having the ferrule 13B made of the light-absorbing material as the fifth light-blocking structure (first applied example) is the same as that of the optical connector having the fourth light-blocking structure shown in FIGS. 18 and 19. The tip portion 121 of the optical filter 12 from which the resin coating 115 has been removed is inserted into the through-hole 130 of the ferrule 13B, while the grating 126 is also accommodated in the through-hole 130 of the ferrule 13B. In the hollow portion 242 of the flange 24, the portion of the optical filter 12 covered with the resin coating 115 is accommodated. The space between the coating 115 of the optical filter 12 and the hollow portion 242 of the flange 24 is filled with the adhesive 255, by which the optical filter 12 is fixed to the inside of the hollow portion 242 of the flange 24.

In the optical connector having the fifth light-blocking structure (first applied example), of the light radiated from the grating 126 to the cladding 124 so as to reach the outer surface of the cladding 124, the light component radiated to the outside of the cladding 124 is absorbed by the ferrule 13B. Consequently, of the light having the reflection wavelength of the grating 126, the light component radiated to the cladding 124 so as to pass through the filter region 122 has a reduced power. Accordingly, the optical connector having the fifth light-blocking structure (first applied example) has a high light-blocking ratio and can also be favorably used as a constituent for an inspection system for optical lines.

In the following, the fifth light-blocking structure (second applied example) of the optical connector in the second embodiment of the present invention will be explained.

Figure 20:
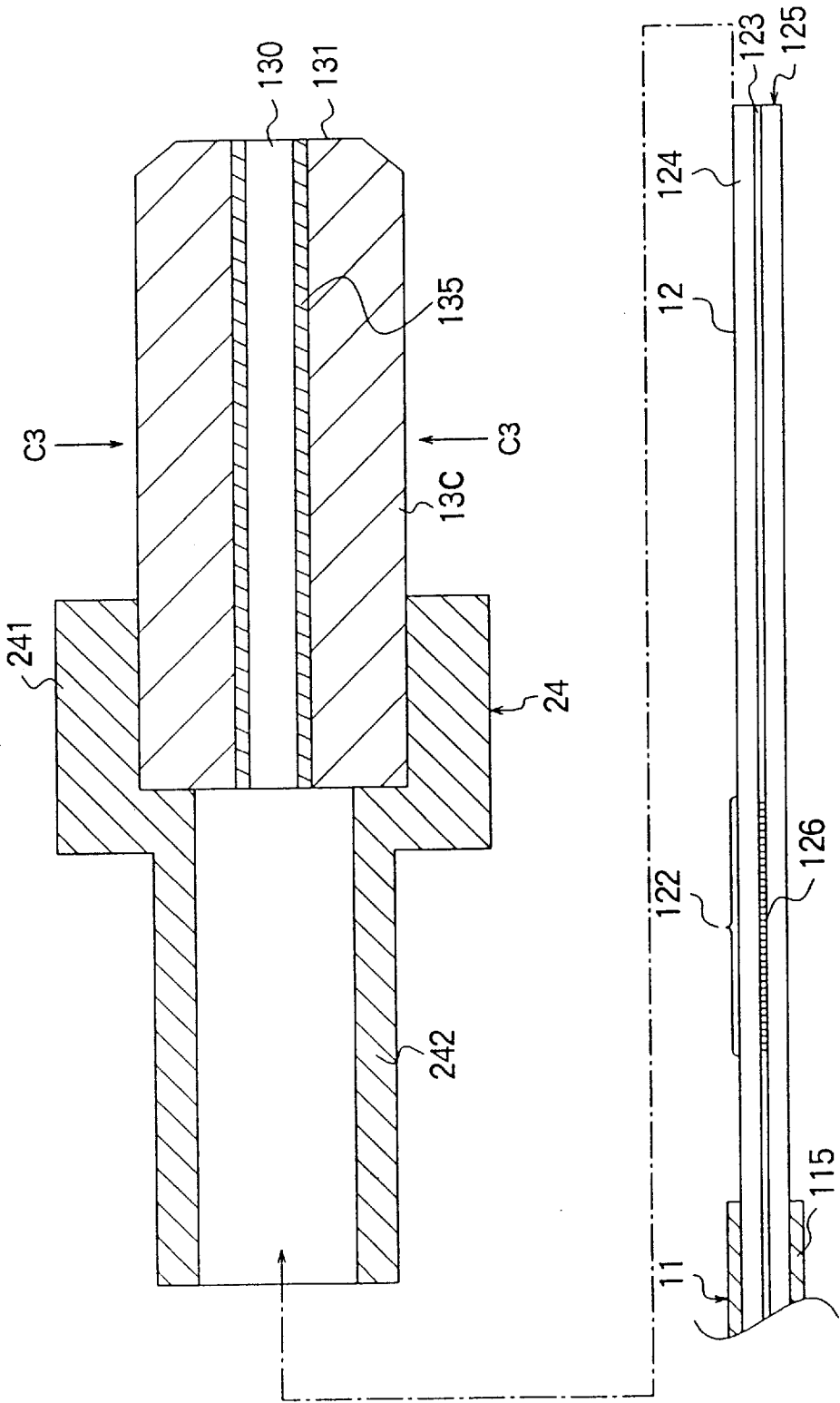
FIG. 20 is a view showing a part of an assembling step for the second embodiment of the optical connector according to the present invention (second applied example of fifth light-blocking structure), corresponding to the cross section taken along line A—A of the optical connector shown in FIG. 5.
Figure 21:
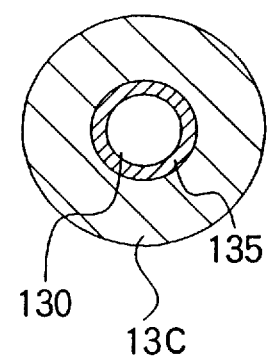
FIG. 21 is a view showing an overall cross-sectional configuration of the optical connector shown in FIG. 20 at a part indicated by arrow C3, corresponding to the cross section taken along line C—C of the optical connector shown in FIG. 5.

FIG. 20 is a lateral cross-sectional view (corresponding to a cross-sectional view taken along line A—A of FIG. 5) of each member, showing a part of an assembling step for the optical connector according to the present invention having the fifth light-blocking structure (second applied example); whereas FIG. 21 is a cross-sectional view (corresponding to a cross-sectional view taken along line C—C of FIG. 5) of the optical connector at a portion indicated by arrow C3 of FIG. 20. This optical connector is constituted by the ferrule 13C having the though-hole 130 for accommodating the tip portion 121 of the optical filter 12 therein, the flange 24 having the holding portion 241 to which the rear end portion of the ferrule 13C is attached, and a light-absorbing layer 135 formed on the inner surface of the through-hole 130 of the ferrule 13C.

While the form of the ferrule 13C is similar to that of the above-mentioned optical connector of FIGS. 16 to 19 (having the fourth light-blocking structure or fifth light-blocking structure (first applied example)), the material thereof is different from that in the optical connector having the structure of the first applied example. Namely, the material of the ferrule 13C is conventionally-used zirconia, which is inappropriate as a light-absorbing material constituting the above-mentioned ferrule 13B since it efficiently reflects light of 1.3-$\mu$m and 1.55-$\mu$m bands which are often used as the inspection light wavelength for optical lines.

Figure 22:
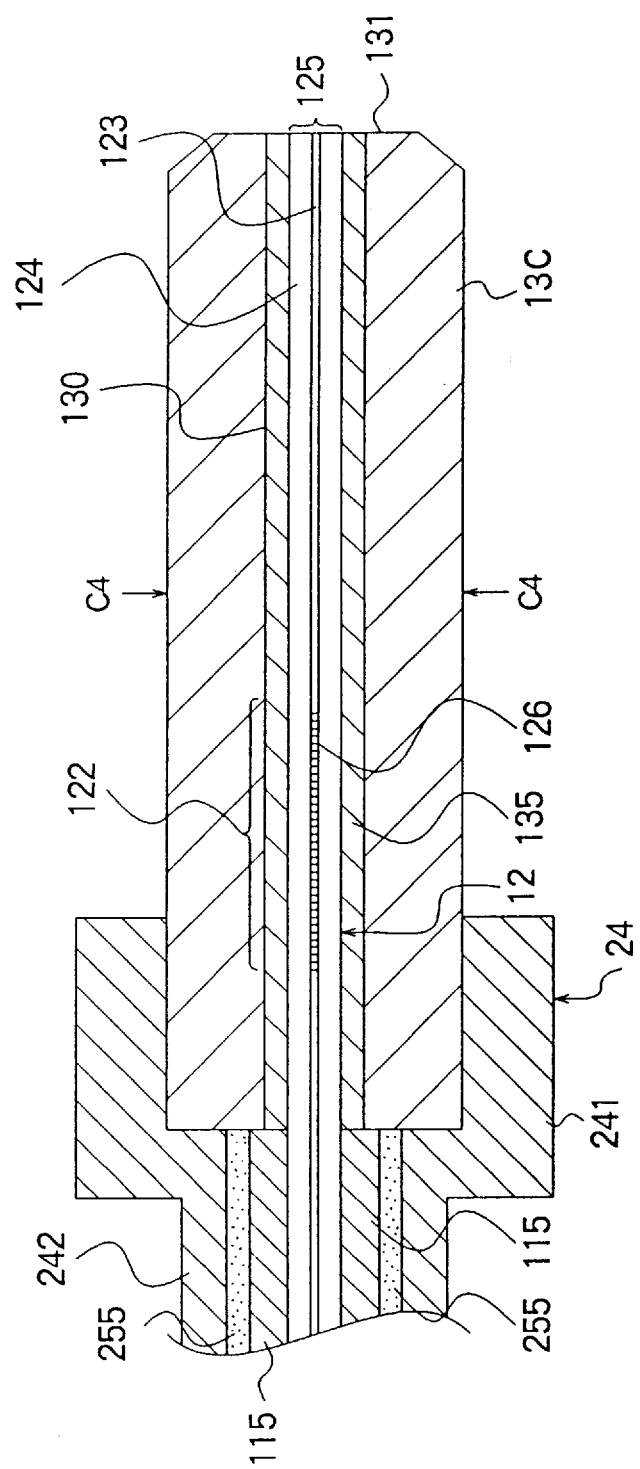
FIG. 22 is a view showing a cross-sectional configuration of the second embodiment of the optical connector according to the present invention (second applied example of fifth light-blocking structure), corresponding to the cross section taken along line A—A of the optical connector shown in FIG. 5.

In the optical connector having this fifth light-blocking structure (second applied example), however, the light-absorbing layer 135 is formed on the inner surface of the ferrule 13C, which acts like a ferrule made of a light-absorbing material. This light-absorbing layer 135 is constituted by a light-absorbing material which reflects the light having the reflection wavelength of the grating 126. As mentioned above, various kinds of materials can be used as the light-absorbing material according to the reflection wavelength of the grating 126. Here, since the light-absorbing layer 135 is formed on the inner wall of the through-hole 130, it is shaped like a pipe. The tip portion 121 of the optical filter 12 from which the coating 115 has been removed is inserted into the through-hole defined by the light-absorbing layer 135 as shown in FIG. 22.

When the optical filter 12 is accommodated in the optical connector having the fifth light-blocking structure (second applied example), of the light having the reflection wavelength of the grating 126, a light component which is radiated from the grating 126 to the cladding 124 and then reaches the outer surface of the cladding 124 so as to be emitted out of the cladding 124 is absorbed by the light-absorbing layer 135. Accordingly, suppressed is such a phenomenon that the light radiated from the grating 126 to the cladding 124 is emitted out of the cladding 124 and then returns to the inside of the optical filter 12 so as to advance to a portion in front of the grating 126. Consequently, of the light having the reflection wavelength of the grating 126, the unnecessary radiated light component which is radiated to the cladding 124 so as to pass through the filter region 122 has a reduced power, whereby the optical connector of FIG. 22, as in the case of the optical connector having the fifth light-blocking structure (first applied example), can increase the light-blocking ratio of the optical filter 12.

Here, in the case where the light-absorbing material constituting the light-absorbing layer 135 has a refractive index which substantially coincides with that of the surface layer portion of the cladding 124 of the optical filter 12, the light radiated from the grating 126 is hardly reflected by the interface between the optical filter 12 and the light-absorbing layer 135. Consequently, the light radiated from the grating 126 is absorbed by the light-absorbing layer 135 quite efficiently, whereby the light-blocking ratio of the optical filter 12 can be increased very much.

Also, in the case where the light-absorbing layer 135 constituting the ferrule 13C has a refractive index higher than that of the surface layer portion of the cladding 124, the light radiated from the grating 126 is hard to be totally reflected by the interface between the optical filter 12 and the ferrule 13. Consequently, the light radiated from the grating 126 is absorbed by the ferrule 13C efficiently, whereby the light-blocking ratio of the optical filter 12 can be increased greatly.

Figure 23:
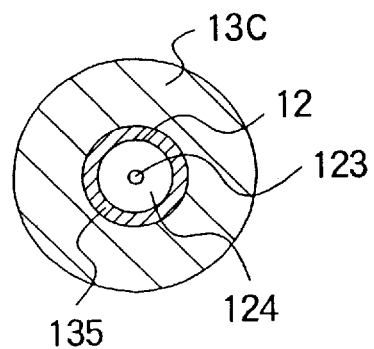
FIG. 23 is a view showing an overall cross-sectional configuration of the optical connector shown in FIG. 22 at a part indicated by arrow C4, corresponding to the cross section taken along line C—C of the optical connector shown in FIG. 5.

FIG. 22 is a lateral cross-sectional view (corresponding to a cross-sectional view taken along line A—A of FIG. 5) showing the optical connector obtained by way of the assembling step of FIG. 20. FIG. 23 is a cross-sectional view (corresponding to a cross-sectional view taken along line C—C of FIG. 5) of the optical connector at a portion indicated by arrow C4 of FIG. 22. This optical connector comprises the optical filter 12, the ferrule 13C for accommodating the optical filter 12, and the flange 24 having the holding portion 241 to which the ferrule 13C is attached. The outer surface of the cladding 124 of the optical filter 12 is covered with the light-absorbing layer 135.

In the optical connector of FIG. 22, of the light having the reflection wavelength of the grating 126, the light component which is radiated from the grating 126 to the cladding 124 and then reaches the outer surface of the cladding 124 so as to be emitted out of the cladding 124 is absorbed by the light-absorbing layer 135. Consequently, of the light having the reflection wavelength of the grating 126, the unnecessary radiated light component radiated to the cladding 124 so as to pass through the filter region 122 has a reduced power. Accordingly, as in the case of the above-mentioned optical connector having the fifth light-blocking structure (first applied example), the optical connector of FIG. 22 has a high light-blocking ratio.

As explained in detail in the foregoing, in the optical connector having the fifth light-blocking structure (first applied example), since the light radiated from the grating of the optical filter is absorbed by the ferrule itself, the light component passing though the filter region so as to advance to a portion in front of the grating is reduced, whereby the light-blocking ratio of the optical filter can be increased.

Also, in the optical connector having the fifth light-blocking structure (second applied example), since the light radiated from the grating of the optical filter is absorbed by the light-absorbing layer, the light component passing though the filter region so as to advance to a portion in front of the grating is reduced, whereby the light-blocking ratio of the optical filter can be increased.

In the following, a sixth light-blocking structure of the optical connector in the second embodiment of the present invention will be explained.

Figure 24:
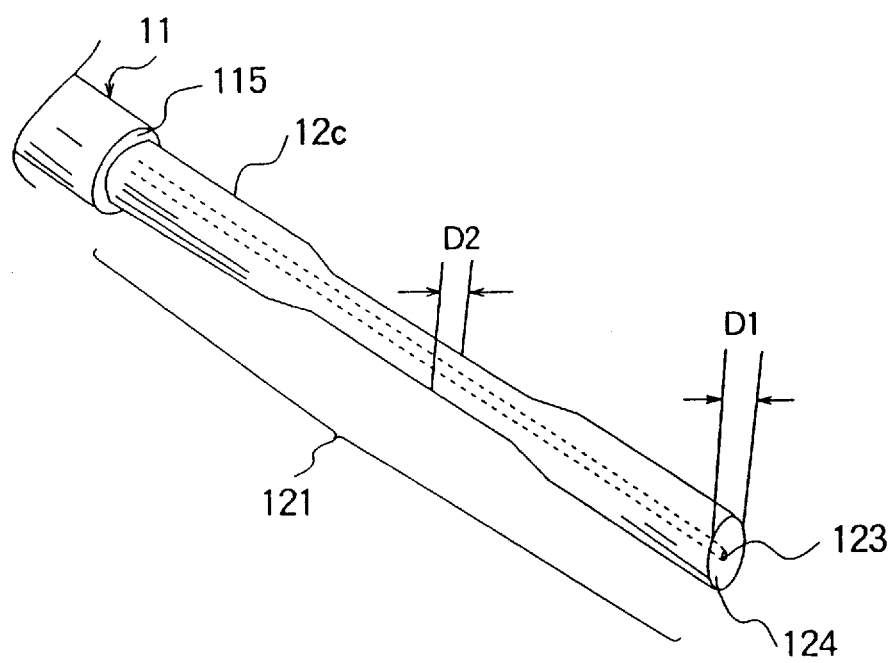
FIG. 24 is a perspective view showing the form of a tip portion of an optical filter in the second embodiment of the optical connector according to the present invention.

This sixth light-blocking structure is realized when outer diameter D2 of a predetermined part (region to which the light radiated from the grating 126 reaches) of the tip portion 121 of the optical filter 12c is made smaller than outer diameter D1 of the other part (D1>D2) as shown in FIG. 24.

Figure 25:
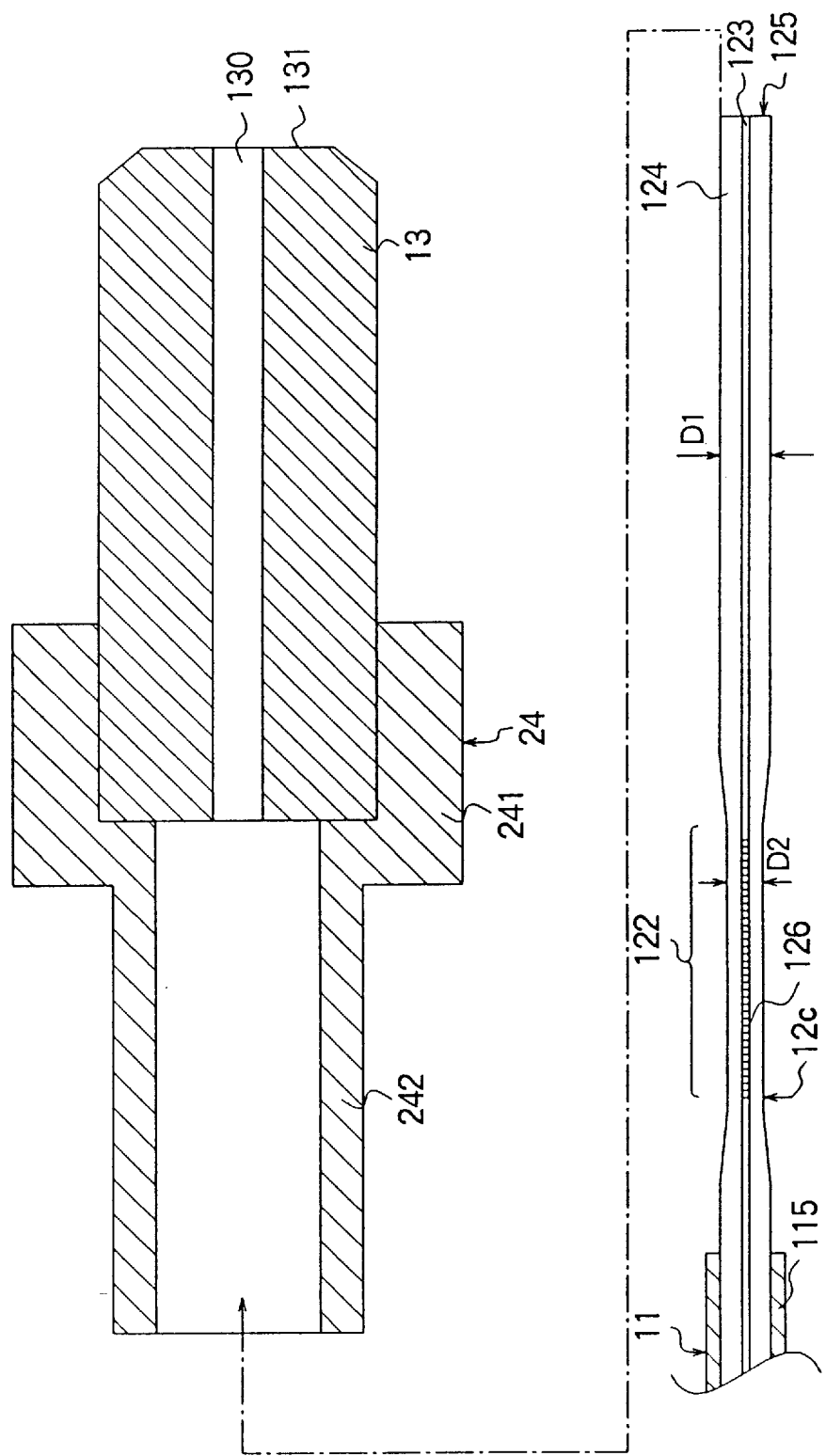
FIG. 25 is a view showing a part of an assembling step for the second embodiment of the optical connector according to the present invention (sixth light-blocking structure), corresponding to the cross section taken along line A—A of the optical connector shown in FIG. 5.

FIG. 25 is a lateral cross-sectional view (corresponding to a cross-sectional view taken along line A—A of FIG. 5) of each member, showing a part of an assembling step for the optical connector having the sixth light-blocking structure. As can also be seen from FIG. 26, when the tip portion 121 of the optical filter 12c is inserted into the through-hole 130 of the ferrule 13, the part of the optical filter 12c with the outer diameter D2(referred to as "depression portion" hereinafter) and the inner wall of the through-hole 130 define a space therebetween. This space is filled with a desired light-absorbing material so as to form a light-absorbing portion 136.

Figure 26:
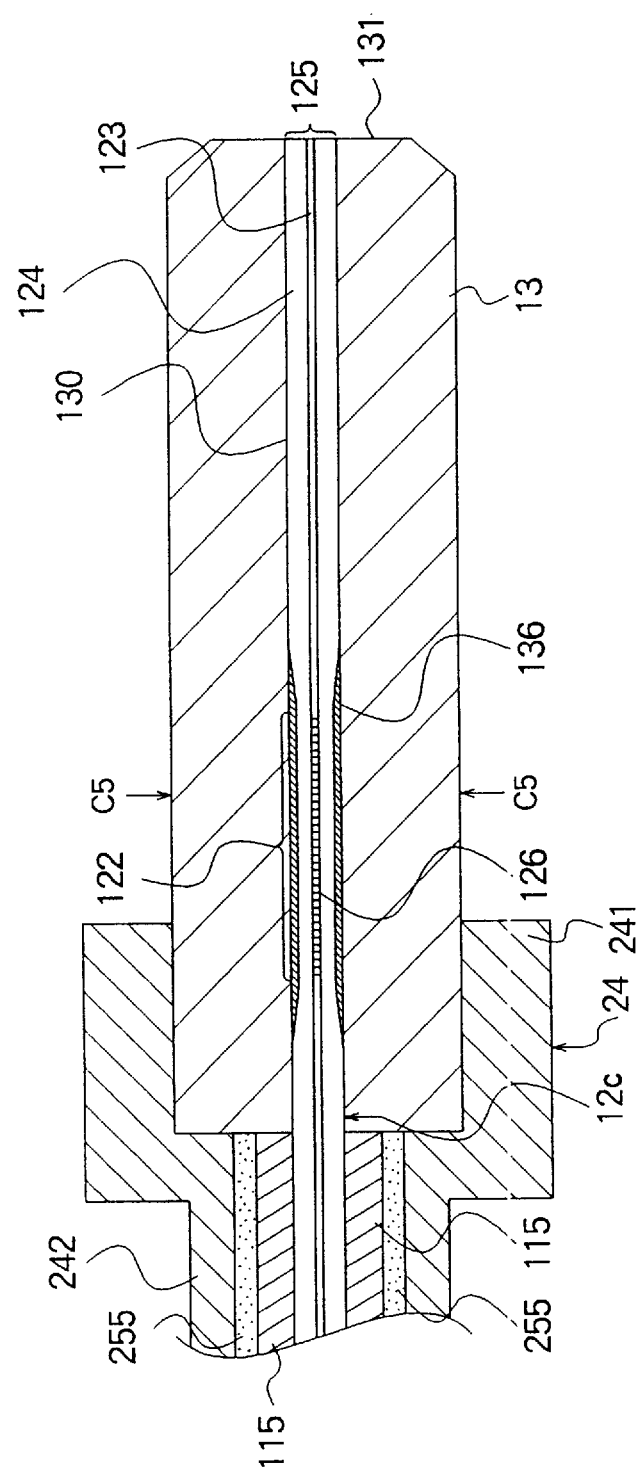
FIG. 26 is a view showing a cross-sectional configuration of the second embodiment of the optical connector according to the present invention (sixth light-blocking structure), corresponding to the cross section taken along line A—A of the optical connector shown in FIG. 5.
Figure 27:
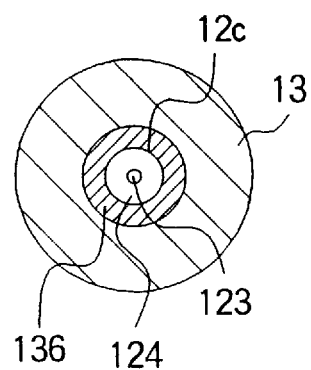
FIG. 27 is a view showing an overall cross-sectional configuration of the optical connector shown in FIG. 26 at a part indicated by arrow C5, corresponding to the cross section taken along line C—C of the optical connector shown in FIG. 5.

FIG. 26 is a lateral cross-sectional view (corresponding to a cross-sectional view taken along line A—A of FIG. 5) showing a configuration of an optical connector having the sixth light-blocking structure. FIG. 27 is a cross-sectional view (corresponding to a cross-sectional view taken along line C—C of FIG. 5) of the optical connector at a portion indicated by arrow C5 of FIG. 26. This optical connector is constituted by the optical fiber type optical filter 12c in which the grating 126 is formed in a single-mode optical fiber having the core 123 and the cladding 124, the ferrule 13 accommodating the tip portion 121 of the optical filter 12c therein, and the flange 24 having the holding portion 241 to which the ferrule 13 is attached.

For example, the optical filter 12c is used in an inspection system for optical communication network in which an OTDR apparatus is employed.

As shown in FIG. 26, in the optical filter 12c, the light-absorbing portion 136 is formed on the outer surface of the cladding 124 around the grating 126. This light-absorbing portion 136 is made as the depression portion formed in the outer surface of the cladding 124 is filled with a light-absorbing material. This light-absorbing material is a material which efficiently absorbs light having the reflection wavelength of the grating 126. As this light-absorbing material, while various kinds of materials can be used according to the reflection wavelength of the grating 126, those absorbing the light having the reflection wavelength of the grating 126 with a higher ratio are more preferable. For example, glass doped with praseodymium, which is a rare earth element, may be used when the reflection wavelength is at 1.3-$\mu$m band; whereas glass or polyimide resin doped with erbium, which is a rare earth element, may be used when the reflection wavelength is at 1.55-$\mu$m band.

Numeral 115 in FIG. 26 refers to a UV-cutoff resin coating which covers the surface of the cladding 124, functioning to protect the core 123 and the cladding 124. The resin coating 115 is eliminated at the tip portion 121 of the optical filter 12c so that the core 123 can be irradiated with ultraviolet rays in order to form the grating 126 therein as mentioned above.

The ferrule 13 is a tubular member having the through-hole 130 for accommodating the tip portion 121 of the optical filter 12c from which the resin coating 115 has been removed. This tip portion includes the grating 126. As mentioned above, the light-absorbing portion 136 is disposed between the cladding 124 of the optical filter 12c and the ferrule 13.

The flange 24 is a tubular holding member in which the rear end portion of the ferrule 13 is attached to the holding portion 241 thereof. In the hollow portion 242 of the flange 24, the optical filter 12c covered with the coating 115 is accommodated. The space between the coating 115 of the optical filter 12c and the hollow portion 242 of the flange 24 is filled with the adhesive 255. The optical filter 12c is fixed to the inside of the hollow portion 242 by means of this adhesive 255.

The optical connector having the sixth light-blocking structure is characterized in that, of the light with the reflection wavelength of the grating 126, a light component which is radiated from the grating 126 to the cladding 124 and then traverses the cladding 124 so as to be emitted out of the cladding 124 is absorbed by the light-absorbing portion 136.

In the conventional optical connector, the ferrule is constituted by a material with a high light reflectivity such as zirconia, while the inner surface thereof is formed as a mirror surface. Accordingly, as can be seen from the experiment explained with reference to FIGS. 8 to 11, when the tip portion of the optical fiber 100, which is an optical filter, including the grating 116 is accommodated in the ferrule, the light radiated from the grating 116 so as to be emitted out of the cladding 114 is reflected by the inner surface of the ferrule so as to return to the inside of the cladding 114 and then advances to a part in front of the grating 116, whereby the light-blocking effect by the optical filter has not always been attained sufficiently.

In view of such a fact, the optical connector having the sixth light-blocking structure is provided. Namely, in the optical connector having the sixth light-blocking structure, a light component which is radiated from the grating 126 to the cladding 124 and then reaches the outer surface of the cladding 124 so as to be emitted out of the cladding 124 is absorbed by the light-absorbing portion 136. Accordingly, suppressed is such a phenomenon that the light radiated from the grating 126 to the cladding 124 is emitted out of the cladding 124 and then is reflected by the inner surface of the through-hole 130 of the ferrule 13 so as to return to the inside of the optical filter 12c and advance to a portion in front of the grating 126. Consequently, of the light having the reflection wavelength of the grating 126, the unnecessary radiated light component which is radiated to the cladding 124 so as to pass through the filter region 122 has a reduced power, whereby the optical connector of FIG. 26 has a light-blocking ratio higher than that conventionally obtained.

Though the light-absorbing portion 136 is disposed at a position surrounding the grating 126 in the sixth light-blocking structure of FIG. 26, the position of the light-absorbing portion 136 should not be restricted thereto. The light radiated from the grating 126 to the cladding 124 advances from each portion of the grating 126 to a part positioned obliquely in front thereof. Accordingly, when the light-absorbing portion 136 is disposed at a part which is positioned obliquely in front of each portion of the grating 126, the light-blocking ratio is sufficiently increased.

Figure 28:
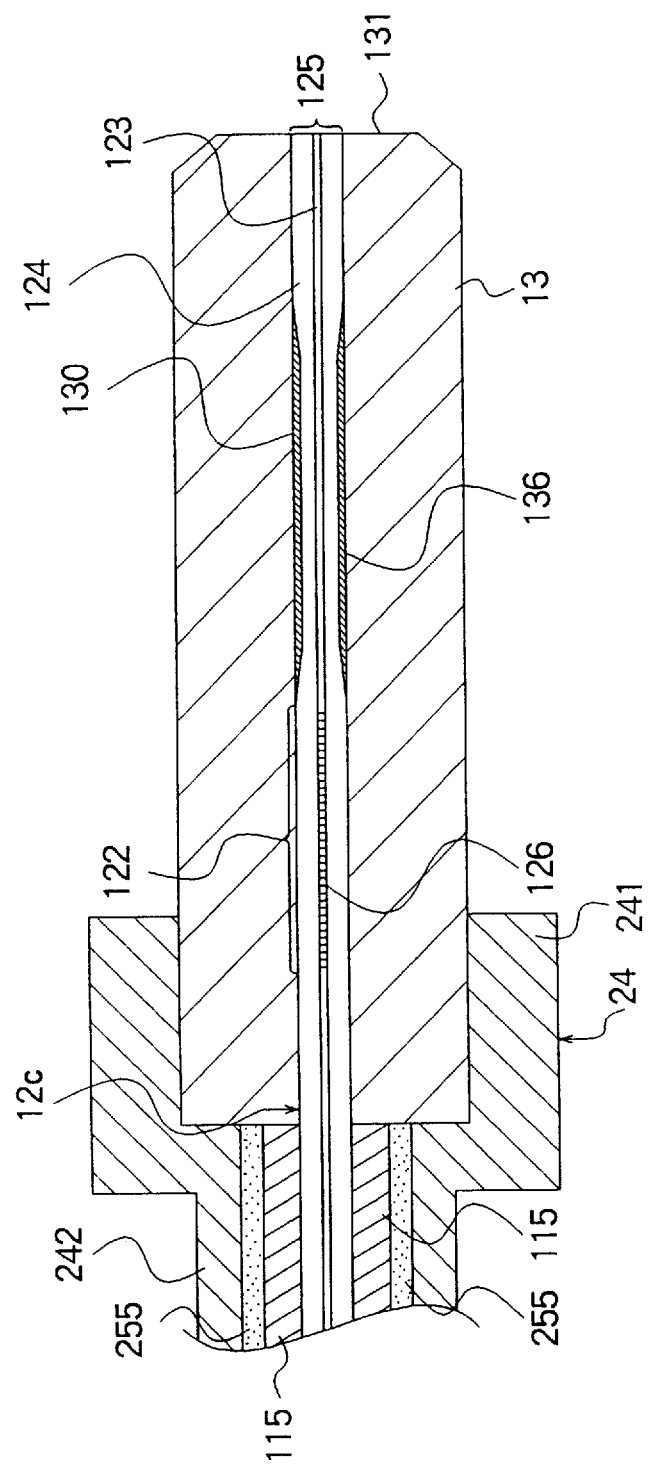
FIG. 28 is a view showing a cross-sectional configuration of the second embodiment of the optical connector according to the present invention (an applied example of sixth light-blocking structure), corresponding to the cross section taken along line A—A of the optical connector shown in FIG. 5.

FIG. 28 is a lateral cross-sectional view (corresponding to a cross-sectional view taken along line A—A of FIG. 5) showing a modified example of the above-mentioned optical connector. The light-absorbing portion 136 of this optical connector is disposed further in front (closer to the end face 131) as compared with that of the optical connector in FIG. 26. As mentioned above, since the light radiated from the grating 126 to the cladding 124 advances to a portion positioned obliquely in front thereof, when the light-absorbing portion 136 is disposed obliquely in front of the tip of the grating 126, the light radiated from the grating 126 is sufficiently absorbed thereby. Accordingly, the optical connector of FIG. 28 also has a sufficiently high light-blocking ratio.

Here, in the case where the light-absorbing material of the light-absorbing portion 136 has a refractive index which substantially coincides with that of the surface layer portion of the cladding 124 of the optical filter 12c in the optical connector having the sixth light-blocking structure (see FIGS. 26 and 28), the light radiated from the grating 126 is hardly reflected by the interface between the optical filter 12c and the light-absorbing material. Consequently, the light radiated from the grating 126 is absorbed by the light-absorbing material quite efficiently, whereby a much higher light-blocking ratio can be realized.

Also, in the case where the light-absorbing material has a refractive index higher than that of the surface layer portion of the cladding 124 of the optical filter 12c, the light radiated from the grating 126 is hard to be totally reflected by the interface between the optical filter 12c and the light-absorbing material. Consequently, the light radiated from the grating 126 is absorbed by the light-absorbing material efficiently, whereby a higher light-blocking ratio can be realized.

As explained in detail in the foregoing, in the optical connector having the sixth light-blocking structure, of the light having the reflection wavelength of the grating, the light component radiated from the grating is absorbed by the light-absorbing material filling the depression portion disposed in tip portion of the optical filter. Accordingly, the light component passing though the filter region including the grating so as to advance to a portion in front of the grating is reduced, whereby a high light-blocking ratio can be realized.

In the following, a seventh light-blocking structure of the optical connector in the second embodiment of the present invention will be explained.

Figure 29:
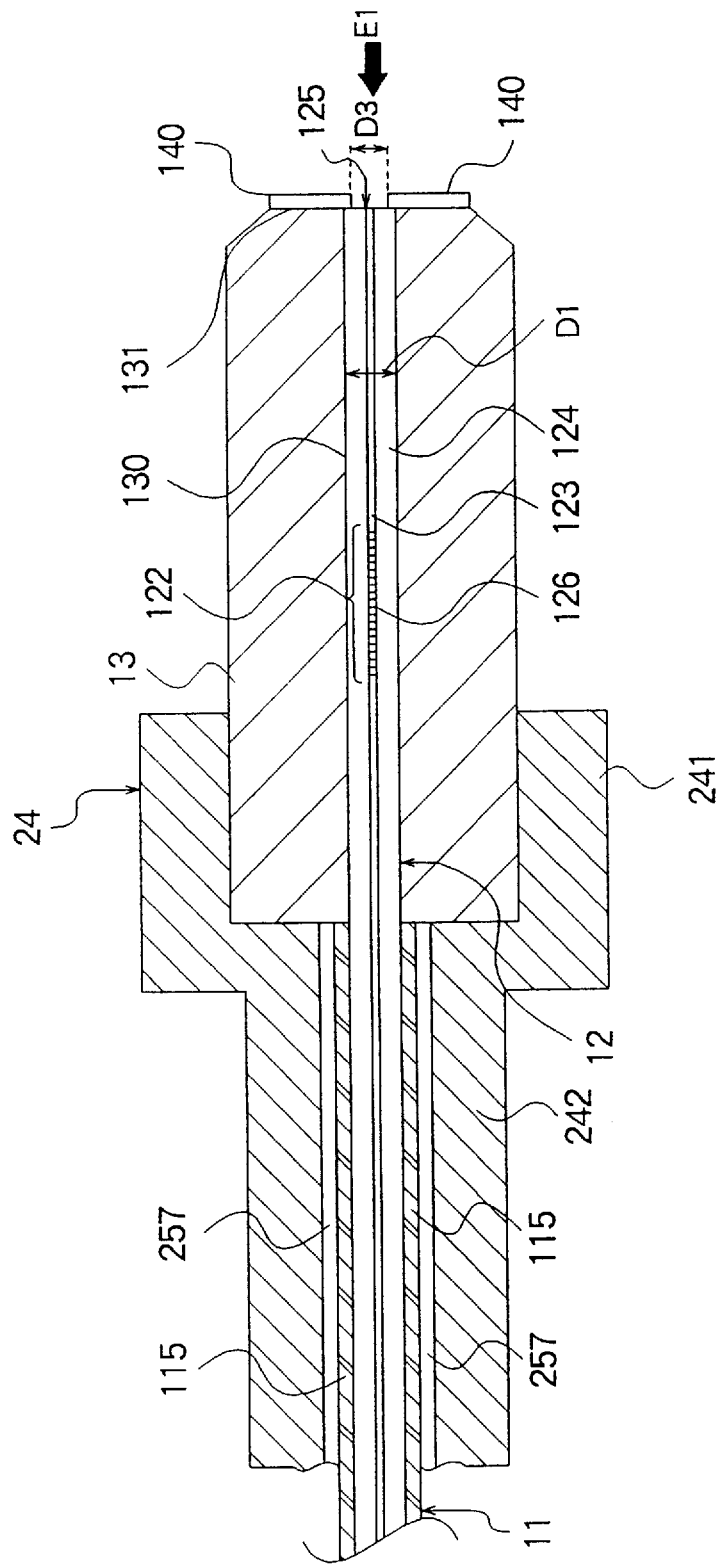
FIG. 29 is a view showing a cross-sectional configuration of the second embodiment of the optical connector according to the present invention (first applied example of seventh light-blocking structure), corresponding to the cross section taken along line A—A of the optical connector shown in FIG. 5.
Figure 30:
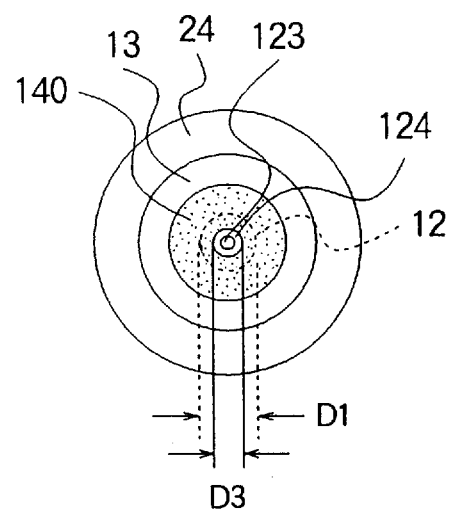
FIG. 30 is a view showing the front face of the optical connector shown in FIG. 29 as viewed from a direction indicated by arrow E1, corresponding to the front face of the optical connector viewed from a direction indicated by arrow E shown in FIG. 5.

FIG. 29 is a lateral cross-sectional view (corresponding to a cross-sectional view taken along line A—A of FIG. 5) showing a configuration of the optical connector having the seventh light-blocking structure (first applied example). FIG. 30 is a front view of the optical connector of FIG. 29 as viewed from a direction indicated by arrow E1 (corresponding to a front view of the optical connector of FIG. 5 as viewed from a direction indicated by arrow E of FIG. 5).

As shown in FIG. 29, the optical connector having the seventh light-blocking structure (first applied example) comprises the ferrule 13 (made of zirconia) having the through-hole 130 with an inner diameter of 126 µm for accommodating the tip portion 121 of the optical fiber type optical filter 12 in which the grating 126 is formed in a single-mode optical fiber having the core 123 and the cladding 124, the flange 24 having the holding portion 241 to which the ferrule 13 is attached, and a first light-blocking member 140 disposed so as to be in close contact with the end face 131 of the ferrule 13.

The first light-blocking member 140 has an opening whose diameter D3 is 1.14 times that of the mode field diameter in the optical filter 12 and whose center coincides with the center of the core 123. In general, the mode field diameter is on a par with the diameter of the core 123 and is much smaller than the diameter of the cladding 124. The first light-blocking member 140 may be either reflecting member or light-absorbing member. For the reflecting member, a material such as aluminum, gold, tungsten, or titanium can be suitably used. For the light-absorbing member, a material such as a resin or glass into which erbium, praseodymium, carbon, or the like is mixed can be suitably used. Here, since erbium and praseodymium have peaks at wavelengths near 1.55 µm and 1.33 µm, respectively, they are suitable for blocking the corresponding wavelengths of light.

The ferrule 13 is a cylindrical member having the through-hole 130 for accommodating the tip portion 121 of the optical filter 12 from which the resin coating 115 has been removed. The filter region 122 having the grating 126 is accommodated in the through-hole 130.

The flange 24 is a tubular holding member in which the rear end portion of the ferrule 13 is attached to the holding portion 241 thereof. In the hollow portion 242 of the flange 24, the optical filter 12 covered with the coating 115 is accommodated. The space between the coating 115 of the optical filter 12 and the hollow portion 242 of the flange 24 is filled with an adhesive 257. The optical filter 12 is fixed to the inside of the hollow portion 242 of the flange 24 by means of this adhesive 257.

The first light-blocking member 140 may be formed as a planar member is attached to the end face 131 of the ferrule 13. Also, it may be formed on the end face 131 of the ferrule 13 and the light-emitting end face 125 of the optical filter 12 by means of vapor deposition or the like after the optical filter 12 is inserted into the ferrule 13.

In the optical connector having this seventh light-blocking structure (first applied example), radiated light which is generated at the grating 126 and advances to the cladding 124 is blocked as explained in the following.

In the optical filter 12 in which the grating 126 having a refractive index changing along the optical-axis direction (longitudinal direction) is formed in the core 123, the mode field diameter (MFD) of the light propagated therethrough changes according to the change in refractive index. Accordingly, even in the case of the advancing light which has satisfied a condition under which it is confined near the core 123 before being made incident on the grating 126, a part thereof is radiated toward the cladding 124. Such radiated light is mainly reflected by the inner surface of the through-hole 130 of the ferrule 13, whereby a part of the radiated light reaches the light-emitting opening.

In the optical connector of FIG. 29, the first light-blocking member 140 restricts the opening of the light-emitting end face 125 of the optical filter 12. Since the diameter D3 of the opening of the first light-blocking member 140 is much smaller than the diameter of the cladding 124, even in the case of the light advancing through the cladding 124 near the opening of the first light-blocking member 140, most of the light is blocked and prevented from being emitted out of the opening of the first light-blocking member 140.

On the other hand, the diameter of the opening of the first light-blocking member 140 is 1.14 times that of the mode field diameter in the optical filter 12. Accordingly, only about 0.1 dB of intensity of light of the wavelengths other than the reflection wavelength advancing only through near the core 123 by way of the grating 126 is blocked, whereby most of such light can be emitted therefrom.

Figure 8:
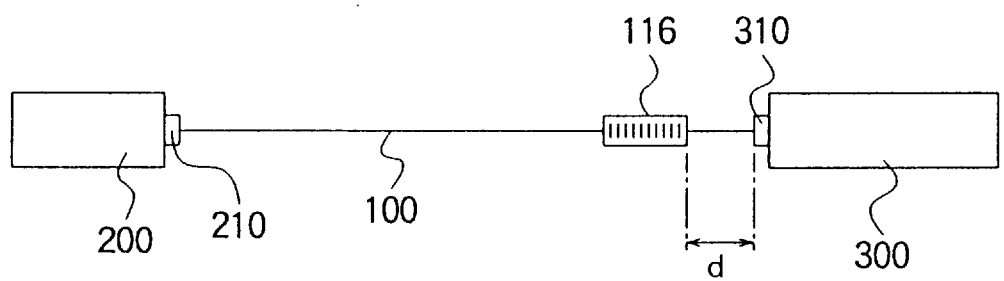
FIG. 8 is a view showing a configuration of an apparatus for an experiment conducted by the inventors.

The inventors have confirmed all of the above-mentioned phenomenons by using the apparatus shown in FIG. 8.

In the following, the seventh light-blocking structure (second applied example) of the optical connector in the second embodiment of the present invention will be explained.

Figure 31:
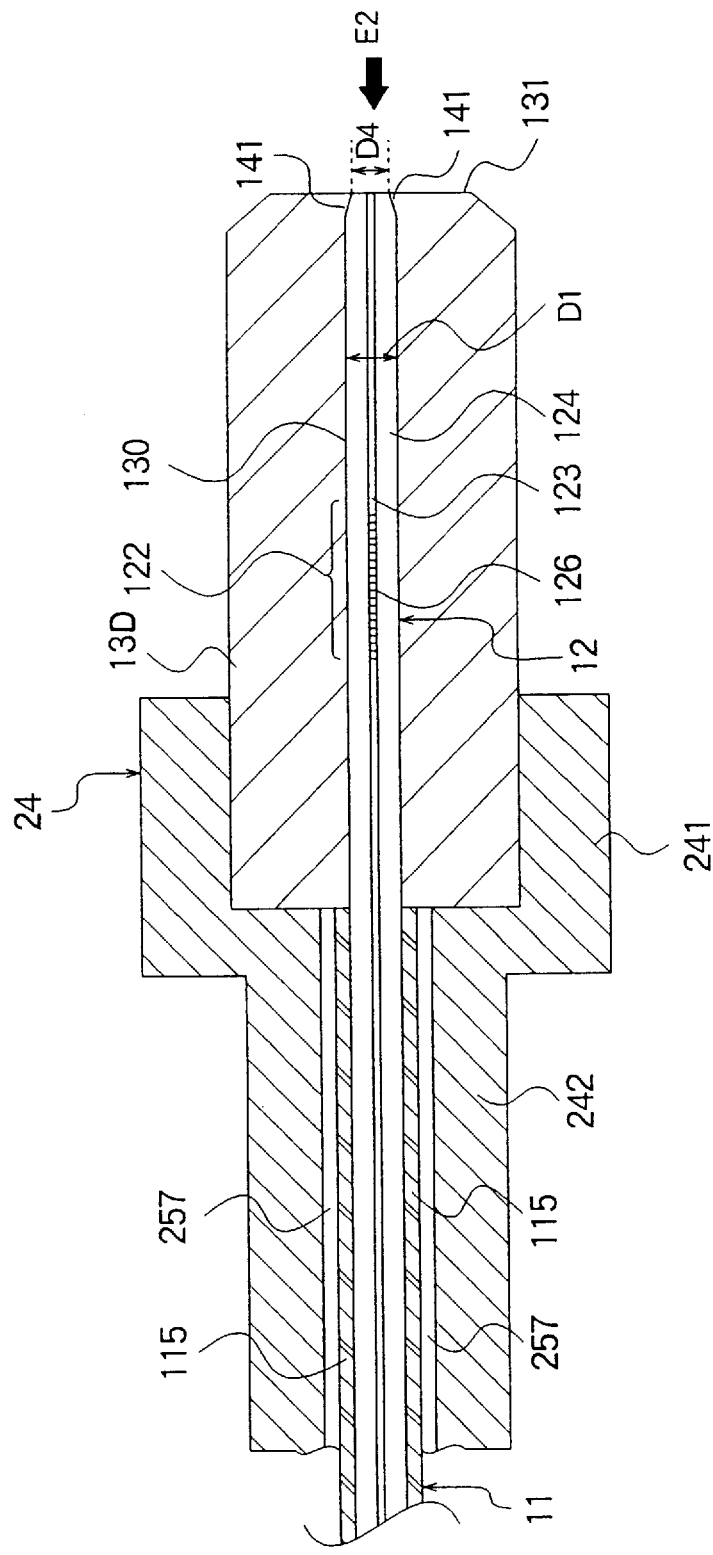
FIG. 31 is a view showing a cross-sectional configuration of the second embodiment of the optical connector according to the present invention (second applied example of seventh light-blocking structure), corresponding to the cross section taken along line A—A of the optical connector shown in FIG. 5.
Figure 32:
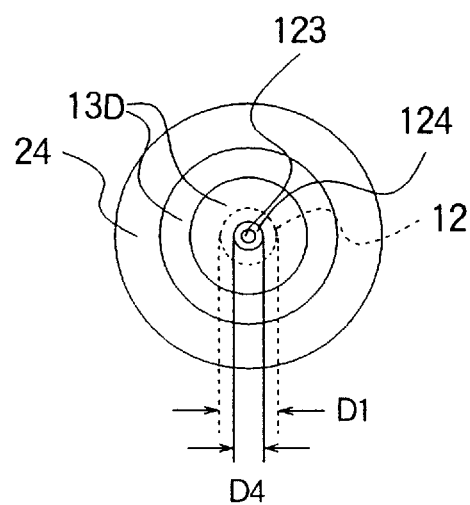
FIG. 32 is a view showing the front face of the optical connector shown in FIG. 31 as viewed from a direction indicated by arrow E2, corresponding to the front face of the optical connector viewed from a direction indicated by arrow E shown in FIG. 5.

FIG. 31 is a lateral cross-sectional view (corresponding to a cross-sectional view taken along line A—A of FIG. 5) showing a configuration of the optical connector having the seventh light-blocking structure (second applied example). FIG. 32 is a front view of the optical connector of FIG. 31 as viewed from a direction indicated by arrow E2 (corresponding to a front view of the optical connector of FIG. 5 as viewed from a direction indicated by arrow E of FIG. 5).

As shown in FIG. 31, the optical connector having the seventh light-blocking structure (second applied example) is different from the optical connector of FIG. 29 in that a protrusion 141 for restricting the diameter of the light-emitting opening to diameter D4 which is 1.14 times that of the mode field diameter of the light propagated through the optical filter 12 is disposed at the opening portion positioned at the end face 131 of the through-hole 130 in the ferrule 13D having the though-hole 130 for accommodating the filter region 122 having the grating 126. Here, this ferrule 13D is made of reflective zirconia and defined by the protrusion 141 such that the center of the opening coincides with the center of the core 123.

In the optical connector of FIG. 31, the radiated light which is generated at the grating 126 and advances to the cladding 124 is blocked as explained in the following.

In the optical filter 12 in which the grating 126 having a refractive index changing along the optical-axis direction (longitudinal direction) is formed in the core 123, as in the case of the optical connector of FIG. 29, the mode field diameter (MFD) of the light propagated therethrough changes according to the change in refractive index. Accordingly, even in the case of the advancing light which has satisfied a condition under which it is confined near the core 123 before being made incident on the grating 126, a part thereof is radiated toward the cladding 124. Such radiated light is mainly reflected by the inner surface of the through-hole 130 of the ferrule 13D, whereby a part of the radiated light reaches the light-emitting opening.

In the optical connector of FIG. 31, the light-emitting opening is defined by the protrusion 141 at the opening portion of the through-hole 130 of the ferrule 13D. Since the diameter D4 of this light-emitting opening is much smaller than the diameter of the cladding 124, even in the case of the light advancing through the cladding 124 near the light-emitting opening, most of the light is reflected and prevented from being emitted out of the light-emitting opening defined by the protrusion 141.

On the other hand, as in the case of the optical connector of FIG. 29, the diameter D4 of the light-emitting opening is 1.14 times that of the mode field diameter in the optical filter 12. Accordingly, only about 0.1 dB of intensity of light of the wavelengths other than the reflection wavelength advancing through near the core 123 by way of the grating 126 is blocked, whereby most of such light can be emitted therefrom.

Here, the inventors have confirmed these facts by using the experimental apparatus shown in FIG. 8.

From the viewpoint of emission efficiency from the light-emitting opening, it is preferable that the end portion of the cladding 124 be processed in conformity with the form of the tip portion of the ferrule 13D so as to make the light-emitting end face of the optical filter 12 substantially coincide with the light-emitting opening of the ferrule 13D.

In the following, the seventh light-blocking structure (third applied example) of the optical connector in the second embodiment of the present invention will be explained.

Figure 33:
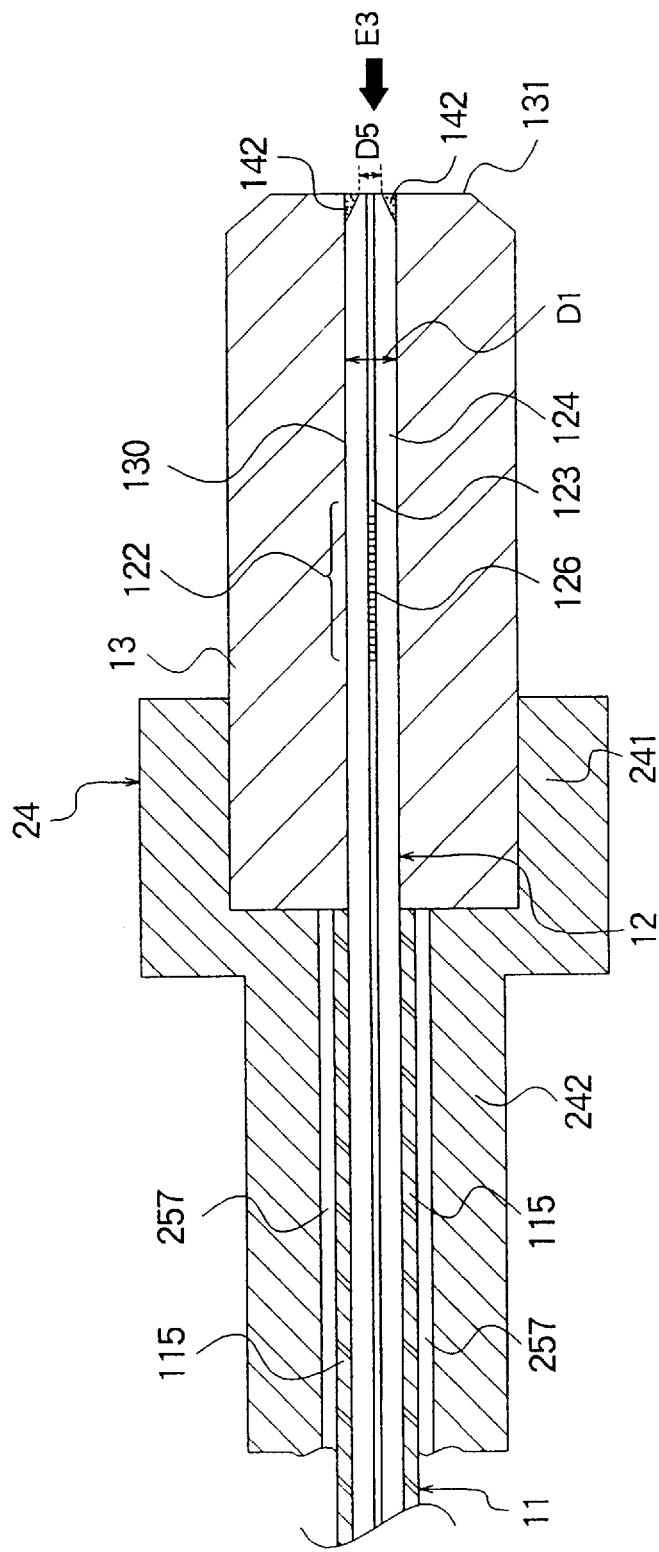
FIG. 33 is a view showing a cross-sectional configuration of the second embodiment of the optical connector according to the present invention (third applied example of seventh light-blocking structure), corresponding to the cross section taken along line A—A of the optical connector shown in FIG. 5.
Figure 34:
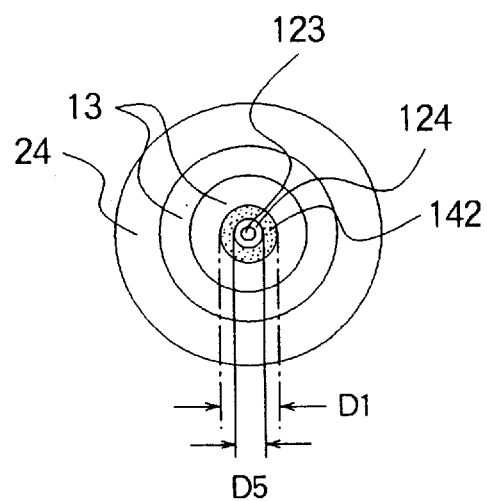
FIG. 34 is a view showing the front face of the optical connector shown in FIG. 33 as viewed from a direction indicated by arrow E3, corresponding to the front face of the optical connector viewed from a direction indicated by arrow E shown in FIG. 5.

FIG. 33 is a lateral cross-sectional view (corresponding to a cross-sectional view taken along line A—A of FIG. 5) showing a configuration of the optical connector having the seventh light-blocking structure (third applied example). FIG. 34 is a front view of the optical connector of FIG. 33 as viewed from a direction indicated by arrow E3 (corresponding to a front view of the optical connector of FIG. 5 as viewed from a direction indicated by arrow E of FIG. 5).

As shown in FIG. 33, the optical connector having the seventh light-blocking structure (third applied example) is different from the optical connectors of FIGS. 29 and 31 in that a second light-blocking member 142 for restricting the diameter of the light-emitting opening of the through-hole 130 near the opening thereof positioned at the end face of the ferrule 13 to diameter D5 which is 1.14 times that of the mode field diameter in the optical filter 12 is provided. Here, the center of the opening defined by the second light-blocking member 142 coincides with the center of the core 123.

In the optical connector of FIG. 33, the second light-blocking member 142 may be either disposed near the opening of the through-hole 130 of the ferrule 13 20 before the insertion of the optical filter 12 or embedded into the through-hole 130 after the optical filter 12 having a processed tip portion is inserted into the through-hole 130 of the ferrule 13.

In the optical connector having this seventh light-blocking structure (third applied example), the radiated light which is generated at the grating 126 and advances to the cladding 124 is blocked as explained in the following.

In the optical filter 12 in which the grating 126 having a refractive index changing along the optical-axis direction (longitudinal direction) is formed in the core 123, as in the case of the optical connector of FIG. 29, the mode field diameter. (MFD) of the light propagated therethrough changes according to the change in refractive index. Accordingly, even in the case of the advancing light which has satisfied a condition under which it is confined near the core 123 before being made incident on the grating 126, a part thereof is radiated toward the cladding 124. Such radiated light is mainly reflected by the inner surface of the through-hole 130 of the ferrule 13, whereby a part of the radiated light reaches the light-emitting opening defined by the second light-blocking member 142.

In the optical connector of FIG. 33, the second light-blocking member 142 defining the light-emitting opening is formed near the opening of the through-hole 130 positioned at the end face 131 of the ferrule 13. Since the diameter D5 of the light-emitting opening defined by this second light-blocking member 142 is much smaller than the diameter of the cladding 124, even in the case of the light advancing through the cladding 124 near the light-emitting opening, most of the light is reflected and prevented from being emitted out of the light-emitting opening.

On the other hand, as in the case of the optical connector of FIG. 29, the diameter of the light-emitting opening defined by the second light-blocking member 142 is 1.14 times that of the mode field diameter of light propagated through the optical filter 12. Accordingly, only about 0.1 dB of intensity of light of the wavelengths other than the reflection wavelength advancing through near the core 123 by way of the grating 126 is blocked, whereby most of such light can be emitted therefrom.

From the viewpoint of emission efficiency from the light-emitting opening, it is preferable that the end portion of the cladding 124 be processed beforehand in conformity with the shape of the inner space formed by the ferrule 13 and the second light-blocking member 142 beforehand so as to make the light-emitting end face substantially coincide with the light-emitting opening.

As explained in detail in the foregoing, in the optical connector having the seventh light-blocking structure (first to third applied examples), since the diameter of the light-emitting opening is smaller than the outer diameter of the cladding of the optical filter to be attached thereto, the radiated light which has been generated in the grating and has reached the light-emitting end face is effectively blocked.

In the following, an eighth light-blocking structure of the optical connector in the second embodiment of the present invention will be explained.

Figure 35:
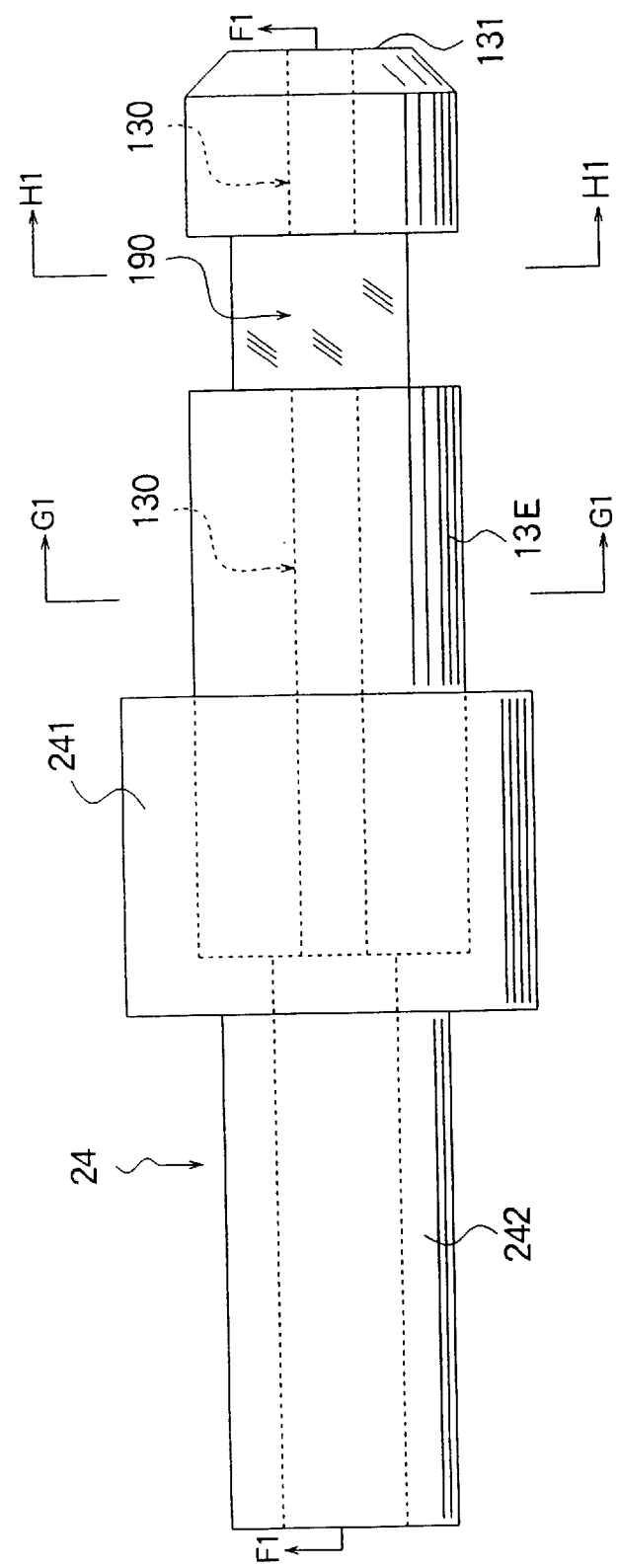
FIG. 35 is a view showing an overall configuration of a plug (first applied example of eighth light-blocking structure) in the second embodiment of the optical connector according to the present invention.
Figure 36:
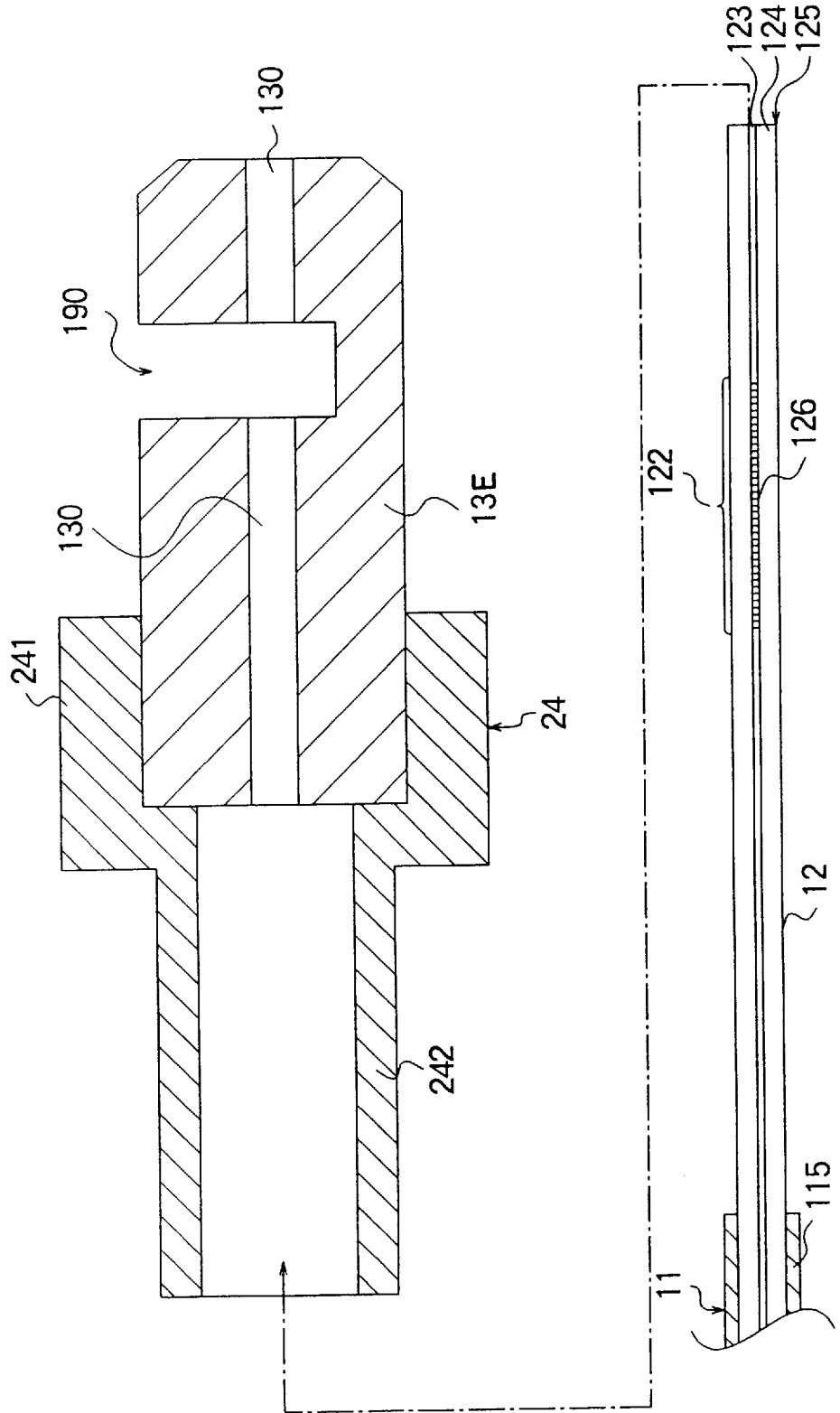
FIG. 36 is a view showing a part of an assembling step for the second embodiment of the optical connector according to the present invention (first applied example of eighth light-blocking structure), corresponding to the cross section taken along line F1—F1 of the plug shown in FIG. 35.
Figure 37:
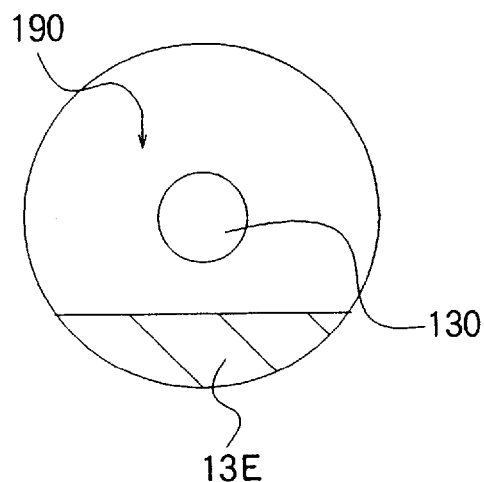
FIG. 37 is a view showing a cross-section of a ferrule shown in FIG. 35 taken along line H1—H1.
Figure 38:
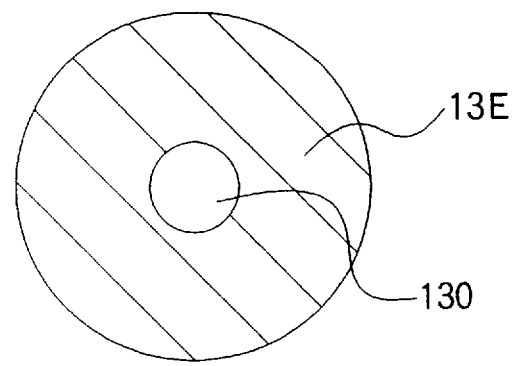
FIG. 38 is a view showing a cross-section of the ferrule shown in FIG. 35 taken along line G1—G1.

FIG. 35 is a plan view showing (only a plug portion of) the optical connector having the eighth light-blocking structure (first applied example). FIG. 36 is a cross-sectional view (corresponding to a cross-sectional view taken along line A—A of FIG. 5) of each member, showing a part of an assembling step for the optical connector taken along line F1—F1 in FIG. 35. Also, FIG. 37 is a cross-sectional view of the optical connector taken along line H1—H1 in FIG. 35, whereas FIG. 38 is a cross-sectional view of the optical connector taken along line G1—G1 in FIG. 35.

This optical connector is used for connecting the optical filter 12 of FIG. 36 to another optical element (e.g., optical fiber or semiconductor device), for example, and adapted to accommodate the tip portion 121 of the optical filter 12 therein. Specifically, this optical connector is constituted by the ferrule 13E having the though-hole 130 for accommodating the tip portion 121 of the optical filter 12 therein and the flange 24 having the holding portion 241 to which the rear end portion of the ferrule 13E is attached. At a predetermined part of the ferrule 13E, a cutout portion 190 is disposed.

As shown in FIG. 36, this optical filter 12 is an optical filter in which the grating 126 is formed in a single-mode optical fiber having the core 123 and the cladding 124. The grating 126 is formed in the core 123 of the filter region 122 positioned at the tip portion 121 of the optical filter 12.

For example, this optical filter 12 is used in an inspection system for optical communication network in which an OTDR apparatus is employed. The tip portion 121 of this optical filter 12 is inserted into the through-hole 130 of the ferrule 13 of the optical connector (plug).

In the following, with reference to FIGS. 35 to 38, each constituent of the optical connector having the eighth light-blocking structure (first applied example) will be explained.

The ferrule 13E is a member having the through-hole 130 for accommodating the tip portion 121 of the optical filter 12 from which the resin coating 115 has been removed. As shown in FIGS. 36 and 38, the through-hole 130 of the ferrule 13E extends along the center axis of the ferrule 13E. Into this through-hole 130, the tip portion 121 of the optical filter 12 is inserted. The flange 24 is a tubular holding member in which the rear end portion of the ferrule 13E is attached to the holding portion 241 thereof, and the portion (including a part of the tip portion) of the optical filter 12 covered with the resin coating 115 is accommodated in the hollow portion 242 of the flange 24.

This optical connector having the eighth light-blocking structure (first applied example) is characterized in that the cutout portion 190 is disposed at a part of the ferrule 13E which is positioned obliquely in front of the grating 126 when the optical filter 12 is accommodated therein. Accordingly, when the optical filter 12 is accommodated in the through-hole 130 of the ferrule 13E, of the light having the reflection wavelength of the grating 126, the light component radiated from the grating 126 to the cladding 124 so as to be emitted out of the optical filter 12 passes through the cutout portion 190 so as to be radiated to the outside of the ferrule 13E. Consequently, the light-blocking ratio of the optical filter 12 is increased.

In the conventional optical connector, the ferrule is constituted by a material with a high light reflectivity such as zirconia, while the inner surface thereof is formed as a mirror surface. Accordingly, as can be seen from the experiment explained with reference to FIGS. 8 to 11, when the tip portion of the optical fiber 100, which is an optical filter, including the grating 116 is accommodated in the ferrule, the light radiated from the grating 116 so as to be emitted out of the cladding 114 is reflected by the inner surface of the ferrule so as to return to the inside of the cladding 114 and then advances to a part in front of the grating 116, whereby the light-blocking effect by the optical filter has not always been attained sufficiently.

In view of such a fact, in the ferrule 13E of the optical connector shown in FIGS. 35 and 36, the cutout portion 190 is disposed so as to be positioned at a region on which the light radiated from the grating 126 is incident when the optical filter 12 is accommodated in the through-hole 130 of the ferrule 13E. Namely, in the optical connector shown in FIGS. 35 and 36, when the optical filter 12 is accommodated in the through-hole 130, of the light having the reflection wavelength of the grating 126, a light component radiated from the grating 126 to the cladding 124 and then reaches the outer surface of the cladding 124 so as to be emitted out of the cladding 124 passes through the cutout portion 190 so as to be radiated to the outside of the ferrule 13E. Accordingly, suppressed is such a phenomenon that the light radiated from the grating 126 to the cladding 124 is emitted out of the cladding 124 and then is reflected by the inner surface of the through-hole 130 of the ferrule 13E so as to return to the inside of the optical filter 12 and advance to a portion in front of the grating 126. Consequently, of the light having the reflection wavelength of the grating 126, a light component radiated to the cladding 124 so as to pass through the filter region 122 has a reduced power, whereby the optical connector shown in FIGS. 35 and 36 increases the light-blocking ratio of the optical filter 12.

Here, as shown in FIG. 11, the light radiated from the grating 116 to the cladding 114 advances from each portion of the grating 116 to a part positioned obliquely in front thereof. Accordingly, when the cutout portion 190 is disposed at a region positioned obliquely in front of the filter region 122 of the ferrule 13E, the light-blocking ratio of the optical filter 12 can be sufficiently increased.

Preferably, the length (referring to the length along the optical-axis direction (longitudinal direction) here) of the cutout portion 190 disposed in the ferrule 13E is designed as follows. Assuming a case where light advances through an optical fiber having a relative refractive index difference Δ between the core and the cladding, with an angle θ with respect to the axial direction of the optical fiber, maximum value $θ_{MAX}$ of θ satisfying the total reflection condition at the interface between the core and the cladding is expressed as:

$$θ_{MAX} = \sin^{-1}((2Δ)^{1/2})$$

Since the relative refractive index difference Δ between the core 123 and the cladding 124 in the optical filter 12 is 0.0035, $θ_{MAX}$ becomes about 4.8° in this case.

Figure 39:
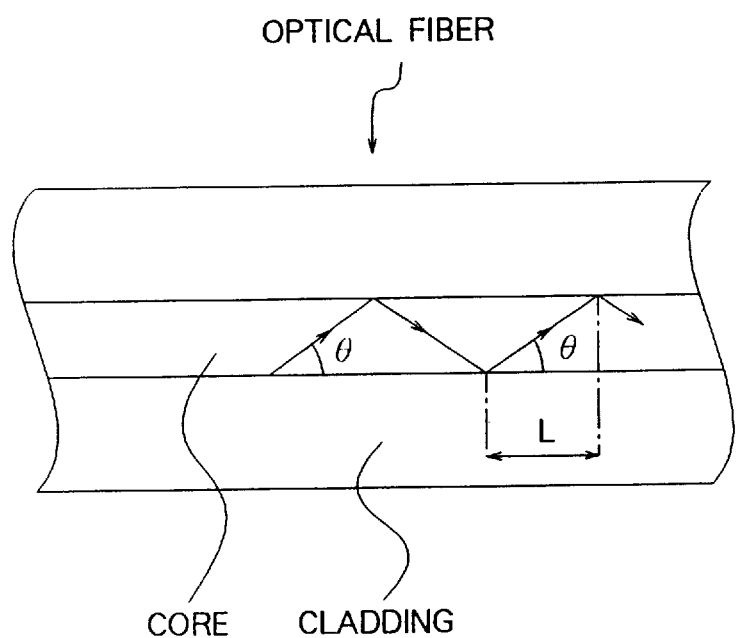
FIG. 39 is a view for explaining how light advances in an optical fiber.

On the other hand, the distance (L in FIG. 39) by which the light advancing through the core travels until it reaches the outer surface of the cladding again after being reflected by the outer surface of the cladding is expressed by:

$$L = a/\tan θ$$

wherein a is the outer diameter of the cladding.

Assuming a case where $θ = θ_{MAX} = 4.8°$, since the outer diameter a of the optical filter 12 is 125 μm, L=125 μm/tan (4.8°)=about 1,488 μm. It corresponds to the distance by which the light satisfying the interference condition for total reflection travels until it reaches the outer surface of the cladding again after being reflected by the outer surface of the cladding. Since the light radiated from the grating 126 to the cladding 124 in the optical filter 12 advances with an angle which is at least greater than this $θ_{MAX}$, the distance by which this light travels until it reaches the outer surface of the cladding again after being reflected by the outer surface of the cladding becomes 1,488 μm or less. Accordingly, when the length of the cutout portion 190 is at least 1,488 μm, the light radiated from the grating 126 reaches, at least once, the outer surface of the cladding 124 which has been exposed by means of the cutout portion 190, and passes through the cutout portion 190 so as to be radiated to the outside of the ferrule 13E. Therefore, from the viewpoint of increasing the efficiency of light radiated from the cutout portion 190, it is preferable that the length of the cutout portion 190 along the axial direction (longitudinal direction) of the optical connector be at least 1,488 μm.

Figure 40:
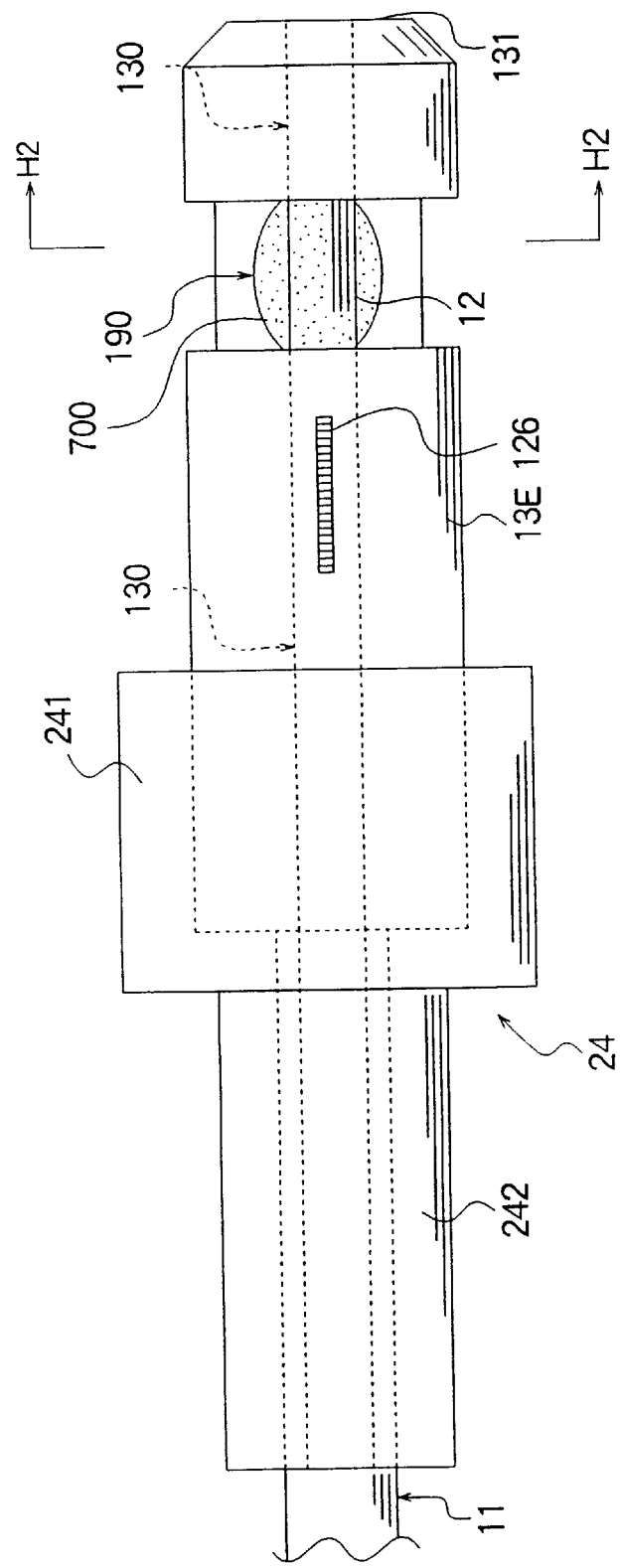
FIG. 40 is a view showing an overall configuration (first applied example of eighth light-blocking structure) in the second embodiment of the optical connector according to the present invention.

Also, it is further preferable that the cutout portion 190 be filled with a refractive-index matching material 700 having a refractive index substantially coinciding with that of the cladding 124 (see FIG. 40). In this case, when the optical filter 12 is accommodated in the through-hole 130 of the ferrule 13E, the light radiated from the grating 126 is hardly reflected by the outer surface of the cladding 124, whereby substantially all of such light is made incident on the inside of the refractive-index matching material 700. Accordingly, the light radiated from the grating 126 is quite efficiently radiated from the cutout portion 190, whereby the light-blocking ratio of the optical filter 12 can be increased greatly. Here, it is sufficient for the refractive index of the refractive-index matching material to coincide with that of the cladding 124 to such an extent that the reflectivity at the outer surface of the cladding 124 becomes 10% or less.

Figure 41:
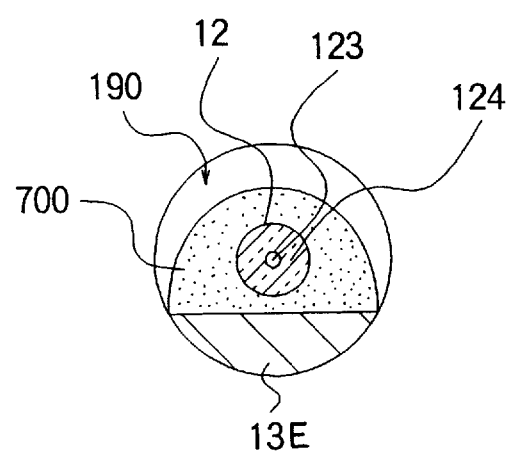
FIG. 41 is a view showing a cross section of the optical connector shown in FIG. 40 taken along line H2—H2.

FIG. 40 is a plan view of the optical connector having the eighth light-blocking structure (first applied example) obtained by way of the assembling step of FIG. 36. FIG. 41 is a cross-sectional view of this optical filter taken along line H2—H2 of FIG. 40. The tip portion 121 of the optical filter 12 from which the resin coating 115 has been removed is inserted into the through-hole 130 of the ferrule 13E, while the grating 126 is also accommodated in the through-hole 130 of the ferrule 13E. In the hollow portion 242 of the flange 24, the portion (including a part of the tip portion) of the optical filter 12 covered with the resin coating 115 is accommodated. The space between the coating 115 of the optical filter 12 and the hollow portion 242 of the flange 24 is filled with an adhesive, by which the optical filter 12 is fixed to the inside of the hollow portion 242 of the flange 24. Here, the inner configuration of the flange 24 is similar to that in the optical connector explained above (e.g., that of FIG. 18).

In the optical connector having the eighth light-blocking structure (first applied example), of the light radiated from the grating 126 to the cladding 124 so as to reach the outer surface of the cladding 124, the light component radiated to the outside of the cladding 124 passes through the cutout portion 190 so as to be radiated to the outside of the ferrule 13E. Consequently, of the light having the reflection wavelength of the grating 126, the light component radiated to the cladding 124 so as to pass through the filter region including the grating 126 has a reduced power. Accordingly, the optical connector of FIG. 40 has a high light-blocking ratio and can also be favorably used as a constituent for an inspection system for optical lines.

In the following, the eighth light-blocking structure (second applied example) of the optical connector in the second embodiment of the present invention will be explained.

Figure 42:
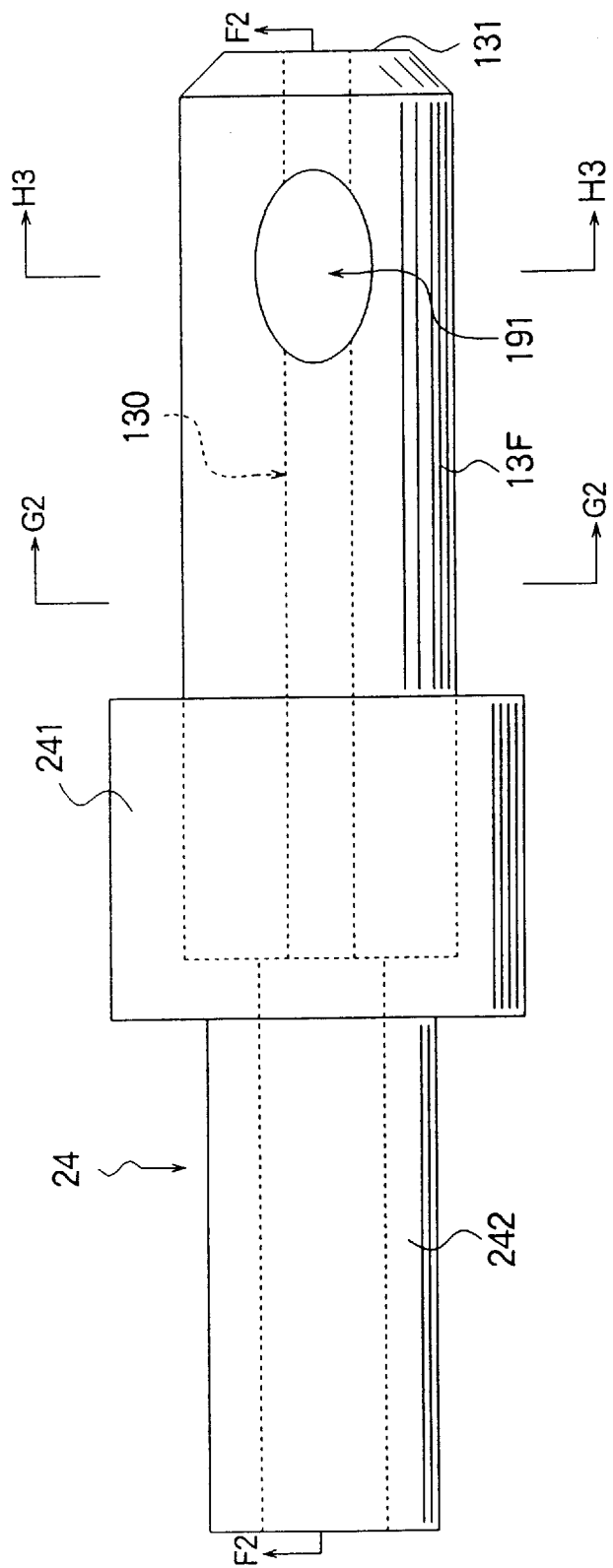
FIG. 42 is a view showing an overall configuration of the plug (second applied example of eighth example) in the second embodiment of the optical connector according to the present invention.
Figure 43:
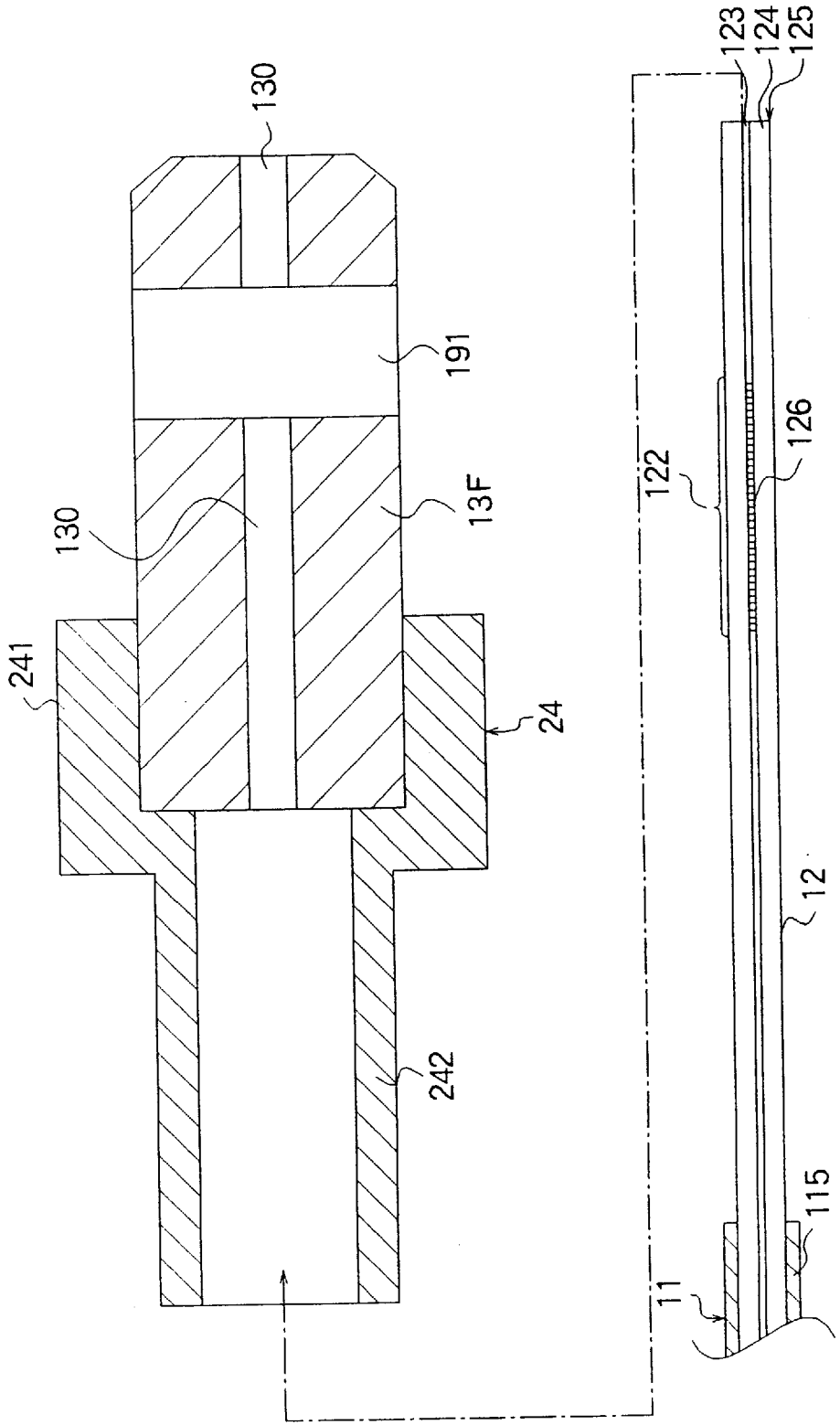
FIG. 43 is a view showing a part of an assembling step for the second embodiment of the optical connector according to the present invention (second applied example of eighth light-blocking structure), corresponding to the cross section taken along line F2—F2 of the plug shown in FIG. 42.
Figure 44:
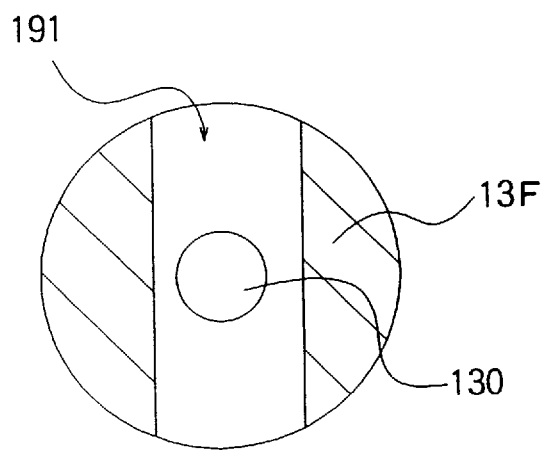
FIG. 44 is a view showing a cross-section of the ferrule shown in FIG. 42 taken along line H3—H3.
Figure 45:
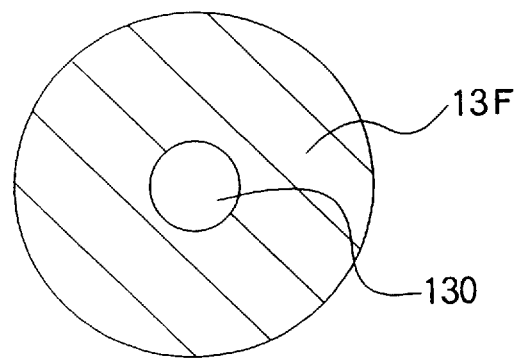
FIG. 45 is a view showing a cross-section of the ferrule shown in FIG. 42 taken along line G2—G2.

FIG. 42 is a plan view showing (only a plug portion of) the optical connector having the eighth light-blocking structure (second applied example). FIG. 43 is a cross-sectional view (corresponding to a cross-sectional view taken along line A—A of FIG. 5) of each member, showing a part of an assembling step for the optical connector taken along line F2—F2 in FIG. 42. Also, FIG. 44 is a cross-sectional view of the ferrule 13F taken along line H3—H3 in FIG. 42, whereas FIG. 45 is a cross-sectional view of the ferrule 13F taken along line G2—G2 in FIG. 42.

The optical connector of FIG. 43, as in the case of the optical connector of FIG. 40, is constituted by the ferrule 13F having the though-hole 130 for accommodating the tip portion 121 of the optical filter 12 therein and the flange 24 having the holding portion 241 to which the rear end portion of the ferrule 13F is attached.

In the optical connector of FIG. 43, an ellipsoidal through-hole (window) 191 is formed at a region of the ferrule 13F which is positioned in front of the grating 126 when the optical filter 12 is accommodated in the through-hole 130. This ellipsoidal through-hole 191 penetrates through the ferrule 13F while being orthogonal to the through-hole 130 of the ferrule 13F.

In the optical connector of FIG. 43, when the optical filter 12 is accommodated in the through-hole 130, of the light having the reflection wavelength of the grating 126, a light component which is radiated from the grating 126 to the cladding 124 and then reaches the outer surface of the cladding 124 so as to be emitted out of the cladding 124 passes through the through-hole 191 so as to be radiated to the outside of the ferrule 13F. Accordingly, suppressed is such a phenomenon that the light radiated from the grating 126 to the cladding 124 is emitted out of the cladding 124 and then is reflected by the inner surface of the through-hole 130 of the ferrule 13F so as to return to the inside of the optical filter 12 and advance to a portion in front of the grating 126. Consequently, of the light having the reflection wavelength of the grating 126, a light component which is radiated to the cladding 124 so as to pass through the filter region including the grating 126 has a reduced power, whereby the optical connector having the eighth light-blocking structure (second applied example) can increase the light-blocking ratio of the optical filter 12.

Here, as shown in FIG. 11, the light radiated from the grating 116 to the cladding 114 advances from each portion of the grating 116 to a part positioned obliquely in front thereof. Accordingly, when the through-hole 191 is disposed at a region positioned obliquely in front of each portion of the grating 126 as in the case of the present invention, the light-blocking ratio of the optical filter 12 can be sufficiently increased.

Also, though the hole 191 penetrating through the ferrule 13F is formed in this eighth light-blocking structure (second applied example), it is not always necessary for the hole to penetrate through the ferrule 13F as long as it is a hole through which the surface of the optical filter 12 is exposed when the optical filter 12 is accommodated in the through-hole 130. The light-blocking ratio of the optical filter 12 can sufficiently be increased in. this case as well.

Figure 46:
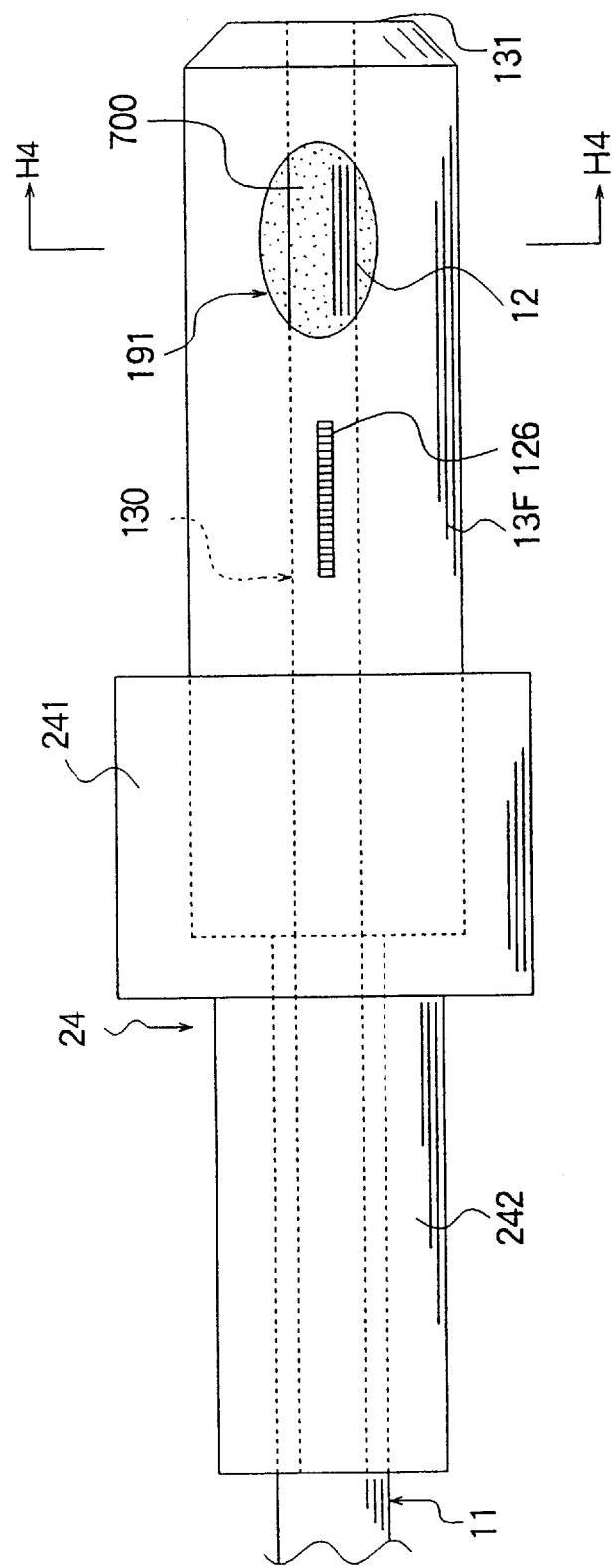
FIG. 46 is a view showing an overall configuration (second applied example of eighth light-blocking structure) in the second embodiment of the optical connector according to the present invention.
Figure 47:
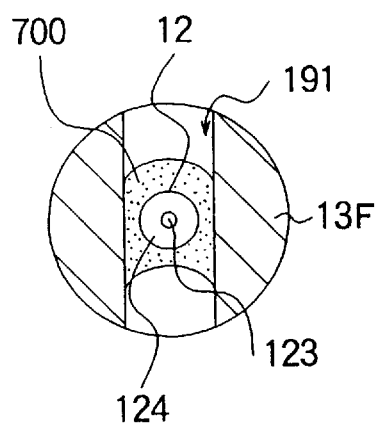
FIG. 47 is a view showing a cross section of the optical connector shown in FIG. 46 taken along line H4—H4.

FIG. 46 is a plan view of the optical connector having the eighth light-blocking structure (second applied example) obtained by way of the assembling step of FIG. 43. FIG. 47 is a cross-sectional view of this optical filter taken along line H4—H4 of FIG. 46. The tip portion 121 of the optical filter 12 from which the resin coating 115 has been removed is inserted into the through-hole 130 of the ferrule 13F, while the grating 126 is also accommodated in the through-hole 130 of the ferrule 13F. In the hollow portion 242 of the flange 24, the portion (including a part of the tip portion) of the optical filter 12 covered with the resin coating 115 is accommodated. The space between the coating 115 of the optical filter 12 and the hollow portion 242 of the flange 24 is filled with an adhesive. The optical filter 12 is fixed to the inside of the hollow portion 242 of the flange 24 by means of this adhesive.

In the optical connector of FIG. 46, of the light radiated from the grating 126 to the cladding 124 so as to reach the outer surface of the cladding 124, the light component radiated to the outside of the cladding 124 passes through the through-hole 191 so as to be radiated to the outside of the ferrule 13F. Consequently, of the light having the reflection wavelength of the grating 126, the light component radiated to the cladding 124. so as to pass through the filter region has a reduced power. Accordingly, the optical connector of FIG. 46 has a high light-blocking ratio and can also be favorably used as a constituent for an inspection system for optical lines.

As explained in detail in the foregoing, in the optical connector having the eighth light-blocking structure (first and second applied examples), when the optical filter is accommodated in the through-hole of the ferrule, the light radiated from the grating of the optical filter passes through the opening portion (including a cutout portion or through-hole) disposed in the ferrule so as to be radiated to the outside. Accordingly, the light passing through the filter region so as to advance to a portion in front of the grating can be reduced, thereby increasing the light-blocking ratio of the optical filter.

In the following, a ninth light-blocking structure of the optical connector in the second embodiment of the present invention will be explained.

Figure 48:
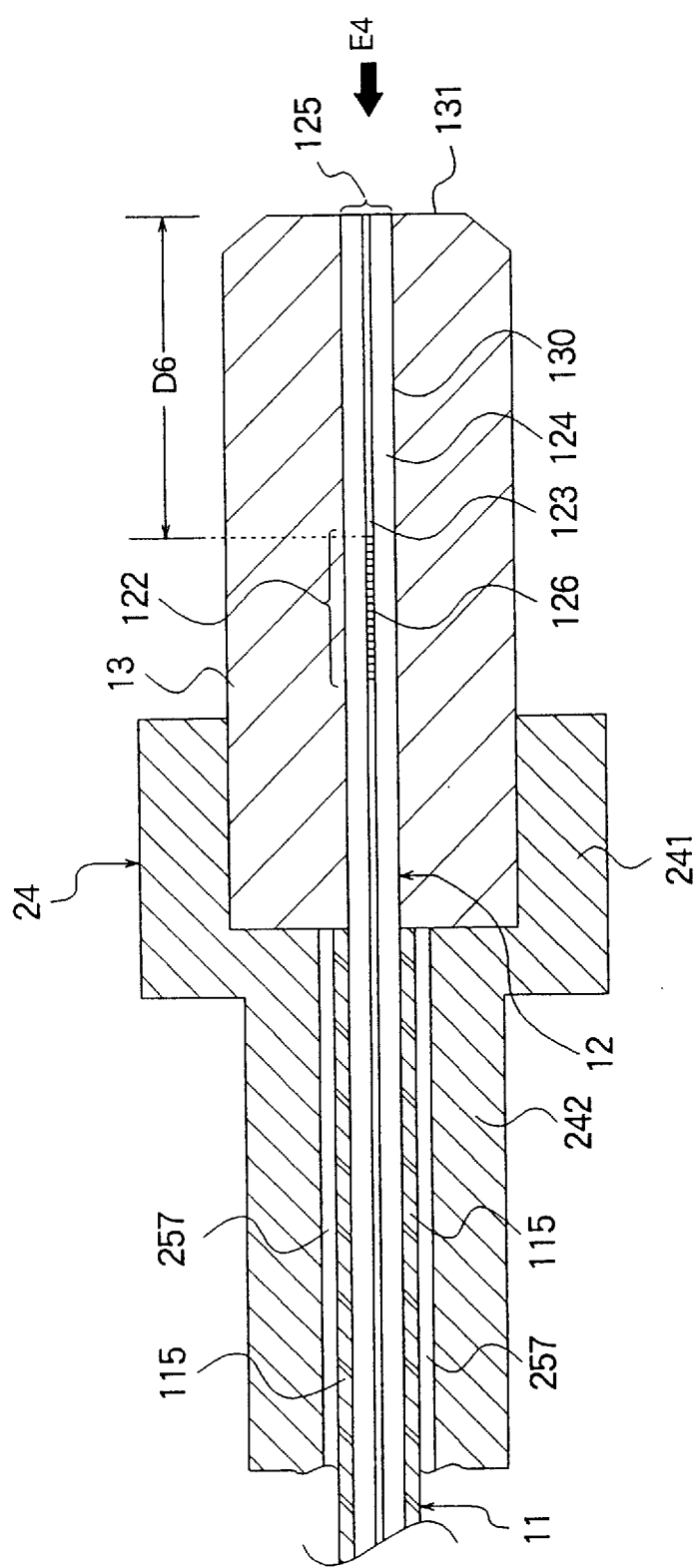
FIG. 48 is a view showing a cross-sectional configuration of the second embodiment of the optical connector according to the present invention (ninth light-blocking structure), corresponding to the cross section taken along line A—A of the optical connector shown in FIG. 5.
Figure 49:
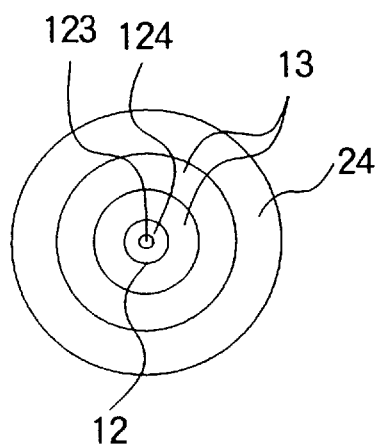
FIG. 49 is a view showing the front face of the optical connector shown in FIG. 48 as viewed from a direction indicated by arrow E4, corresponding to the front face of the optical connector viewed from a direction indicated by arrow E shown in FIG. 5.

FIG. 48 is a lateral cross-sectional view (corresponding to a cross-sectional view taken along line A—A of FIG. 5) showing a configuration of the optical connector having the ninth light-blocking structure. FIG. 49 is a front view of the optical connector of FIG. 48 as viewed from a direction indicated by arrow E4 (corresponding to a front view of the optical connector of FIG. 5 as viewed from a direction indicated by arrow E of FIG. 5). This optical connector is constituted by an optical fiber type optical filter in which the grating 126 is formed in a single-mode optical fiber having the core 123 and the cladding 124, the ferrule 13 having the through-hole 130 with an inner diameter of 126 $\mu$m for accommodating the tip portion 121 of the optical filter 12, and the flange 24 having the holding portion 241 for holding the ferrule 13. Here, the ferrule 13 is made of zirconia.

For example, this optical filter 12 is used in an inspection system for optical communication network in which an OTDR apparatus is employed.

As shown in FIG. 48, the grating 126 of the optical filter 12 is formed at.a position separated from the end face 125 of the optical filter 12 by D6 (>3 mm.

Numeral 115 in FIG. 48 refers to a UV-cutoff resin coating which covers the surface of the cladding 124, functioning to protect the core 123 and the cladding 124. The resin coating 115 is eliminated at the tip portion 121 of the optical fiber 12 so that the core 123 can be irradiated with ultraviolet rays in order to form the grating 126 therein as mentioned above.

The ferrule 13 is a member having the through-hole 130 for accommodating the tip portion 121 of the optical filter 12 from which the resin coating 115 has been removed. This tip portion 121 includes the filter region 122 in which the grating 126 is formed.

The flange 24 is a tubular holding member in which the rear end portion of the ferrule 13 is attached to the holding portion 241 thereof. In the hollow portion 242 of the flange 24, the optical filter 12 covered with the coating 115 is accommodated. The space between the coating 115 of the optical filter 12 and the hollow portion 242 of the flange 24 is filled with the adhesive 257. The optical filter 12 is fixed to the inside of the hollow portion 242 by means of this adhesive 257.

Here, in the optical filter in which a grating whose refractive index changes along the optical-axis direction (longitudinal direction) is formed, the mode field diameter (MFD) of the light propagated therethrough changes according to the change in refractive index. Accordingly, even in the case of the advancing light which has satisfied a condition under which it is confined near the core before being made incident on the grating, a part thereof is radiated toward the cladding. Such radiated light is directly emitted from the light-emitting end face when it is generated near the light-emitting end face. By contrast, at a place far from the position where it has been generated, most of the radiated light reaches the outer peripheral surface of the cladding, whereby a light component which has been reflected at least once by the outer peripheral interface or a light component which has been reflected at least once by the incident surface with respect to the accommodating member by way of the outer peripheral interface is emitted from the light-emitting end face. In general, since the accommodating member is made of a material having a relatively high reflectivity such as metal from the viewpoint of mechanical strength, it exhibits a reflectivity higher than that of interface reflection at the outer peripheral portion of the cladding. Accordingly, when an accommodating member (such as ferrule) which is preferable in terms of accommodation has a hollow portion having a diameter substantially the same as the outer diameter of the optical filter, reflection at the incident surface with respect to the accommodating member may become problematic in particular.

The optical connector of FIG. 48 is characterized in that, of the light having the reflection wavelength of the grating 126, the light which is radiated from the grating 126 to the cladding 124 and then traverses the cladding 124 so as to be emitted out of the cladding 124 is always generated at a position which is separated from the light-emitting end face 125 of the optical filter 12 by 3 mm or more.

The optical connector of FIG. 48 is realized in view of such a fact. Namely, in the optical connector having the ninth light-blocking structure, the light radiated from the grating 126 to the cladding 124 is reflected by the outer surface of the cladding or inner surface of the ferrule a number of times before it reaches the light-emitting end face.

Accordingly, as compared with the intensity of the radiated light at the time when it is generated, that of the radiated light which has reached the light-emitting end face is greatly attenuated.

As a result, in the light emitted from the light-emitting end face of the optical filter 12, the light component having the reflection wavelength at the grating 126 is effectively blocked.

The inventors have already confirmed the above-mentioned phenomenon by using the experimental apparatus shown in FIG. 8.

In the following, an experiment for verifying the effectiveness of the optical connector (ninth light-blocking structure) according to the present invention will be explained. FIGS. 50 to 53 are explanatory views for this experiment.

Figure 50:
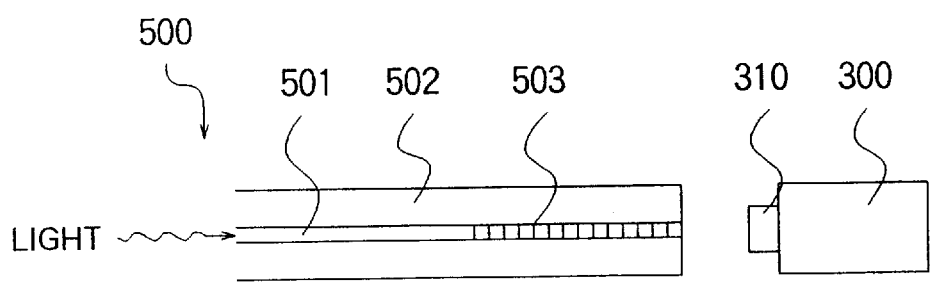
FIG. 50 is a view showing a configuration of an apparatus for measuring the wavelength dependency in transmissivity of an optical filter to which no connector is attached (having a grating not covered with a plug)

First, as shown in FIG. 50, an optical waveguide comprising, like the optical filter 12, a core 501 and a cladding 502 was prepared. Then, an excimer laser (with an oscillation wavelength of 248 nm) was used to form a grating 503 whose grating pitch continuously changed from 1,550 nm to 1,542 nm with a grating-pitch changing rate of 1 nm/mm from a tip of the optical waveguide, thereby preparing a waveguide type optical filter 500. Then, while a plug (ferrule 504) was not attached thereto, the wavelength dependency of transmissivity in the optical filter 500 was measured. Consequently, the results of measurement shown in the graph of FIG. 51 were obtained. Here, numerals 310 and 300 in FIG. 50 respectively refer to a fiber adapter and a spectrum analyzer as mentioned in the explanation concerning the experimental apparatus of FIG. 8.

Figure 52:
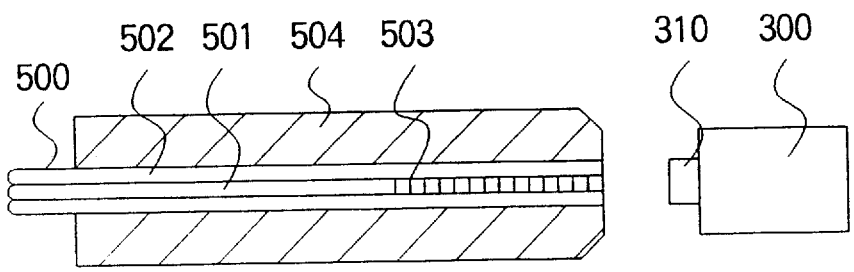
FIG. 52 is a view showing a configuration of an apparatus for measuring the wavelength dependency in transmissivity of an optical filter to which a connector is attached (having a grating covered with a plug)

Next, as shown in FIG. 52, the optical filter 500 was inserted into a ferrule 504 made of zirconia having a through-hole with an inner diameter of 126 μm and fixed with an adhesive (353ND manufactured by Epoxy Technology Inc.) so as to form an optical connector connector. Then, the wavelength dependency of transmissivity in the optical filter 500 was measured. Consequently, the results of measurement shown in the graph of FIG. 53 were obtained.

Figure 51:
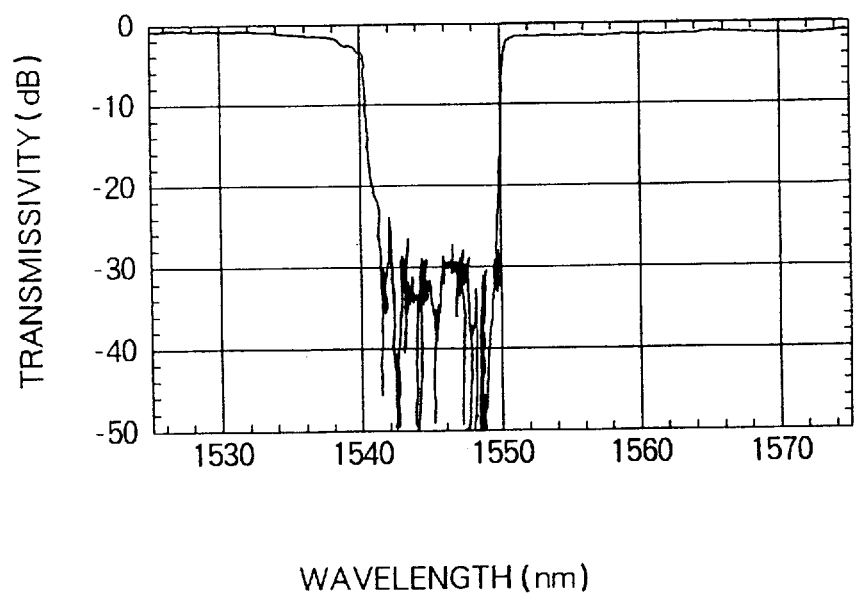
FIG. 51 is a graph showing a result of measurement of an optical filter to which no connector is attached, as measured by means of the apparatus shown in FIG. 50.
Figure 53:
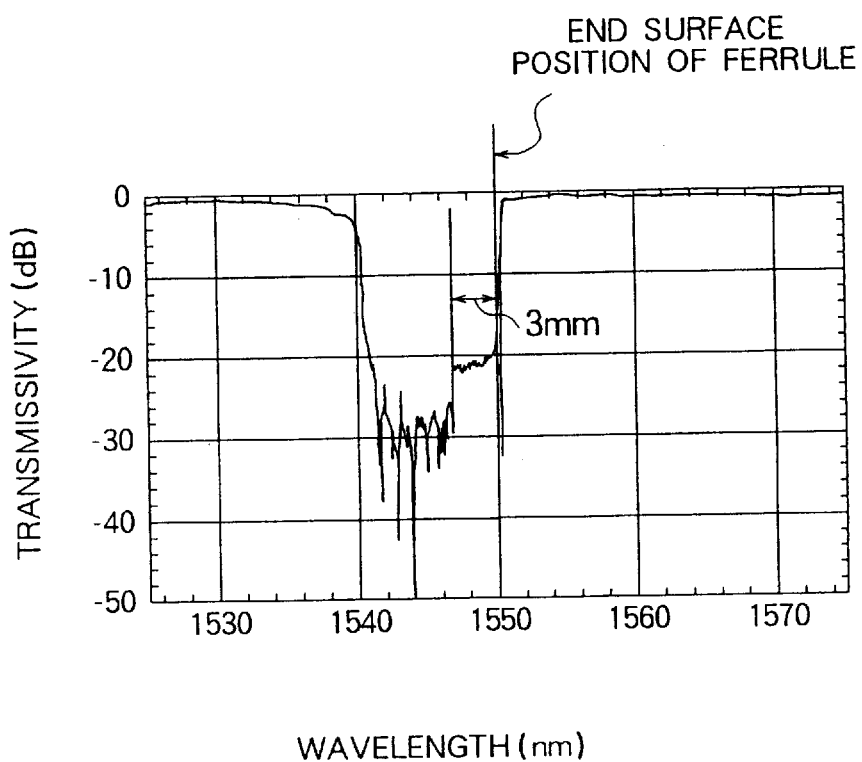
FIG. 53 is a graph showing a result of measurement of an optical filter to which a connector is attached, as measured by means of the apparatus shown in FIG. 52.

As FIGS. 51 and 53 were.compared with each other, it has been confirmed that, while the transmissivity of the light corresponding to the wavelengths at the portion of the optical filter 500 extending from the light-emitting end face by 3 mm greatly decreases when the plug (including the ferrule 504) is attached (FIG. 52) as compared with that when the plug is not attached (FIG. 50), the amount of reduction in transmissivity between the case where the connector is formed (FIG. 52) and the case where the connector is not formed (FIG. 50) is smaller in the light corresponding to the wavelengths at the portion of the optical filter 500 separated from the light-emitting end face by at least 3 mm.

Without being restricted to the above-mentioned embodiment, the present invention can be modified. For example, the present invention yields a similar result even when the ferrule 13 is made of a material having a reflectivity other than zirconia.

As explained in detail in the foregoing, in the optical connector having the ninth light-blocking structure, since the grating is formed at a position separated from the light-emitting end face of the optical filter by at least 3 mm, the radiated light which is generated at the grating so as to advance from the core toward the cladding is reflected a number of times by the outer surface of the cladding or the inner surface of the through-hole of the ferrule. Accordingly, the radiated light reaching the light-emitting end face of the optical filter is greatly reduced as compared with that when generated, whereby a filter-accommodating optical connector which effectively blocks the light of the reflection wavelength determined by the pitch of the grating can be realized.

In the following, a tenth light-blocking structure of the optical connector in the second embodiment of the present invention will be explained.

Figure 54:
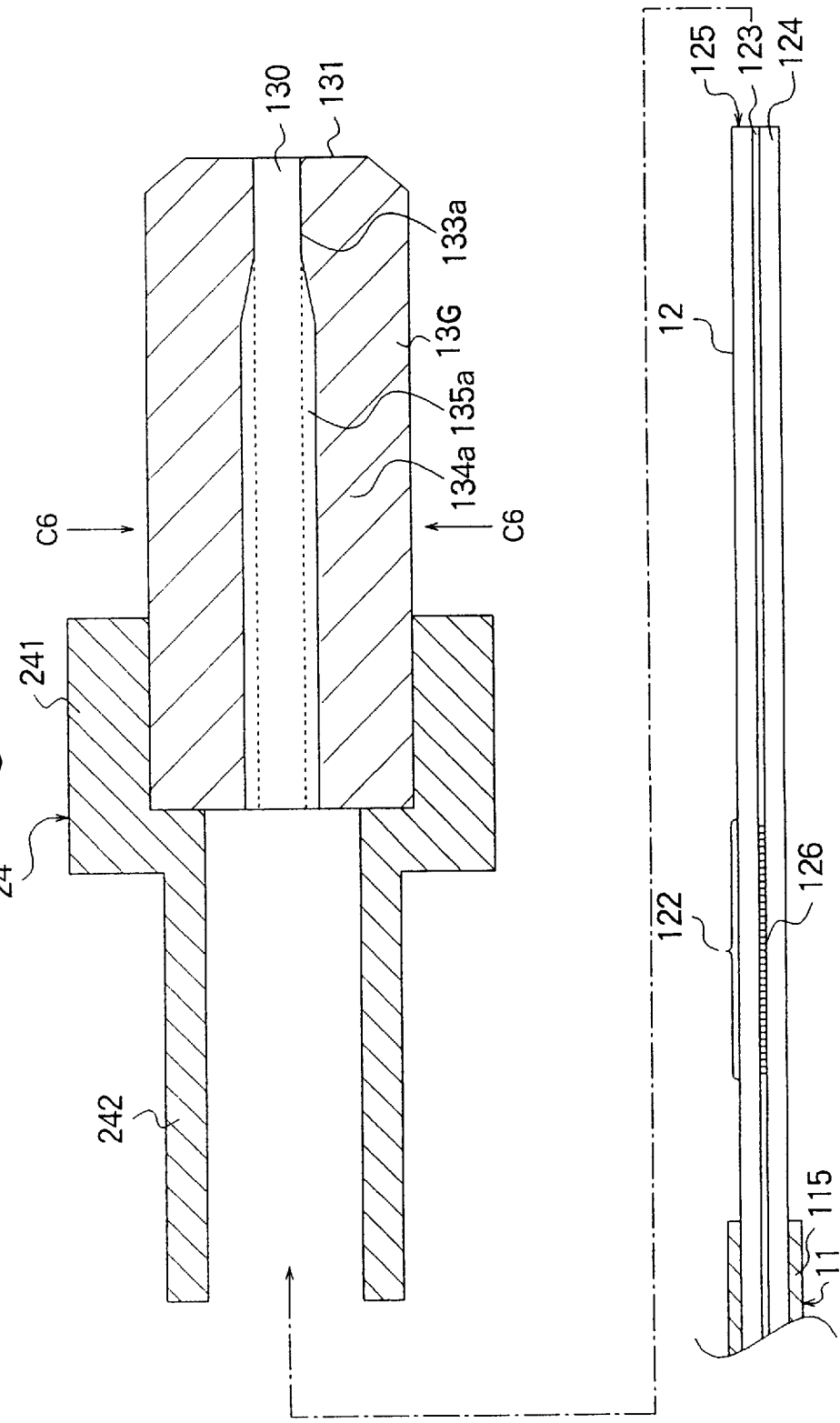
FIG. 54 is a view showing a part of an assembling step for the second embodiment of the optical connector according to the present invention (tenth light-blocking structure), corresponding to the cross section taken along line A—A of optical connector shown in FIG. 5.
Figure 55:
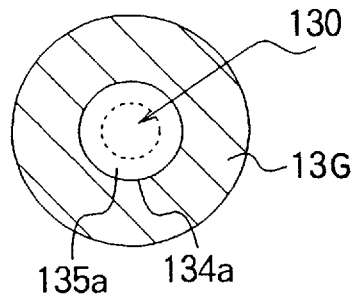
FIG. 55 is a view showing an overall cross-sectional configuration of the optical connector shown in FIG. 54 at a part indicated by arrow C6, corresponding to the cross section taken along line C—C of the optical connector shown in FIG. 5.

FIG. 54 is a lateral cross-sectional view (corresponding to a cross-sectional view taken along line A—A of FIG. 5) of each member, showing a part of an assembling step for the optical connector having the tenth light-blocking structure. FIG. 55 is a cross-sectional view (corresponding to a cross-sectional view taken along line C—C of FIG. 5) of the optical connector at a portion indicated by arrow C6 of FIG. 54. This optical connector is used for connecting the optical filter 12 to another optical element, and adapted to accommodate the tip portion 121 of the optical filter 12 therein. Specifically, as shown in FIG. 54, this optical connector is constituted by the ferrule 13G having the though-hole 130 for accommodating the tip portion 121 of the optical filter 12 therein and the flange 24 having the holding portion 241 to which the rear end portion of the ferrule 13G is attached.

This optical filter 12 is an optical fiber type optical filter in which the grating 126 is formed in a single-mode optical fiber having the core 123 and the cladding 124. The grating 126 is formed in the tip portion 121 of the optical filter 12.

Numeral 115 in FIG. 54 refers to a UV-cutoff resin coating which covers the surface of the cladding 124, functioning to protect the core 123 and the cladding 124. As shown in FIG. 54, the resin coating 115 is eliminated at the tip portion 121 of the optical fiber 12, and this tip portion 121 is inserted into the through-hole 130 of the ferrule 13G.

The ferrule 13G is a member having the through hole 130 for accommodating the tip portion 121 (having an outer diameter of 125 μm) of the optical filter 12 from which the resin coating 115 has been removed. The through-hole 130 extends along the center axis of the ferrule 13G, such that the tip portion 121 of the optical filter 12 is inserted therein. The flange 24 is a tubular holding member in which the rear end portion of the ferrule 13G is attached to the holding portion 241 thereof. In the hollow portion 242 of the flange 24, the portion (including a part of the tip portion) of the optical filter 12 covered with the coating 115 is accommodated.

In the optical connector having the tenth light-blocking structure, the through-hole 130 of the ferrule 13G is constituted by a normal portion 133a and an enlarged portion 134a. The normal portion 133a, whose cross section orthogonal to the center axis of the through-hole 130 is a circle having a diameter of 126 μm, has a cross section substantially the same as that of the tip portion 121 of the optical filter 12 from which the coating 115 has been removed, so that the tip portion 121 can be held. Also, the normal portion 133a is disposed at a part including the end face 131 of the ferrule 13G (surface at which the end face 125 of the optical filter 12 is exposed when the optical filter 12 is accommodated therein) in the tip portion of the ferrule 13G. The enlarged portion 134a, by contrast, has a circular cross section orthogonal to the center axis of the through-hole 130, with a diameter greater than that of the cross section of the normal portion 133a. Specifically, the enlarged portion 134a is constituted by a part whose cross section has a diameter of 500 μm extending from the rear end portion of the ferrule 13G toward the normal portion 133a and a part whose diameter continuously changes along the axial direction from 500 μm to 125 μm so as to be finally connected to the normal portion 133a. This enlarged portion 134a is disposed at a region which surrounds the filter region 122, in which the grating 126 has been formed, when the tip portion 121 of the optical filter 12 is inserted into the through-hole 130.

In the enlarged portion 134a, when the optical filter 12 is accommodated in the ferrule 13G of FIG. 54, a gap 135a is formed between the inner surface of the through-hole 130 of the ferrule 13G and the outer surface of the optical filter 12. Accordingly, of the light having the reflection wavelength of the grating 126, the light component radiated from the grating 126 to the cladding 124 extends to the gap 135a, thereby increasing the light-blocking ratio of the optical filter 12.

By using the experimental apparatus explained with reference to FIGS. 8 to 11, the inventors have already confirmed that the light radiated from the grating formed in the core 123 of the optical filter 12 toward the cladding 124 decreases the light-blocking ratio of the optical filter 12.

Conventionally, the ferrule in the optical connector is constituted by a material with a high light reflectivity such as zirconia, while the inner surface thereof is formed as a mirror surface. Accordingly, when the tip portion of the optical fiber 100, which is an optical filter, including the grating 116 is accommodated in the ferrule, the light radiated from the grating 116 so as to be emitted out of the cladding 114 is reflected by the inner surface of the ferrule so as to return to the inside of the cladding 114 and then advances to a part in front of the grating 116, whereby the light-blocking effect by the optical filter has not always been attained sufficiently (see FIGS. 8 to 11).

In view of such a fact, the optical connector having the tenth light-blocking structure is provided. As mentioned above, when the optical filter 12 is accommodated in the ferrule 13G of FIG. 54, the gap 135a is formed between the ferrule 13G and the optical filter 12 in the enlarged portion 134a. Since this gap 135a does not have a reflectivity as high as that of the ferrule 13G, when the optical filter 12 is accommodated in the through-hole 130 of the ferrule 13G, of the light having the reflection wavelength of the grating 126, the light component radiated from the grating 126 to the cladding 124 advances while extending to the gap 135a outside of the cladding 124. Thereafter, while the light radiated from the grating 126 reaches the normal portion 133a, of the light radiated from the grating 126, the leaking light component distributed in the gap 135a is blocked by the inner surface of the through-hole 130 of the ferrule 13G at the portion of the through-hole 130 in which the diameter of the cross section continuously changes along the axial direction. Consequently, of the light having the reflection wavelength of the grating 126, a light component which is radiated to the cladding 124 so as to pass through the filter region 122 including the grating 126 has a reduced power, whereby the optical connector of FIG. 54 can increase the light-blocking ratio of the optical filter 12.

According to the discovery of the inventors, when the diameter of the cross section of the enlarged portion 134a is greater by at least 50 μm than the outer diameter of the portion of the optical filter 12 from which the resin coating 115 has been removed, the light radiated from the grating 126 sufficiently expands so as to be blocked by the ferrule 13G with a higher ratio, whereby the light-blocking ratio of the optical filter 12 can be sufficiently increased. Here, the condition mentioned above corresponds to a case where the cross-sectional area of the enlarged portion 134a is at least twice as large as that of the optical filter 12.

Also, the above-mentioned gap 135a may be filled with an adhesive when the optical filter 12 is accommodated in the through-hole 130 of the ferrule 13G. In this case, when the diameter of the cross section of the enlarged portion 134a is greater by at least 700 μm than the outer diameter of the portion of the optical filter 12 from which the resin coating 115 has been removed, the stress imparted to the grating upon curing of the adhesive may unfavorably increase so as to greatly fluctuate characteristics of the grating 126.

In the case where the gap 135a is filled with a refractive-index matching material having a refractive index substantially coinciding with that of the surface layer portion of the cladding 124, when the optical filter 12 is accommodated in the through-hole 130 of the ferrule 13G, the light radiated from the grating 126 is hardly reflected by the outer surface of the optical filter 12. Accordingly, the light radiated from the grating 126 quite efficiently extends to the gap 135a, whereby the light-blocking ratio of the optical filter 12 can be increased very much.

Also, in the case where the gap 135a is filled with a refractive-index matching material having a refractive index higher than that of the surface layer portion of the cladding 124 of the optical filter 12, when the optical filter 12 is accommodated in the through-hole 130 of the ferrule 13G, the light radiated from the grating 126 is hard to be totally reflected by the outer surface of the optical filter 12. Consequently, the light radiated from the grating 126 quite efficiently extends to the gap 135a, whereby the light-blocking ratio of the optical filter 12 can be increased greatly.

Figure 56:
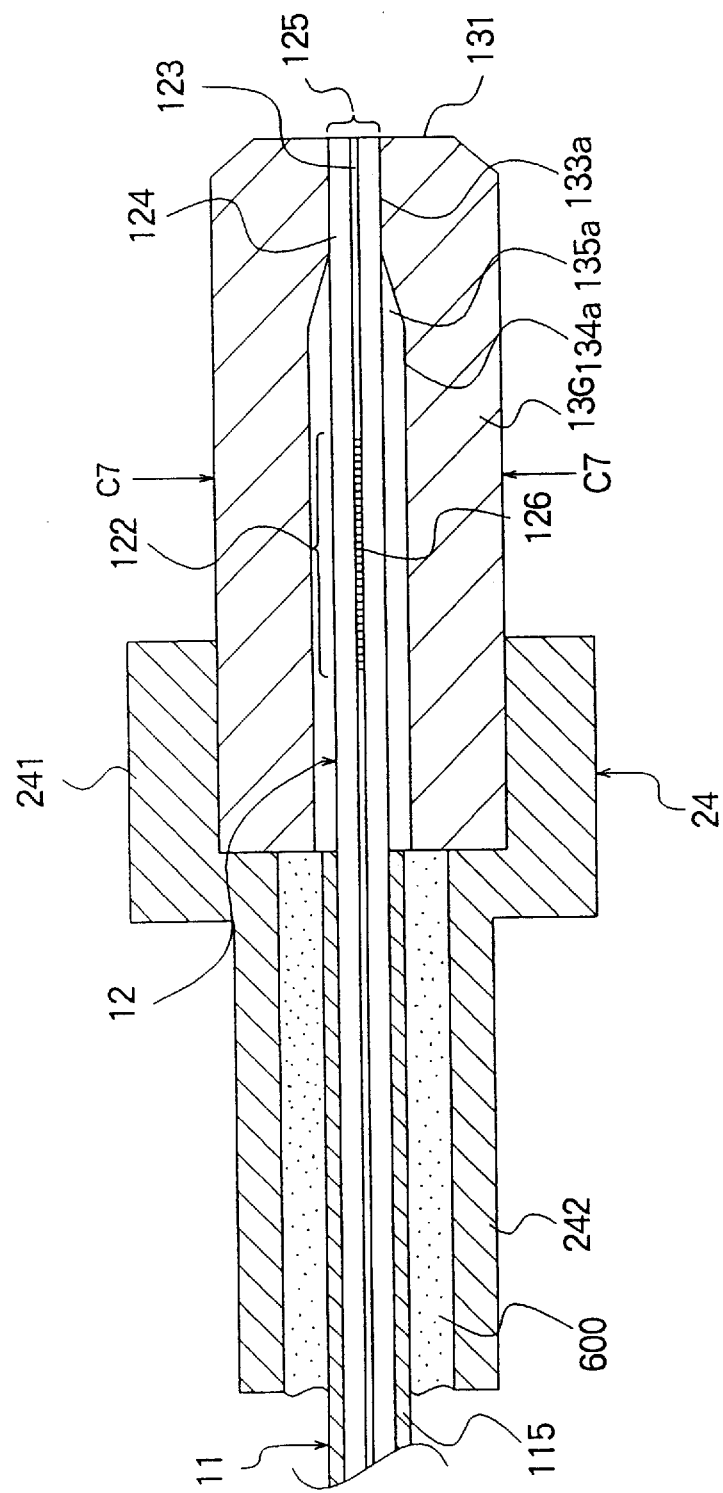
FIG. 56 is a view showing a cross-sectional configuration of the second embodiment of the optical connector according to the present invention (tenth light-blocking structure), corresponding to the cross section taken along line A—A of the optical connector shown in FIG. 5.
Figure 57:
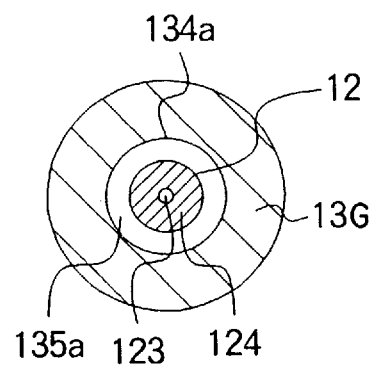
FIG. 57 is a view showing an overall cross-sectional configuration of the optical connector shown in FIG. 56 at a part indicated by arrow C7, corresponding to the cross section taken along line C—C of the optical connector shown in FIG. 5.

FIG. 56 is a cross-sectional view (corresponding to a cross-sectional view taken along line A—A of FIG. 5) showing a configuration of the optical connector obtained by way of the assembling step shown in FIG. 54. FIG. 57 is a cross-sectional view (corresponding to a cross-sectional view taken along line C—C of FIG. 5) of the optical connector at a portion indicated by arrow C7 of FIG. 55. The tip portion 121 of the optical filter 12 from which the resin coating 115 has been removed is inserted in the through-hole 130 of the ferrule 13G, such that the grating 126 is positioned in the enlarged portion 134a. The normal portion 133a of the through-hole 130 surrounds the end portion of the optical filter 12 including the end face 125 so as to be substantially in close contact therewith, thereby holding the optical filter 12. In the enlarged portion 134a, by contrast, the gap 135a is formed between the outer surface of the optical filter 12 and the inner surface of the through-hole 130 of the ferrule 13G. In the hollow portion 242 of the flange 24, the portion (including a part of the tip portion) of the optical filter 12 covered with the resin coating 115 is accommodated. The space between the coating 115 and the optical filter 12 and the hollow portion 242 is filled with an adhesive 600. The optical filter 12 is fixed to the inside of the hollow portion 242 by means of this adhesive 600.

In the optical connector of FIG. 56, of the light having the reflection wavelength of the grating 126, the light component radiated from the grating 126 to the cladding 124 advances while extending to the gap 135a outside of the cladding 124. Thereafter, while the light radiated from the grating 126 reaches the normal portion 133a, of the light radiated from the grating 126, the leaking light component distributed in the gap 135a is blocked by the inner surface of the through-hole 130 of the ferrule 13G and cannot advance further therefrom. Consequently, of the light having the reflection wavelength of the grating 126, the light component which is radiated to the cladding 124 so as to pass through the filter region 122 including the grating 126 has a reduced power. Accordingly, the optical connector having the tenth light-blocking structure has a high light-blocking ratio and can also be favorably used as a constituent in an inspection system for optical lines.

In the following, an eleventh light-blocking structure of the optical connector in the second embodiment of the present invention will be explained.

Figure 58:
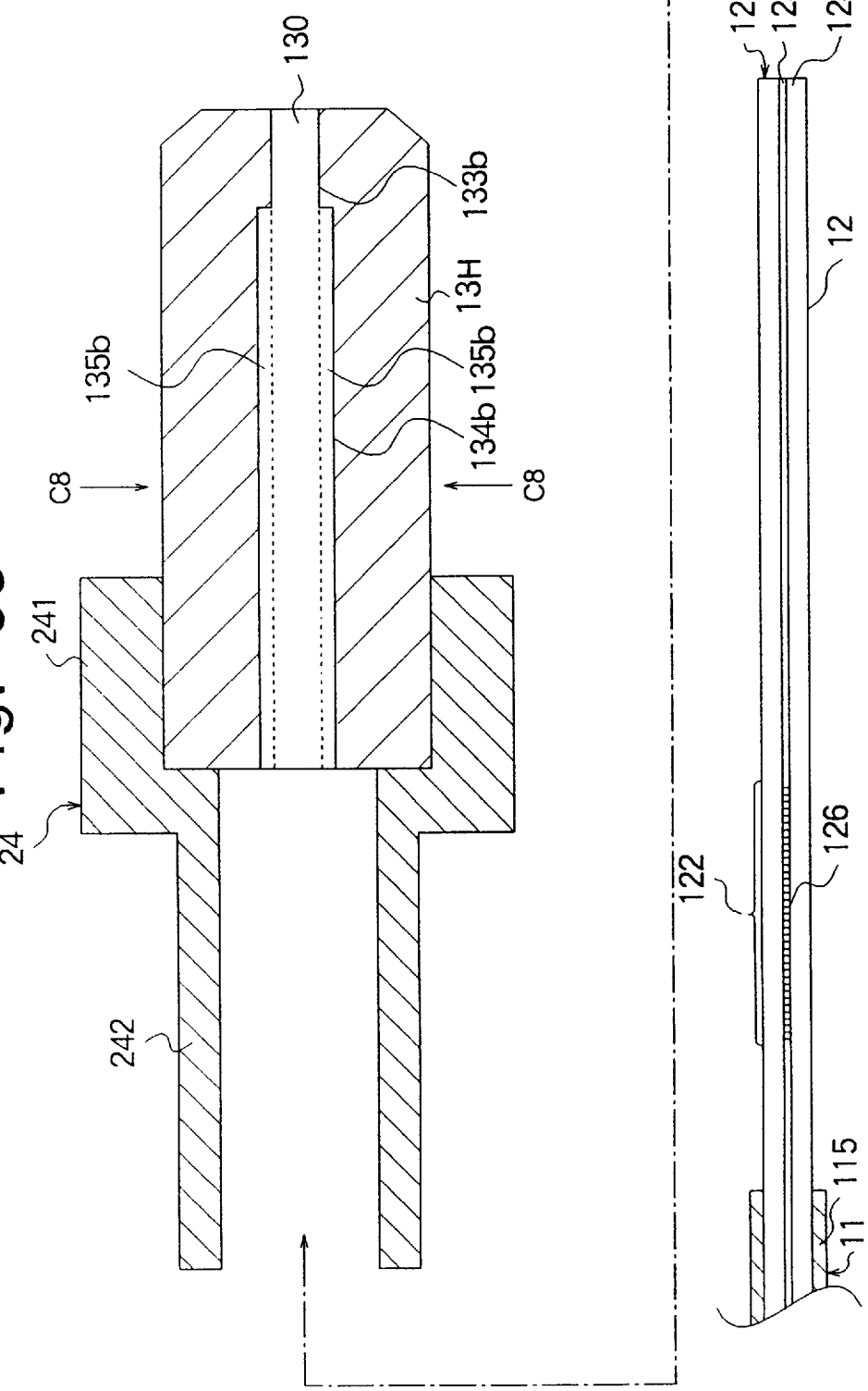
FIG. 58 is a view showing a part of an assembling step for the second embodiment of the optical connector according to the present invention (first applied example of eleventh light-blocking structure), corresponding to the cross section taken along line A—A of the optical connector shown in FIG. 5.
Figure 59:
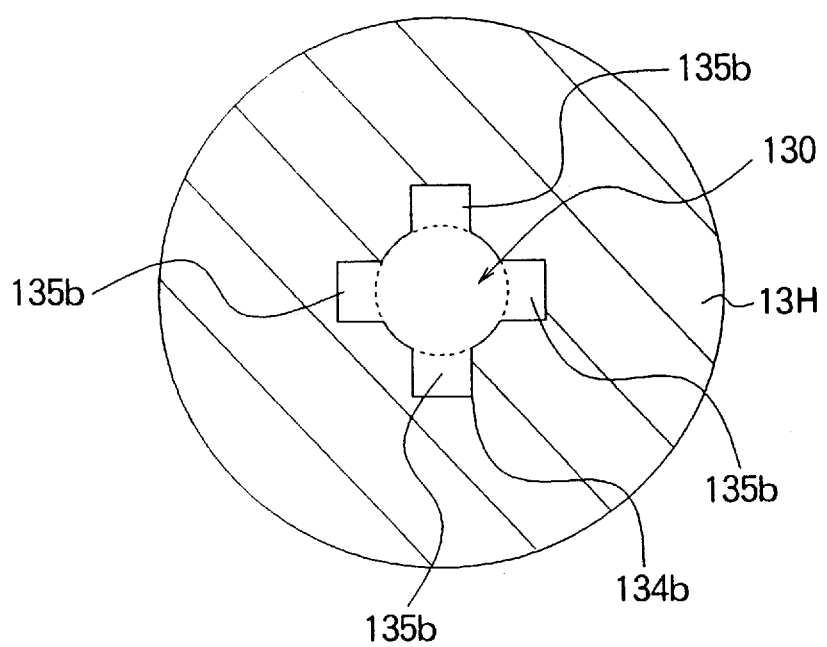
FIG. 59 is a view showing an overall cross-sectional configuration of the optical connector shown in FIG. 58 at a part indicated by arrow C8, corresponding to the cross section taken along line C—C of the optical connector shown in FIG. 5.

FIG. 58 is a lateral cross-sectional view (corresponding to a cross-sectional view taken along line A—A of FIG. 5) of each member, showing a part of an assembling step for the optical connector having the eleventh light-blocking structure (first applied example). FIG. 59 is a cross-sectional view (corresponding to a cross-sectional view taken along line C—C of FIG. 5) of the optical connector at a portion indicated by arrow C8 of FIG. 58. As shown in FIG. 59, in the ferrule 13H of the optical connector having the eleventh light-blocking structure (first applied example), the cross-sectional form of the enlarged portion 134b of the through-hole 130 is different from that in the optical connector of FIG. 54. Namely, the enlarged portion 134b comprises four grooves 135b formed in the inner surface of the through-hole 130 extending along the center axis of the ferrule 13H. The through-hole 130 shown in FIGS. 58 and 59 has a cross section similar to that of the normal portion 133b, i.e., circular cross section with a diameter of 126 μm, so that the optical filter 12 can be held. Also, each of the four grooves 135b extends along the center axis of the through-hole 130 while they are disposed with equal intervals along the circumferential direction of the inner surface of the through-hole 130 of the ferrule 13H.

When the optical filter 12 is accommodated in the ferrule 13H of FIG. 58, a gap is formed between the groove 135b defined by the enlarged portion 134b of the through-hole 130 and the outer surface of the optical filter 12. Accordingly, as in the case of the optical connector of FIG. 56, of the light having the reflection wavelength of the grating 126, the light component radiated from the grating 126 to the cladding 124 advances while extending to the gap 135a outside of the cladding 124, and then the leaking light component distributed in the gap 135a is blocked by the inner surface of the through-hole 130 at the interface between the enlarged portion 134b and the normal portion 133b. Consequently, of the light having the reflection wavelength of the grating 126, the light component radiated to the cladding 124 so as to pass through the filter region 122 including the grating 126 has a reduced power. Accordingly, the optical connector having the eleventh light-blocking structure (first applied example), as in the case of the optical connector of FIG. 54, can increase the light-blocking ratio of the optical filter 12.

Further, in the optical. connector of FIG. 58, since the through-hole 130 shown in FIGS. 58 and 59 of the enlarged portion 134b has a cross section substantially the same as that of the optical filter 12, the optical filter 12 is appropriately held not only in the normal portion 133b but also in the enlarged portion 134b. Accordingly, in the optical connector of FIG. 58, the optical filter 12 can be held more securely.

Here, in the case where the grooves 135b are filled with a refractive-index matching material 800 having a refractive index substantially coinciding with that of the surface layer portion of the cladding 124, when the optical filter 12 is accommodated in the through-hole 130 of the ferrule 13H, the light radiated from the grating 126 is hardly reflected by the outer surface of the optical filter 12. Accordingly, the light-blocking ratio of the optical filter 12 can be increased very much.

Also, in the case where the grooves 135b are filled with the refractive-index matching material 800 having a refractive index higher than that of the surface layer portion of the cladding 124 of the optical filter 12, when the optical filter 12 is accommodated in the through-hole 130 of the ferrule 13H, the light radiated from the grating 126 is hard to be totally reflected by the outer surface of the optical filter 12. Accordingly, the light-blocking ratio of the optical filter 12 can be increased greatly.

Figure 60:
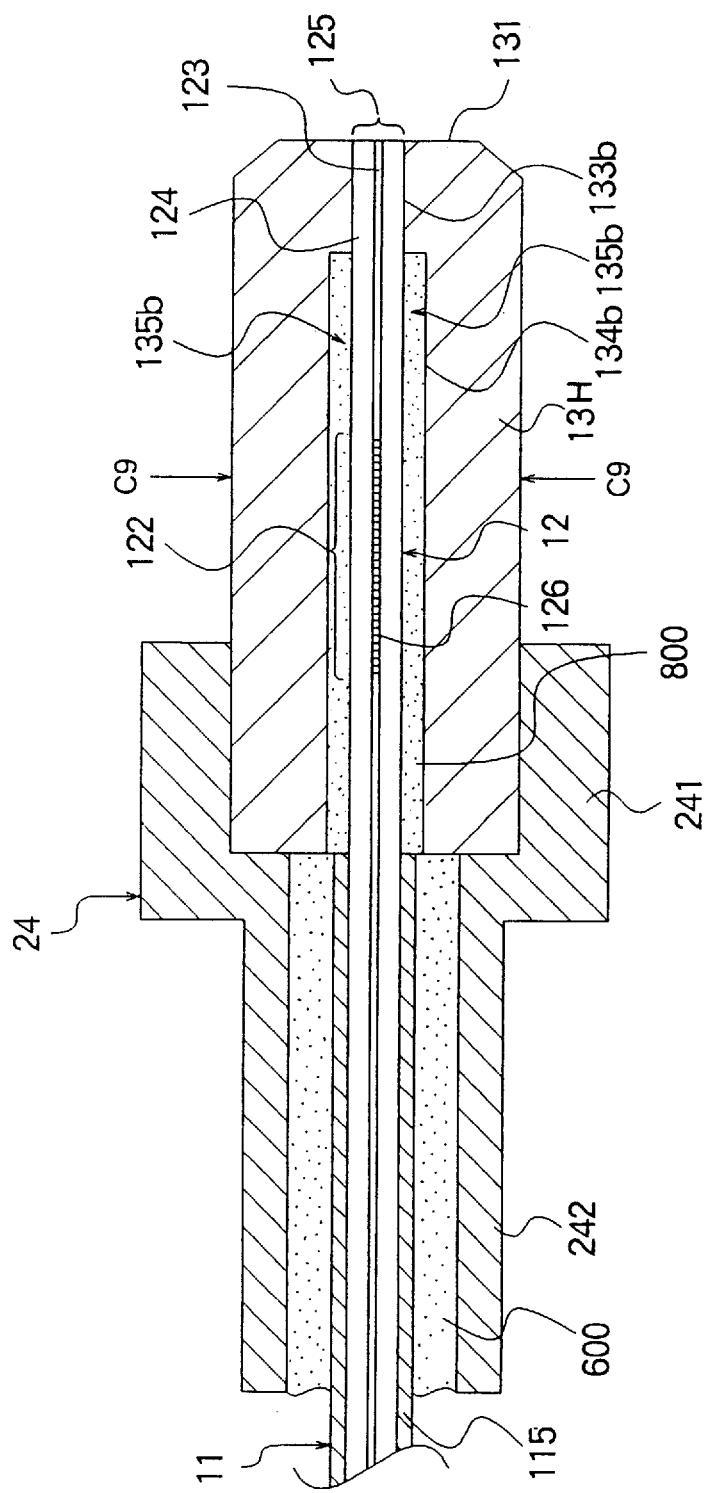
FIG. 60 is a view showing a cross-sectional configuration of the second embodiment of the optical connector according to the present invention (first applied example of eleventh light-blocking structure), corresponding to the cross section taken along line A—A of the optical connector shown in FIG. 5.
Figure 61:
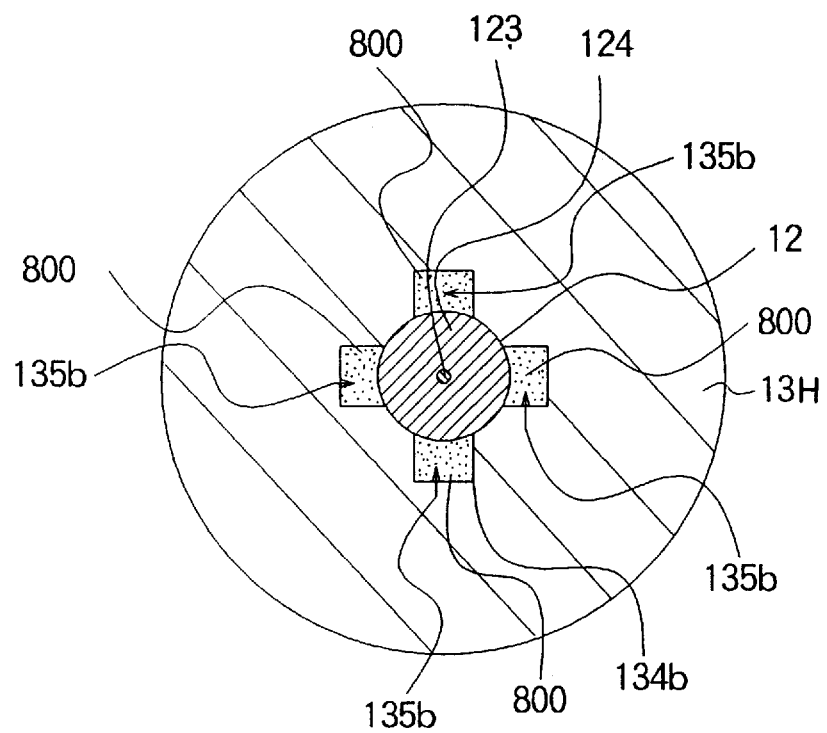
FIG. 61 is a view showing an overall cross-sectional configuration of the optical connector shown in FIG. 60 at a part indicated by arrow C9, corresponding to the cross section taken along line C—C of the optical connector shown in FIG. 5.

FIG. 60 is a cross-sectional view (corresponding to a cross-sectional view taken along line A—A of FIG. 5) showing a configuration of the optical connector obtained by way of the assembling step shown in FIG. 58. FIG. 61 is a cross-sectional view (corresponding to a cross-sectional view taken along line C—C of FIG. 5) of the optical connector at a portion indicated by arrow C9 of FIG. 60. The tip portion 121 of the optical filter 12 from which the resin coating 115 has been removed is inserted in the through-hole 130 of the ferrule 13H, such that the grating 126 is positioned in the enlarged portion 134b. The normal portion 133b of the through-hole 130 surrounds the end portion of the optical filter 12 so as to be substantially in close contact therewith, thereby holding the optical filter 12. In the enlarged portion 134b, by contrast, a gap is formed between the outer surface of the optical filter 12 and the grooves 135b formed in the through-hole 130 of the ferrule 13H. In the hollow portion 242 of the flange 24, the portion (including a part of the tip portion) of the optical filter 12 covered with the resin coating 115 is accommodated. The space between the coating 115 of the optical filter 12 and the hollow portion 242 is filled with the adhesive 600. The optical filter 12 is fixed to the inside of the hollow portion 242 by means of this adhesive 600.

In the optical connector of FIG. 60, of the light having the reflection wavelength of the grating 126, the light component radiated from the grating 126 to the cladding 124 advances while extending to the grooves 135b. Thereafter, while the light radiated from the grating 126 reaches the normal portion 133b, of the light radiated from the grating 126, the leaking light component distributed in the grooves 135b is blocked by the inner surface of the through-hole 130 of the ferrule 13H and cannot advance further therefrom. Consequently, of the light having the reflection wavelength of the grating 126, the light component radiated to the cladding 124 so as to pass through the filter region 122 including the grating 126 has a reduced power. Accordingly, the optical connector having the eleventh light-blocking structure (first applied example) has a high light-blocking ratio and can also be favorably used as a constituent in an inspection system for optical lines.

Though the through-hole 130 has the normal portion 133b in the tip portion of the ferrule 13H as shown in FIG. 60, the optical connector having no such normal portion 133b but the grooves. 135b extending from the rear end to front end of the ferrule 13H (including the end face 131) also exhibits constant effects. Namely, when the optical filter 12 is accommodated in such an optical connector, of the light having the reflection wavelength of the grating 126, the light component radiated from the grating 126 to the cladding 124 advances while extending to the grooves 135b and then is emitted from the tip of the ferrule 13H. Accordingly, when the optical connector 12 is connected to an optical element having a light-receiving surface with a cross-sectional area which is on a par with that of the optical connector 12, of the light radiated from the grating 126, the leaking light component distributed in the grooves 135b is not made incident on this optical element, whereby the light-blocking ratio of the optical filter 12 is increased.

In the following, the eleventh light-blocking structure (second applied example) of the optical connector in the second embodiment of the present invention will be explained.

Figure 62:
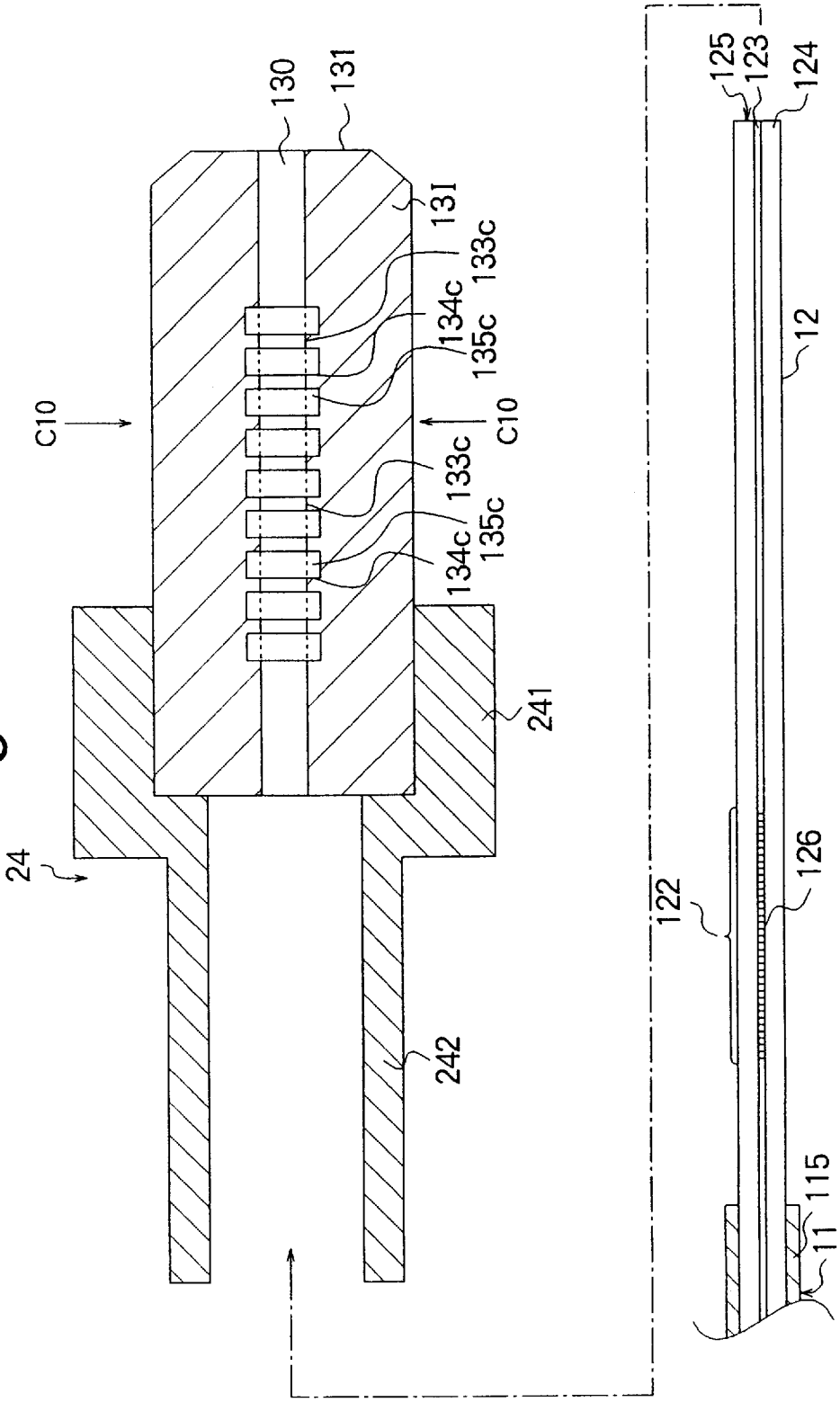
FIG. 62 is a view showing a part of an assembling step for the second embodiment of the optical connector according to the present invention (second applied example of eleventh light-blocking structure), corresponding to the cross section taken along line A—A of the optical connector shown in FIG. 5.
Figure 63:
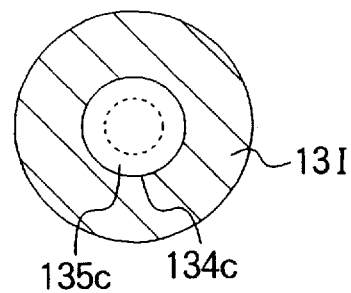
FIG. 63 is a view showing an overall cross-sectional configuration of the optical connector shown in FIG. 62 at a part indicated by arrow C10, corresponding to the cross section taken along line C—C of the optical connector shown in FIG. 5.

FIG. 62 is a lateral cross-sectional view (corresponding to a cross-sectional view taken along line A—A of FIG. 5) of each member, showing a part of an assembling step for the optical connector having the eleventh light-blocking structure (second applied example). FIG. 63 is a cross-sectional view (corresponding to a cross-sectional view taken along line C—C of FIG. 5) of the optical connector at a portion indicated by arrow C10 of FIG. 62. The through-hole 130 of the ferrule 13I is constituted by a plurality of normal portions 133c having a cross section substantially the same as that of the optical filter 12 and a plurality of enlarged portions 134c having a circular cross section greater than that of the optical filter 12. The normal portions 133c and the enlarged portions 134c are alternately disposed along the center axis of the through-hole 130. Each enlarged portion 134c is positioned at a part of the inner surface of the through-hole 130 having the cross section which is substantially the same as that of the optical filter 12 where a groove 135c is formed. The through-hole 130 shown in FIGS. 62 and 63 has a cross section similar to that of the normal portion 133c, i.e., circular cross section with a diameter of 126 μm, so that the optical filter 12 can be held. Each groove 135c extends along the circumference of the cross section of the through-hole 130 while maintaining a constant depth. Also, the grooves 135c are disposed with equal intervals along the center axis of the through-hole 130.

When the optical filter 12 is accommodated in the ferrule 13I of FIG. 62, a gap is formed between the groove 135c defined by the enlarged portion 134c of the through-hole 130 and the outer surface of the optical filter 12. Accordingly, as in the case of the optical connector of FIG. 56, of the light having the reflection wavelength of the grating 126, the light component radiated from the grating 126 to the cladding 124 becomes incident on the groove 135c. Of the light radiated from the grating 126, the leaking light component incident on the inside of the groove 135c is reflected by the inner surface (enlarged portion 134c) of the through-hole 130 of the ferrule 13I within the groove 135c. Accordingly, the leaking light component is hard to advance further therefrom, while the intensity thereof gradually attenuates. Consequently, of the light having the reflection wavelength of the grating 126, the light component radiated to the cladding 124 so as to pass through the filter region 122 including the grating 126 has a reduced power. In particular, since a plurality of enlarged portions 134c and a plurality of normal portions 133c are alternately disposed in this optical connector, the radiated light is reduced at each enlarged portion 134c, whereby the effect for reducing radiated light is accumulated so as to finally reduce the light radiated from the grating 126 greatly. Accordingly, the optical connector having the eleventh light-blocking structure (second applied example) can increase the light-blocking ratio of the optical filter 12 greatly.

Here, in the case where the grooves 135c are filled with the refractive-index matching material 800 having a refractive index substantially coinciding with that of the surface layer portion of the cladding 124, when the optical filter 12 is accommodated in the through-hole 130 of the ferrule 13I, the light radiated from the grating 126 is hardly reflected by the outer surface of the optical filter 12. Accordingly, the light-blocking ratio of the optical filter 12 can be increased very much.

Also, in the case where the grooves 135c are filled with the refractive-index matching material 800 having a refractive index higher than that of the surface layer portion of the cladding 124 of the optical filter 12, when the optical filter 12 is accommodated in the through-hole 130 of the ferrule 13I, the light radiated from the grating 126 is hard to be totally reflected by the outer surface of the optical filter 12. Accordingly, the light-blocking ratio of the optical filter 12 can be increased very much.

Figure 64:
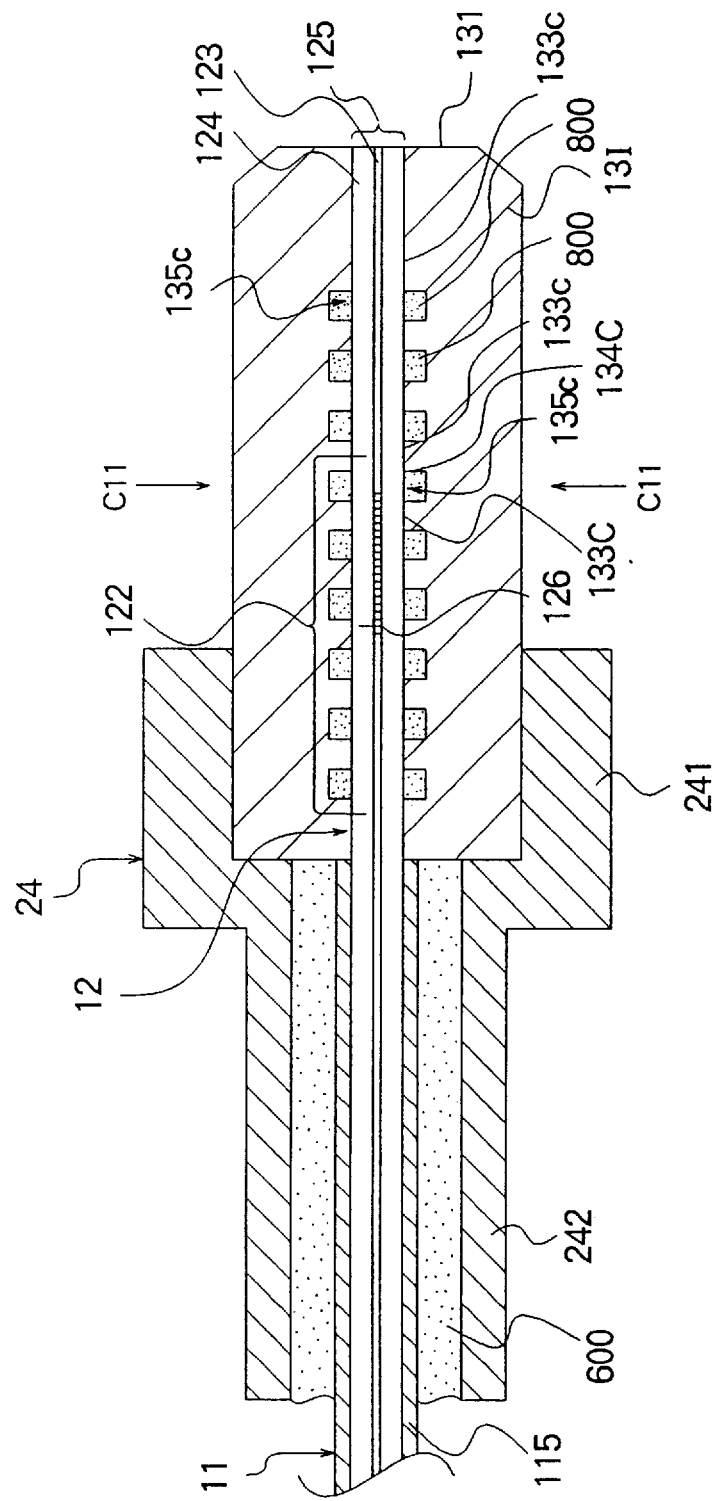
FIG. 64 is a view showing a cross-sectional configuration of the second embodiment of the optical connector according to the present invention (second applied example of eleventh light-blocking structure), corresponding to the cross section taken along line A—A of the optical connector shown in FIG. 5.
Figure 65:
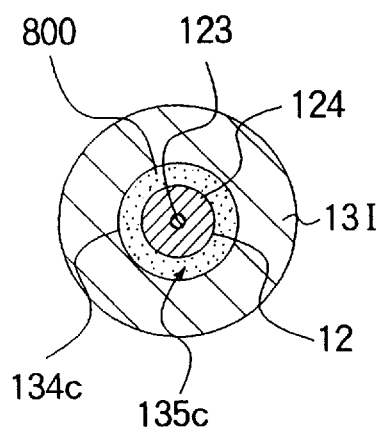
FIG. 65 is a view showing an overall cross-sectional configuration of the optical connector shown in FIG. 64 at a part indicated by arrow.C11, corresponding to the cross section taken along line C—C of the optical connector shown in FIG. 5.

FIG. 64 is a cross-sectional view (corresponding to a cross-sectional view taken along line A—A of FIG. 5) showing a configuration of the optical connector obtained by way of the assembling step shown in FIG. 62. FIG. 65 is a cross-sectional view (corresponding to a cross-sectional view taken along line C—C of FIG. 5) of the optical connector at a portion indicated by arrow C11 of FIG. 64. The tip portion 121 of the optical filter 12 from which the resin coating 115 has been removed is inserted in the through-hole 130 of the ferrule 13I, such that the enlarged portions 134c are positioned around the grating 126. The normal portions 133c of the through-hole 130 surround the tip portion 121 of the optical filter 12 so as to be substantially in close contact therewith, thereby holding the optical filter 12. In the enlarged portion 134c, by contrast, a gap is formed between the outer surface of the optical filter 12 and the groove 135c formed in the inner surface of the through-hole 130 of the ferrule 13I. In the hollow portion 242 of the flange 24, the portion (including a part of the tip portion) of the optical filter 12 covered with the resin coating 115 is accommodated. The space between the coating 115 of the optical filter 12 and the hollow portion 242 is filled with the adhesive 600. The optical filter 12 is fixed to the inside of the hollow portion 242 by means of this adhesive 600.

In this optical connector, of the light having the reflection wavelength of the grating 126, the light component radiated from the grating 126 to the cladding 124 becomes incident on the grooves 135c. Consequently, the light radiated from the grating 126 is hard to advance further therefrom, and gradually attenuates as being reflected in the grooves 135c. Accordingly, of the light having the reflection wavelength of the grating 126, the light component passing through the filter region 122 including the grating 126 has a reduced power. Therefore, the optical connector of FIG. 64 has a high light-blocking ratio and can also be favorably used as a constituent in an inspection system for optical lines.

Though a plurality of enlarged portions 134c are disposed so as to surround the whole grating 126 in the eleventh light-blocking structure (second applied example), the arrangement of the enlarged portion 134c should not be restricted thereto. As shown in FIG. 11, the light radiated from the grating 126 to the cladding 124 advances from each portion of the grating 126 to a part positioned obliquely in front thereof. Accordingly, when the enlarged portion 134c is disposed in a region obliquely in front of each portion of the grating 126, the light-blocking ratio can be sufficiently increased.

Figure 66:
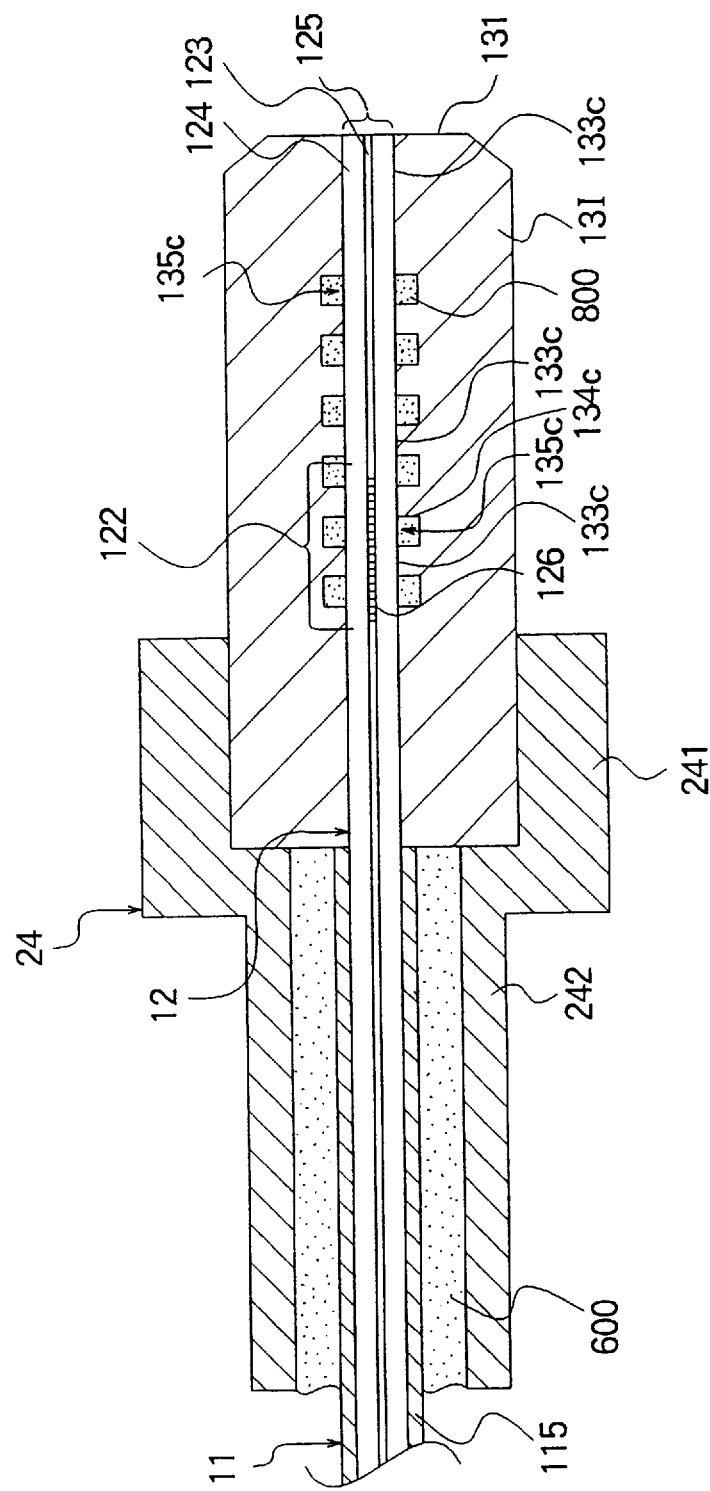
FIG. 66 is a view showing a cross-sectional configuration of the second embodiment of the optical connector according to the present invention (second applied example of eleventh light-blocking structure in which the groove-forming position is altered), corresponding to the cross section taken along line A—A of the optical connector shown in FIG. 5.

FIG. 66 is a lateral cross-sectional view (corresponding to a cross-sectional view taken along line A—A of FIG. 5) showing a configuration of a modified example of the optical connector of FIG. 64. In this optical connector, the enlarged portions 134c, as a whole, are disposed further in front as compared with those in the optical connector of FIG. 64. As mentioned above, since the light radiated from the grating 126 to the cladding 124 advances to a part obliquely in front of the grating 126, the light radiated from the grating 126 can be sufficiently reduced when the enlarged portion 134c is disposed in a region obliquely in front of tip of the grating 126. Accordingly, the optical connector of FIG. 66 also has a high light-blocking ratio and can also be favorably used as a constituent in an inspection system for optical lines. Here, the ferrule 13I shown in FIG. 64 and the like may also be obtained when disks having respective openings with different diameters are bonded together.

In the following, the eleventh light-blocking structure (third applied example) of the optical connector in the second embodiment of the present invention will be explained.

Figure 67:
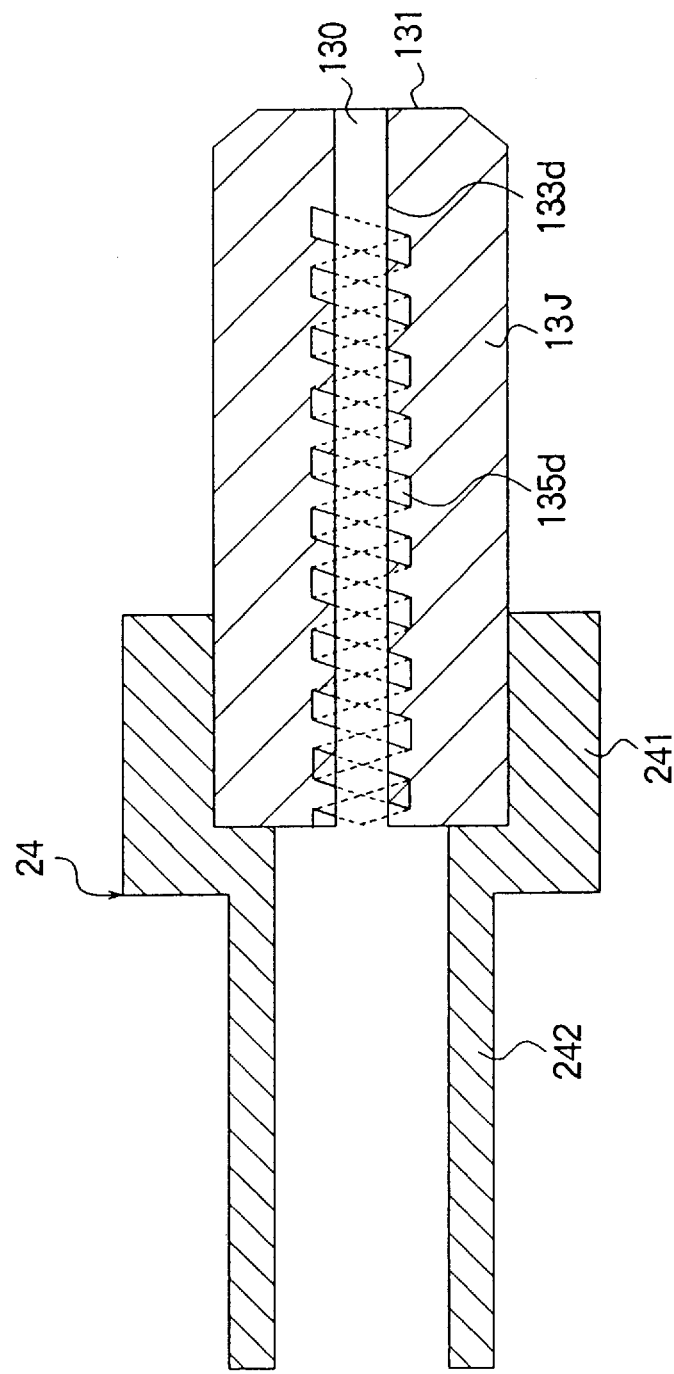
FIG. 67 is a view showing a part of an assembling step for the second embodiment of the optical connector according to the present invention (third applied example of eleventh light-blocking structure), corresponding to the cross section taken along line A—A of the optical connector shown in FIG. 5.
Figure 68:
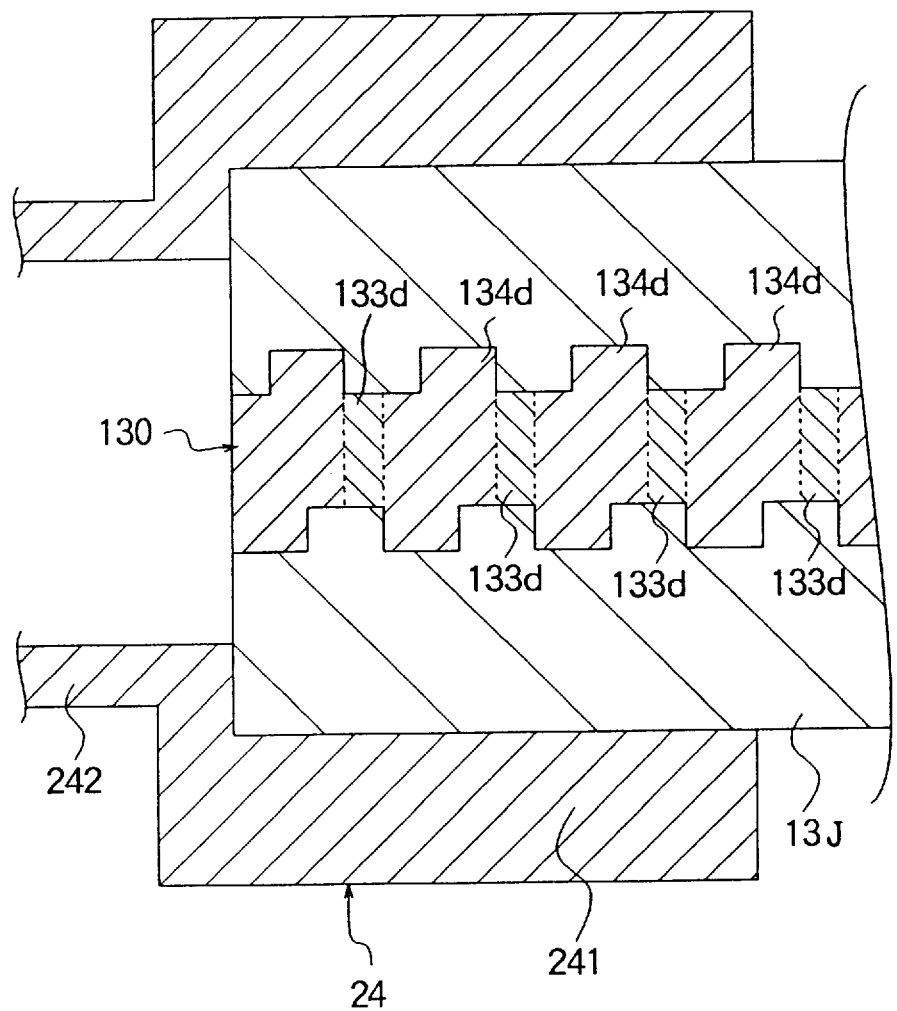
FIG. 68 is a view showing, with a magnification, a main part of the ferrule shown in FIG. 67.

FIG. 67 is a lateral cross-sectional view (corresponding to a cross-sectional view taken along line A—A of FIG. 5) showing a configuration of (only a plug of) the optical connector having the eleventh light-blocking structure (third applied example). This optical connector is different from that of FIG. 64 in the form of a groove 135d defined by an enlarged portion 134d of the through-hole 130. FIG. 68 is a view showing the enlarged portion 134d and normal portion 133d in the ferrule 13J. The enlarged portion 134d defines the groove 135d formed in the inner surface of the through-hole 130 having a cross section which is substantially the same as that of the cross section of the optical filter 12. This groove 135d differs from that in the optical connector of FIG. 64 in that it spirally extends around the center axis of the through-hole 130. In this specification, "enlarged portion" of a through hole refers to a portion whose cross-sectional area orthogonal to the axis of the through hole is greater than that of the optical filter. In FIG. 67, all the parts where the cross-sectional area orthogonal to the center axis of the through hole is greater than that of the normal portion 133d correspond to the enlarged portion 134d.

In the ferrule 13J of FIG. 67, when the optical filter 12 is accommodated therein, a gap is formed between the outer surface of the optical filter 12 and the groove 135d formed in the inner surface of the through-hole 130. Accordingly, of the light having the reflection wavelength of the grating 126, the light component radiated from the grating 126 to the cladding 124 becomes incident on the inside of the groove 135d. Consequently, the light radiated from the grating 126 is hard to advance further therefrom, and gradually attenuates as being reflected in the groove 135d. Accordingly, of the light having the reflection wavelength of the grating 126, the light component passing through the filter region 122 including the grating 126 has a reduced power. Therefore, as in the case of the optical connector of FIG. 64, the optical connector of FIG. 67 can increase the light-blocking ratio of the optical filter 12.

Further, the optical connector of FIG. 67 is relatively easy to manufacture since the enlarged portion 134d can be made when the inner surface of the through-hole 130 of the ferrule 13J is continuously ground to form the single spiral groove 135d therein, without forming a plurality of grooves 135c as required in the optical connector of FIG. 64.

Here, in the case where the groove 135d is filled with the refractive-index matching material 800 having a refractive index substantially coinciding with that of the surface layer portion of the cladding 124, when the optical filter 12 is accommodated in the through-hole 130 of the ferrule 13J, the light radiated from the grating 126 is hardly reflected by the outer surface of the optical filter 12. Accordingly, the light-blocking ratio of the optical filter 12 can be increased very much (see FIGS. 69 and 70).

Also, in the case where the groove 135d is filled with the refractive-index matching material 800 having a refractive index higher than that of the surface layer portion of the cladding 124 of the optical filter 12, when the optical filter 12 is accommodated in the through-hole 130 of the ferrule 13J, the light radiated from the grating 126 is hard to be totally reflected by the outer surface of the optical filter 12. Accordingly, the light-blocking ratio of the optical filter 12 can be increased greatly.

Figure 69:
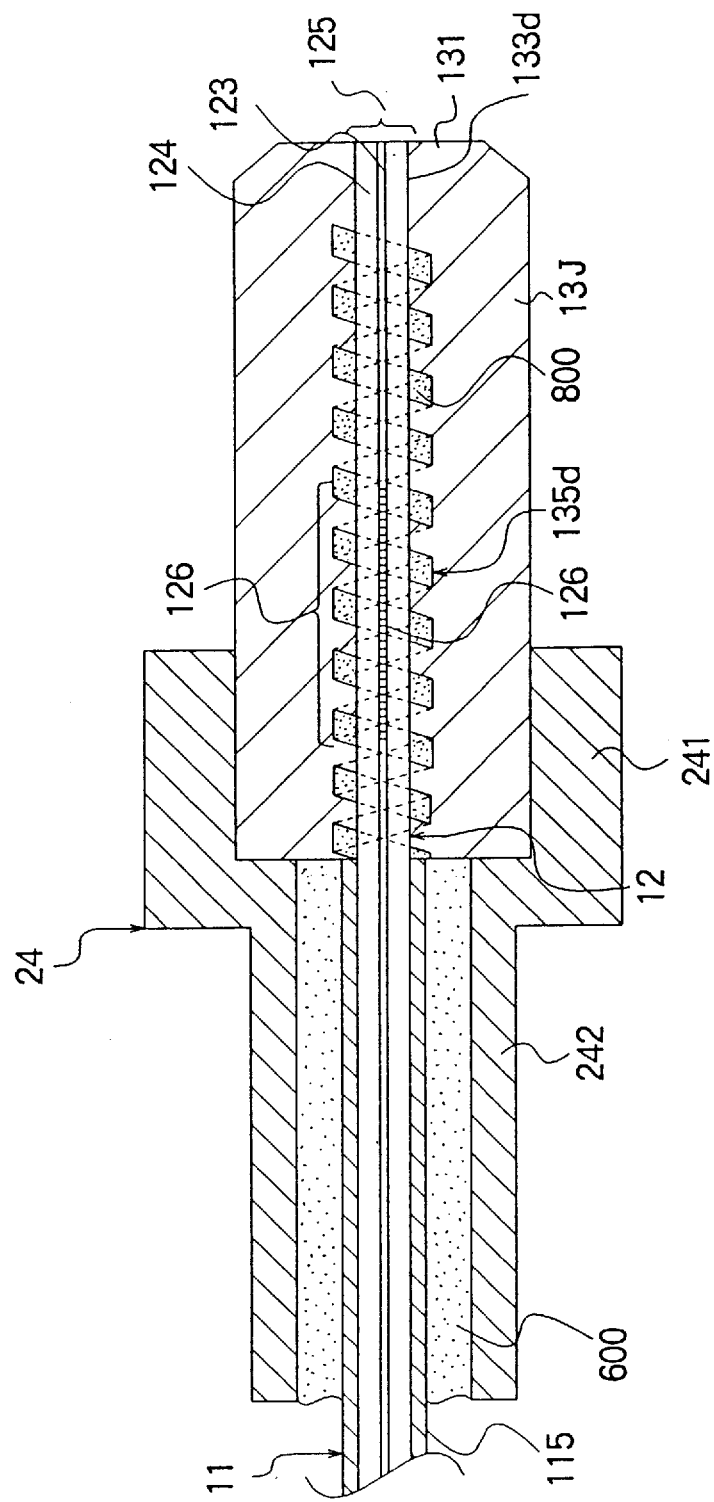
FIG. 69 is a view showing a cross-sectional configuration of the second embodiment of the optical connector according to the present invention (third applied example of eleventh light-blocking structure in which the groove-forming position is altered), corresponding to the cross section taken along line A—A of the optical connector shown in FIG. 5.

FIG. 69 is a lateral cross-sectional view (corresponding to a cross-sectional view taken along line A—A of FIG. 5) showing a configuration of the optical connector having the eleventh light-blocking structure (third applied example). The tip portion 121 of the optical filter 12 from which the resin coating 115 has been removed is inserted in the through-hole 130 of the ferrule 13J, such that the grating 126 is positioned in the enlarged portion 134d. The normal portion 133d of the through-hole 130 surrounds the tip portion 121 of the optical filter 12 so as to be substantially in close contact therewith, thereby holding the optical filter 12. In the enlarged portion 134d, by contrast, a gap is formed between the outer surface of the optical filter 12 and the groove 135d formed in the inner surface of the through-hole 130 of the ferrule 13J. In the hollow portion 242 of the flange 24, the portion (including a part of the tip portion) of the optical filter 12 covered with the resin coating 115 is accommodated. The space between the coating 115 of the optical filter 12 and the hollow portion 242 is filled with the adhesive 600. The optical filter 12 is fixed to the inside of the hollow portion 242 by means of this adhesive 600.

In this optical connector, of the light having the reflection wavelength of the grating 126, the light component radiated from the grating 126 to the cladding 124 becomes incident on the groove 135d. Consequently, the light radiated from the grating 126 is hard to advance further therefrom, and gradually attenuates as being reflected in the groove 135d. Accordingly, of the light having the reflection wavelength of the grating 126, the light component passing through the filter region 122 has a reduced power. Therefore, the optical connector of FIG. 69 has a high light-blocking ratio and can also be favorably used as a constituent in an inspection system for optical lines.

Though the groove 135d is disposed so as to surround the whole grating 126 in the eleventh light-blocking structure (third applied example), the arrangement of the groove 134d should not be restricted thereto. As shown in FIG. 11, the light radiated from the grating 126 to the cladding 124 advances from each portion of the grating 126 to a part positioned obliquely in front thereof. Accordingly, when the groove 135d is disposed at a position obliquely in front of each portion of the grating 126, the light-blocking ratio can be sufficiently increased.

Figure 70:
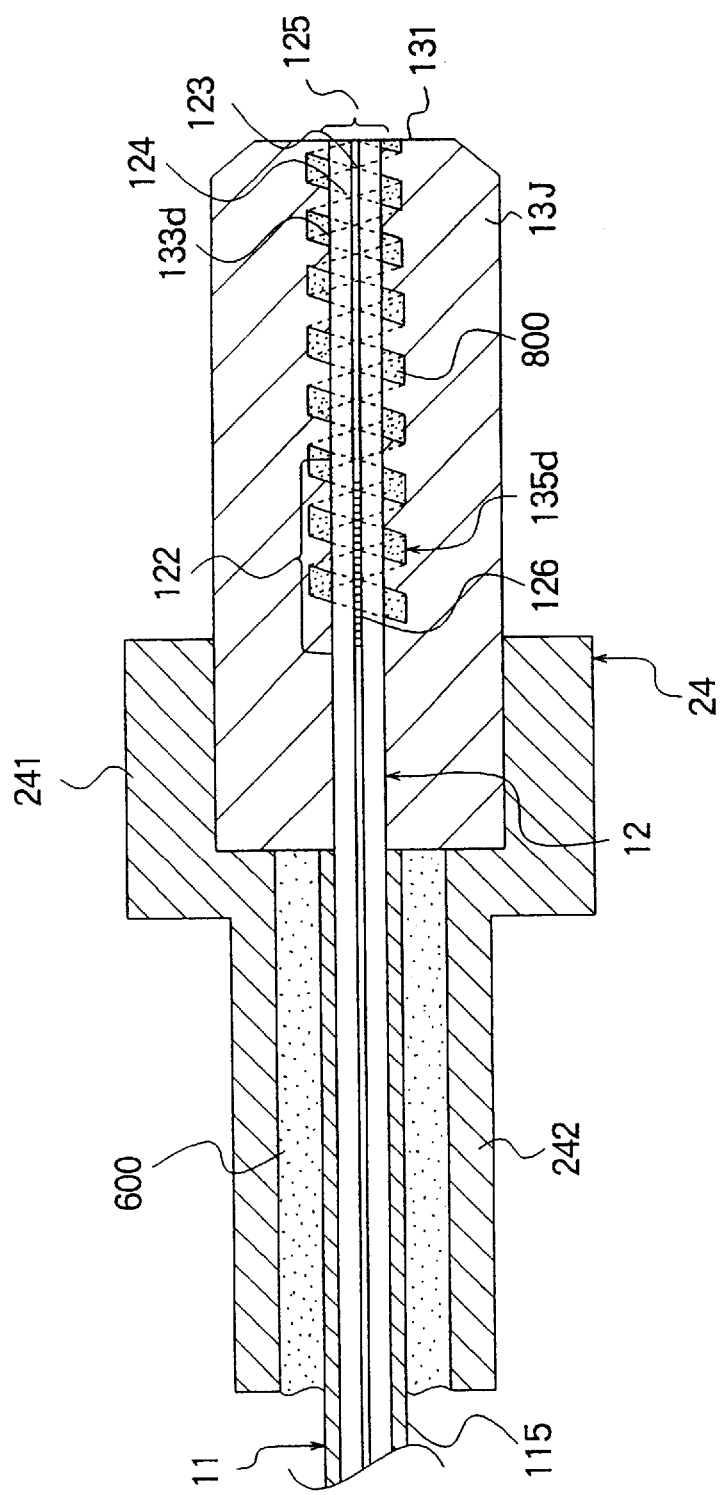
FIG. 70 is a view showing a cross-sectional configuration of the second embodiment of the optical connector according to the present invention (third applied example of eleventh light-blocking structure in which the groove-forming position is altered), corresponding to the cross section taken along line A—A of the optical connector shown in FIG. 5.

FIG. 70 is a lateral cross-sectional view (corresponding to a cross-sectional view taken along line A—A of FIG. 5) showing a configuration of a modified example of the optical connector of FIG. 69. In this optical connector, the groove 135d, as a whole, is disposed further in front as compared with that in the optical connector of FIG. 69. As mentioned above, since the light radiated from the grating 126 to the cladding 124 advances to a part obliquely in front of the grating 126, the light radiated from the grating 126 can be sufficiently reduced when the enlarged portion 134c is disposed in a region obliquely in front of tip of the grating 126. Accordingly, the optical connector of FIG. 70 also has a high light-blocking ratio and can be favorably used as a constituent in an inspection system for optical lines.

As explained in detail in the foregoing, in the optical connector having the tenth light-blocking structure, when an optical filter is accommodated in the ferrule, the light radiated from the grating is blocked by the inner surface of the ferrule at the interface part between the enlarged portion and the normal portion, whereby the light-blocking ratio of the optical filter can be increased.

Also, in the optical filter having the eleventh light-blocking structure, when an optical filter is accommodated in the ferrule, the light radiated from the grating advances while extending to the groove formed in the inner surface of the ferrule so as to be emitted from the tip of the ferrule, whereby the light-blocking ratio of the optical filter can be increased in the case where it is connected to an optical element having a light-receiving surface with a cross-sectional area which is on a par with that of the optical filter.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 301455/1955 filed on Nov. 20, 1995, No. 324737/1995 filed on Dec. 13, 1995, No. 324740/1995 filed on Dec. 13, 1995, No. 324742/1995 filed on Dec. 13, 1995, No. 324746/1995 filed on Dec. 13, 1995, No. 325720/1995 filed on Dec. 14, 1995, No. 325729/1995 filed on Dec. 14, 1995, No. 327232/1995 filed on Dec. 15, 1995, and No. 013249/1996 filed on Jan. 29, 1996 are hereby incorporated by reference.

What is claimed is:

1. An optical connector for constituting a part of a transmission line, comprising:
   an optical filter, as at least a part of said transmission line, having a waveguide structure comprising a core having a predetermined refractive index and a cladding which covers an outer periphery of said core and has a lower refractive index than said core, said optical filter having a tip portion, at least one end face, and a grating for reflecting light of a predetermined wavelength, said grating being provided at a predetermined position of said optical filter; and
   a plug, attached to said optical filter, defining a space for accommodating at least said tip portion of said optical filter including one end face of said optical filter, wherein said tip portion of said filter containing said grating is accommodated in the space of said plug.

2. An optical connector according to claim 1, wherein said optical connector has a light-blocking structure for preventing, of light to be reflected by said grating, a light component radiated form said grating to said cladding from traveling from a filter region of said optical filter in which said grating is disposed toward said one end face of said optical filter.

3. An optical connector according to claim 2, wherein said plug includes:
   a ferrule having a through-hole for accommodating at least a part of said tip portion of said optical filter and being attached to said tip portion, while accommodating said part of said tip portion in said through-hole thereof; and
   a flange to which one end of said ferrule is attached, said flange having a hollow portion for accommodating at least a remaining part of said tip portion of said optical filter which is not accommodated in said through-hole of said ferrule, and
   wherein said grating is located at a predetermined position of said remaining part of said tip portion which is accommodated in said hollow portion of said flange.

4. An optical connector according to claim 3, wherein a space defined by an outer peripheral surface of said filter region of said optical filter and an inner wall of said hollow portion of said flange is filled with an adhesive having a refractive index substantially the same as or higher than that of said cladding of said optical filter.

5. An optical connector according to claim 3, wherein, in a space defined by an outer peripheral surface of said filter region of said optical filter and an inner wall of said hollow portion of said flange, a tubular member surrounding said filter region in a state where said optical filter penetrates therethrough is accommodated, said tubular member having a refractive index substantially the same as or higher than that of said cladding of said optical filter.

6. An optical connector according to claim 5, wherein at least a space defined by said outer peripheral surface of said filter region of said optical filter and an inner wall of said tubular member is filled with an adhesive having a refractive index substantially the same as or higher than that of said cladding of said optical filter.

7. An optical connector according to claim 3, wherein at least an outer peripheral surface of said filter region of said optical filter is covered with a coating which surrounds said grating.

8. An optical connector according to claim 7, wherein said coating has a refractive index substantially the same as or higher than that of said cladding of said optical filter.

9. An optical connector according to claim 2, wherein said plug comprises a ferrule having a through-hole for accommodating a part of said tip portion of said optical filter and being attached to said tip portion of said optical filter, while accommodating at least said part of said tip portion of said optical filter, and
   wherein said grating is located in said through-hole of said ferrule.

10. An optical connector according to claim 9, wherein said ferrule comprises a light-transmitting material which transmits therethrough light of a wavelength corresponding to the reflection wavelength of said grating.

11. An optical connector according to claim 10, wherein said light-transmitting material has a refractive index substantially the same as or higher than that of said cladding of said optical filter.

12. An optical connector according to claim 9, wherein said ferrule has a light-absorbing structure for absorbing light of a wavelength corresponding to the reflection wavelength of said grating, said light-absorbing structure being disposed in a region where, of light to be reflected by said grating, a light component radiated from said grating to said cladding reaches.

13. An optical connector according to claim 12, wherein said ferrule comprises a light-absorbing material which absorbs light of a wavelength corresponding to the reflection wavelength of said grating.

14. An optical connector according to claim 12, wherein a light-absorbing layer including a material which absorbs light of a wavelength corresponding to the reflection wavelength of said grating is provided on an inner wall of said through-hole of said ferrule.

15. An optical connector according to claim 9, wherein a predetermined portion of said tip portion of said optical filter which is accommodated in said through-hole of said ferrule and where, of light to be reflected by said grating, a light component reflected from said grating to said cladding reaches has an outer diameter smaller than the outer diameter of a remaining portion of said tip portion of said optical filter, and wherein a space defined by an outer peripheral surface of said predetermined portion of said tip portion of said optical filter and an inner wall of said through-hole of said ferrule is filled with a light-absorbing material which absorbs light of a wavelength corresponding to the reflection wavelength of said grating.

16. An optical connector according to claim 15, wherein said light-absorbing material has a refractive index substantially the same as or higher than that of said cladding of said optical filter.

17. An optical connector according to claim 9, wherein said plug has a structure for restricting a light-emitting opening positioned at said one end face of said optical filter to a size smaller than the size of a cross section of said optical filter perpendicular to an optical axis of said optical filter.

18. An optical connector according to claim 17, wherein an opening of said through-hole of said ferrule positioned on said one end face side of said optical filter with respect to said grating is covered with a first light-blocking member having an opening with a size smaller than that of said one end face of said optical filter.

19. An optical connector according to claim 17, wherein a first opening of said through-hole of said ferrule which is positioned on said one end face side of said optical filter with respect to said grating has a size smaller than that of a second opening of said through-hole of said ferrule which is positioned opposite to said first opening with respect to said grating.

20. An optical connector according to claim 17, wherein a second light-blocking member having an opening with a size smaller than that of said cross section of said optical filter is attached to said one end face of said optical filter accommodated in said through-hole of said ferrule, said second light-blocking member being provided in said through-hole of said ferrule.

21. An optical connector according to claim 17, wherein the restricted light-emitting opening of said optical filter has a diameter greater than 1.14 times that of a mode field diameter in said optical filter but smaller than an outer diameter of said cladding of said optical filter.

22. An optical connector according to claim 9, wherein said ferrule has a structure for exposing a region of an outer peripheral surface of said tip portion of said optical filter accommodated in said through-hole of said ferrule where, of light to be reflected by said grating, a light component radiated from said grating to said cladding reaches.

23. An optical connector according to claim 22, wherein said ferrule has a cutout portion extending from an outer side surface of said ferrule to said through-hole accommodating said tip portion of said optical filter or a window communicating said outer side surface of said ferrule to an inner wall of said through-hole accommodating said tip portion of said optical filter.

24. An optical connector according to claim 23, wherein the exposed region of said tip portion of said optical filter accommodated in said through-hole of said ferrule is covered with a refractive-index matching material having a refractive index substantially the same as or higher than that of said cladding of said optical filter.

25. An optical connector according to claim 9, wherein said grating positioned in said through-hole of said ferrule is spaced from said one end face of said optical filter by at least 3 mm.

26. An optical connector according to claim 9, wherein a region of said through-hole of said ferrule where, of light to be reflected by said grating, a light component radiated from said grating to said cladding reaches has a cross-sectional area larger than the cross-sectional area of an opening of said ferrule positioned on said one end face side of said optical filter with respect to said grating.

27. An optical connector according to claim 9, wherein a groove is provided in at least a region of an inner wall of said through-hole of said ferrule where, of light to be reflected by said grating, a light component radiated from said grating to said cladding reaches.

28. An optical connector according to claim 27, wherein said groove extends along a center axis of said through-hole from a first end portion of said ferrule to a second end portion opposite to said first end portion.

29. An optical connector according to claim 27, wherein said groove is provided along a circumferential direction of a cross section of said through-hole perpendicular to a center axis of said through-hole.

30. An optical connector according to claim 27, wherein said groove spirally extends about a center axis of said through-hole from a first end portion of said ferrule to a second end portion opposite to said first end portion.

31. An optical connector according to claim 27, wherein a space defined by an outer peripheral surface of said tip portion of said optical filter accommodated in said through-hole of said ferrule and said groove disposed in said inner wall of said through-hole is filled with a refractive-index matching material having a refractive index substantially the same as or higher than that of said cladding of said optical filter.

32. An optical connector according to claim 27, wherein said groove is provided in at least a region of said inner wall of said through-hole of said ferrule positioned on said one end face side of said optical filter with respect to said grating, excluding an end portion of said ferrule.

33. An optical connector according to claim 1, wherein an outer peripheral surface of said filter region of said optical filter is substantially covered by a single material member, and a stress distribution in a longitudinal direction in said filter region is in uniform state.

34. An optical connector comprising:
an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and
a plug which has a space for accommodating at least a tip portion of said optical filter including one end face of said optical filter, said plug including:
a ferrule having a through-hole for accommodating a part of said tip portion of said optical filter and being attached to said optical filter, while accommodating said part of said tip portion in said through-hole thereof; and
a flange to which one end of said ferrule is attached, said flange having a hollow portion for accommodating at least a remaining part of said tip portion of said optical filter which is not accommodated in said through-hole of said ferrule, and
wherein said grating is located at a predetermined position of said remaining part of said tip portion which is accommodated in said hollow portion of said flange.

35. An optical connector according to claim 34, wherein a space defined by an outer peripheral surface of a filter region of said optical filter in which said grating is disposed and an inner wall of said hollow portion of said flange is filled with an adhesive having a refractive index substantially the same as or higher than that of said cladding of said optical filter.

36. An optical connector according to claim 34, wherein, in a space defined by an outer peripheral surface of a filter region of said optical filter in which said grating is disposed and an inner wall of said hollow portion of said flange, a tubular member surrounding said filter region in a state where said optical filter penetrates therethrough is accommodated, said tubular member having a refractive index substantially the same as or higher than that of said cladding of said optical filter.

37. An optical connector according to claim 36, wherein at least a space defined by said outer peripheral surface of said filter region of said optical filter and an inner wall of said tubular member is filled with an adhesive having a refractive index substantially the same as or higher than that of said cladding of said optical filter.

38. An optical connector according to claim 34, wherein at least an outer peripheral surface of a filter region of said optical filter in which said grating is disposed is covered with a coating which surrounds said grating.

39. An optical connector according to claim 38, wherein said coating has a refractive index substantially the same as or higher than that of said cladding of said optical filter.

40. An optical connector comprising:
    an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and
    a ferrule having a through-hole for accommodating a part of a tip portion of said optical filter including one end face of said optical filter and being attached to said optical filter, while accommodating said part of said tip portion in said through-hole thereof, said ferrule comprising a light-transmitting material which transmits therethrough light having a wavelength corresponding to the reflection wavelength of said grating.

41. An optical connector according to claim 40, wherein said light-transmitting material has a refractive index substantially the same as or higher than that of said cladding of said optical filter.

42. An optical connector according to claim 40, wherein said grating is located in said through-hole of said ferrule.

43. An optical connector comprising:
    an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and
    a ferrule having a through-hole for accommodating a part of a tip portion of said optical filter including one end face of said optical filter and being attached to said optical filter, while accommodating said part of said tip portion in said through-hole thereof, said ferrule having a light-absorbing structure for absorbing light having a wavelength corresponding to the reflection wavelength of said grating, said light-absorbing structure being disposed in a region where, of light to be reflected by said grating, a light component radiated from said grating to said cladding reaches.

44. An optical connector according to claim 43, wherein said ferrule comprises a light-absorbing material which absorbs light having a wavelength corresponding to the reflection wavelength of said grating.

45. An optical connector according to claim 44, wherein a light-absorbing layer including a material which absorbs light having a wavelength corresponding to the reflection wavelength of said grating is provided on an inner wall of said through-hole of said ferrule.

46. An optical connector according to claim 43, wherein said grating is located in said through-hole of said ferrule.

47. An optical connector comprising:
    an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and
    a ferrule having a through-hole for accommodating a part of a tip portion of said optical filter including one end face of said optical filter and being attached to said optical filter, while accommodating said part of said tip portion in said through-hole thereof,
    wherein a predetermined portion of said tip portion of said optical filter which is accommodated in said through-hole of said ferrule and where, of light to be reflected by said grating, a light component radiated from said grating to said cladding reaches has an outer diameter smaller than the outer diameter of a remaining portion of said optical filter, and
    wherein a space defined by an outer peripheral surface of said predetermined portion of said tip portion and an inner wall of said through-hole of said ferrule is filled with a light-absorbing material which absorbs light having a wavelength corresponding to the reflection wavelength of said grating.

48. An optical connector according to claim 47, wherein said light-absorbing material has a refractive index substantially the same as or higher than that of said cladding of said optical filter.

49. An optical connector according to claim 47, wherein said grating is located in said through-hole of said ferrule.

50. An optical filter comprising:
    an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and
    a plug having a space for accommodating at least a part of a tip portion of said optical filter including one end face of said optical filter and being attached to said optical filter, while accommodating said part of said tip portion in said space, said plug having a structure for restricting a light-emitting opening in said one end face of said optical filter to a size smaller than the size of a cross section of said optical filter perpendicular to an optical axis of said optical filter.

51. An optical connector according to claim 50, wherein said grating is located in said through-hole of said ferrule.

52. An optical connector according to claim 51, wherein said plug includes a ferrule having a through-hole for accommodating said part of said tip portion of said optical filter and being attached to said tip portion, while accommodating said part of said tip portion in said through-hole thereof, and wherein an opening of said through-hole of said ferrule positioned on said one end face side of said optical filter with respect to said grating is covered with a first light-blocking member having an opening with a size smaller than that of said cross section of said optical filter.

53. An optical connector according to claim 51, wherein said plug includes a ferrule having a through-hole for accommodating said part of said tip portion of said optical filter and being attached to said tip portion, while accommodating said part of said tip portion in said through-hole thereof, and wherein a first opening of said through-hole of said ferrule positioned on said one end face side of said optical filter with respect to said grating has a size smaller than that of a second opening of said through-hole of said ferrule which is positioned opposite to said first opening with respect to said grating.

54. An optical connector according to claim 50, wherein said plug includes a ferrule having a through-hole for accommodating said part of said tip portion of said optical filter and being attached to said tip portion, while accommodating said part of said tip portion in said through-hole thereof, and wherein a second light-blocking member having an opening with a size smaller than that of said cross section of said optical filter is attached to said one end face of said optical filter accommodated in said through-hole of said ferrule, said second light-blocking member being provided in said through-hole of said ferrule.

55. An optical connector according to claim 50, wherein said plug restricts said light-emitting opening in said one end face of said optical filter to a size greater than 1.14 times that of a mode field diameter in said optical filter but smaller than an outer diameter of said cladding of said optical filter.

56. An optical connector comprising:

an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and a ferrule having a through-hole for accommodating a part of a tip portion of said optical filter including one end face of said optical filter and being attached to said optical filter, while accommodating said part of said tip portion in said through-hole thereof, said ferrule having a structure for exposing a region of an outer peripheral surface of said tip portion of said optical filter accommodated in said through-hole of said ferrule where, of light to be reflected by said grating, a light component radiated from said grating to said cladding reaches.

57. An optical connector according to claim 56, wherein said ferrule has a cutout portion extending from an outer side surface of said ferrule to said through-hole accommodating said tip portion of said optical filter or a window communicating an outer side surface of said ferrule to an inner wall of said through-hole accommodating said tip portion of said optical filter.

58. An optical connector according to claim 56, wherein the exposed region of said tip portion of said optical filter accommodated in said through-hole of said ferrule is covered with a refractive-index matching material having a refractive index substantially the same as or higher than that of said cladding of said optical filter.

59. An optical connector according to claim 56, wherein said grating is located in said through-hole of said ferrule.

60. An optical connector comprising:

an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and an accommodating member having a through-hole for accommodating a part of a tip portion of said optical filter including one end face of said optical filter and being attached to said optical filter, while accommodating said part of said tip portion in said through-hole, wherein said grating is accommodated in said through-hole of said accommodating member and is spaced from said one end face of said optical filter by at least 3 mm.

61. An optical connector comprising:

an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and a ferrule having a through-hole for accommodating a part of a tip portion of said optical filter including one end face of said optical filter and being attached to said optical filter, while accommodating said part of said tip portion in said through-hole, wherein a region of said through-hole of said ferrule where, of light to be reflected by said grating, a light component radiated from said grating to said cladding reaches has a cross-sectional area larger than the cross-sectional area of an opening of said ferrule positioned on said one end face side of said optical filter with respect to said grating.

62. An optical connector comprising:

an optical filter, as at least a part of a transmission line, having a waveguide structure comprised of a core having a predetermined refractive index and a cladding which covers an outer periphery of said core and has a lower refractive index than said core, said optical filter having a grating for reflecting light of a predetermined wavelength, said grating being provided at a predetermined position of said optical filter; and a ferrule having a through-hole for accommodating a part of a tip portion of said optical filter including one end face of said optical filter and being attached to said optical filter, while accommodating said part of said tip portion in said through-hole, wherein a groove is disposed in at least a region of an inner wall of said through-hole of said ferrule where, of light to be reflected by said grating, a light component radiated from said grating to said cladding reaches.

63. An optical connector according to claim 62, wherein said groove extends along a center axis of said through-hole from a first end portion of said ferrule to a second end portion of said ferrule opposite to said first end portion.

64. An optical connector according to claim 62, wherein said groove is provided along a circumferential direction of a cross section of said through-hole perpendicular to a center axis of said through-hole.

65. An optical connector according to claim 62, wherein said groove spirally extends about a center axis of said through-hole from a first end portion of said ferrule to a second end portion of said ferrule opposite to said first end portion.

66. An optical connector according to claim 62, wherein a space defined by an outer peripheral surface of said tip portion of said optical filter accommodated in said through-hole of said ferrule and said groove provided in said inner wall of said through-hole is filled with a refractive-index matching material having a refractive index substantially the same as or higher than that of said cladding of said optical filter.

67. An optical connector according to claim 62, wherein said groove is provided at least a region of said inner wall of said through-hole of said ferrule positioned on said one end face side of said optical filter with respect to said grating, excluding an end portion of said ferrule.

* * * * *